US012326757B2

(12) United States Patent
Choi et al.

(10) Patent No.: US 12,326,757 B2
(45) Date of Patent: Jun. 10, 2025

(54) ELECTRONIC DEVICE COMPRISING EXPANDABLE DISPLAY, AND METHOD FOR CONTROLLING SCREEN OF ELECTRONIC DEVICE

(71) Applicant: Samsung Electronics Co., Ltd., Suwon-si (KR)

(72) Inventors: Yangsoo Choi, Suwon-si (KR); Youngseong Kim, Suwon-si (KR); Sungmin Hong, Suwon-si (KR); Junhyuk Kim, Suwon-si (KR); Jooyoung Kang, Suwon-si (KR); Yangwook Kim, Suwon-si (KR); Gyeongtae Park, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 18/146,836

(22) Filed: Dec. 27, 2022

(65) Prior Publication Data
US 2023/0130358 A1 Apr. 27, 2023

Related U.S. Application Data

(63) Continuation of application No. PCT/KR2021/008761, filed on Jul. 9, 2021.

(30) Foreign Application Priority Data

Jul. 14, 2020 (KR) .................. 10-2020-0086846
Apr. 1, 2021 (KR) .................. 10-2021-0042763

(51) Int. Cl.
*G06F 1/16* (2006.01)
*G06F 3/04886* (2022.01)

(52) U.S. Cl.
CPC ........ *G06F 1/1652* (2013.01); *G06F 3/04886* (2013.01); *G06F 1/1624* (2013.01)

(58) Field of Classification Search
CPC .... G06F 1/1624; G06F 1/1652; G06F 1/1656; G06F 1/1677; G06F 1/1681;
(Continued)

(56) References Cited

U.S. PATENT DOCUMENTS 9,262,059 B2    2/2016 Kim et al.
9,348,420 B2 *  5/2016 Walline ................. G06F 3/0426
(Continued)

FOREIGN PATENT DOCUMENTS

CN    108259649 A    7/2018
CN    110246422 A    9/2019
(Continued)

OTHER PUBLICATIONS

Extended European Search Report dated Nov. 8, 2023, issued in European Patent Application No. 21843027.0.
(Continued)

*Primary Examiner* — Ryan A Lubit
(74) *Attorney, Agent, or Firm* — Jefferson IP Law, LLP

(57) ABSTRACT

An electronic device is provided. The electronic device includes a flexible display comprising a first housing, a second housing and a third housing movably coupled with respect to the first housing, a first region disposed in the first housing to form a first surface exposed to the outside of the electronic device, a second region which extends from the first region and is located inside the second housing, and a third region which extends from the first region and is located inside the second housing, and a processor that may display a first screen in the first region, determine a direction and a distance in which the flexible display is extended based on a value obtained by a sensor, and display a screen (Continued)

different from the first screen in the second region or the third region based on the determination.

16 Claims, 74 Drawing Sheets

(58) Field of Classification Search
CPC .... G06F 1/3215; G06F 1/3265; G06F 3/0482; G06F 3/0484; G06F 3/04886; G06F 2203/04803; G09F 9/30
See application file for complete search history.

(56) References Cited

U.S. PATENT DOCUMENTS

| | | | |
|---|---|---|---|
| 9,609,225 B2* | 3/2017 | Kwon | G06F 3/04845 |
| 10,203,863 B2 | 2/2019 | Kwon et al. | |
| 10,321,583 B2 | 6/2019 | Seo et al. | |
| 10,382,691 B2 | 8/2019 | Jung et al. | |
| 10,534,453 B2 | 1/2020 | Kwon et al. | |
| 10,684,714 B2 | 6/2020 | Seo et al. | |
| 11,343,361 B2 | 5/2022 | He et al. | |
| 11,347,336 B2 | 5/2022 | Seo et al. | |
| 11,532,247 B2 | 5/2022 | Baek et al. | |
| 11,375,628 B2 | 6/2022 | Zhang et al. | |
| 11,470,729 B2 | 10/2022 | Kim et al. | |
| 11,329,247 B2 | 12/2022 | Feng | |
| 11,848,563 B2 | 12/2023 | Kim et al. | |
| 2013/0275910 A1* | 10/2013 | Kim | G06F 1/1652 715/800 |
| 2015/0074589 A1* | 3/2015 | Pan | G06F 3/04886 715/781 |
| 2016/0349971 A1 | 12/2016 | Chi et al. | |
| 2017/0061932 A1* | 3/2017 | Kwon | G06F 1/1626 |
| 2017/0318226 A1* | 11/2017 | Jung | H04N 23/633 |
| 2018/0081473 A1 | 3/2018 | Seo et al. | |
| 2018/0103550 A1* | 4/2018 | Seo | H01F 7/0205 |
| 2018/0136835 A1* | 5/2018 | Heo | G06F 3/04886 |
| 2018/0217679 A1 | 8/2018 | Kwon et al. | |
| 2018/0329514 A1* | 11/2018 | Kwon | G06F 3/03 |
| 2018/0332205 A1* | 11/2018 | Hawthorne | G06F 1/1605 |
| 2020/0125144 A1 | 4/2020 | Chung et al. | |
| 2020/0304613 A1* | 9/2020 | Cha | G06F 1/1652 |
| 2020/0409549 A1* | 12/2020 | Yang | H04N 23/632 |
| 2021/0135151 A1 | 5/2021 | Baek et al. | |
| 2021/0135492 A1 | 5/2021 | Kim et al. | |
| 2021/0219437 A1 | 7/2021 | Kim et al. | |
| 2022/0039273 A1 | 2/2022 | Zhang et al. | |
| 2022/0130287 A1 | 4/2022 | Feng | |
| 2023/0109963 A1 | 4/2023 | Feng | |

FOREIGN PATENT DOCUMENTS

| | | |
|---|---|---|
| CN | 110706598 A | 1/2020 |
| CN | 111243438 A | 6/2020 |
| KR | 10-2006-0095299 A | 8/2006 |
| KR | 10-2010-0027502 A | 3/2010 |
| KR | 10-2014-0146992 A | 12/2014 |
| KR | 10-2016-0139320 A | 12/2016 |
| KR | 10-2016-0139643 A | 12/2016 |
| KR | 10-2017-0011675 A | 2/2017 |
| KR | 10-2017-0024942 A | 3/2017 |
| KR | 10-2017-0025520 A | 3/2017 |
| KR | 10-2017-0123125 A | 11/2017 |
| KR | 10-2018-0039799 A | 4/2018 |
| KR | 10-2020-0045660 A | 5/2020 |
| WO | 2018/186631 A1 | 10/2018 |
| WO | 2019-146865 A1 | 8/2019 |
| WO | 2019-194520 A1 | 10/2019 |
| WO | 2019-245165 A1 | 12/2019 |

OTHER PUBLICATIONS

International Search Report dated Oct. 25, 2021, issued in International Application No. PCT/KR2021/008761.

* cited by examiner

ELECTRONIC DEVICE COMPRISING EXPANDABLE DISPLAY, AND METHOD FOR CONTROLLING SCREEN OF ELECTRONIC DEVICE

CROSS-REFERENCE TO RELATED APPLICATION(S)

This application is a continuation application, claiming priority under § 365(c), of an International application No. PCT/KR2021/008761, filed on Jul. 9, 2021, which is based on and claims the benefit of a Korean patent application number 10-2020-0086846, filed on Jul. 14, 2020, in the Korean Intellectual Property Office, and of a Korean patent application number 10-2021-0042763, filed on Apr. 1, 2021, in the Korean Intellectual Property Office, the disclosure of each of which is incorporated by reference herein in its entirety.

BACKGROUND

1. Field

The disclosure relates to an electronic device including an extendable display, and method for controlling screen of the electronic device. More particularly, the disclosure relates to an electronic device including a flexible display that is extendable in opposite directions through a second housing structure and a third housing structure that are coupled to a first housing structure so as to slide.

2. Description of Related Art

An electronic device may provide various functions, such as playback of media contents, games, web surfing, and the like, as well as voice calls and short messages. In order for a user to conveniently use the various functions of the electronic device, a display of the electronic device needs to be wide. However, the portability of the electronic device may be lowered as the area of the display is increased. Accordingly, an electronic device equipped with a flexible display and having a variable display area, for example, a foldable electronic device, a rollable electronic device, or a slidable electronic device is being developed. The convenience of use may be improved by providing a wide screen as needed through a structure capable of extending or reducing the display area while maintaining excellent portability of the electronic device.

The above information is presented as background information only to assist with an understanding of the disclosure. No determination has been made, and no assertion is made, as to whether any of the above might be applicable as prior art with regard to the disclosure.

SUMMARY

In the implementation of an extendable display, a structure capable of overcoming a space limitation due to other electronic parts and mechanical parts in an electronic device while meeting user needs for a large screen may be required.

Since the electronic device including the extendable display is extended by a user's external physical force, the electronic device may be extended irrespective of the user's intention, or depending on users, it may be difficult to extend the electronic device.

Aspects of the disclosure are to address at least the above-mentioned problems and/or disadvantages and to provide at least the advantages described below. Accordingly, an aspect of the disclosure is to provide an electronic device including a flexible display that is extendable in opposite directions through a second housing structure and a third housing structure that are coupled to a first housing structure so as to slide.

Another aspect of the disclosure is to provide magnet members and actuators that prevent the electronic device from being unintentionally extended, or that help the electronic device to be easily extended.

Unlike an electronic device having a fixed screen area, an electronic device including an extendable display may have various screen forms depending on usage conditions. Therefore, a layout configuration method used for a fixed screen may not be appropriate for the electronic device including the extendable display. In a case in which the size of a screen area is variable, a user interface (UI)/user experience (UX) different from that of the fixed screen area may be required.

Another aspect of the disclosure is to provide an electronic device for effectively displaying and transferring information desired by a user depending on a direction in which a display is extended and a distance by which the display is extended and a method for controlling a screen of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing that forms a first side surface of the electronic device and that is coupled to the first housing so as to be movable in a first direction, at least a portion of the second housing being located in the first housing, a third housing that forms a second side surface of the electronic device and that is coupled to the first housing so as to be movable in a second direction, at least a portion of the third housing being located in the first housing, a first panel support member fixedly disposed in the second housing, the first panel support member including a first curved surface that faces toward the first side surface and a second curved surface that faces toward the second side surface, a second panel support member fixedly disposed in the third housing, the second panel support member including a third curved surface that faces toward the second side surface and a fourth curved surface that faces toward the first side surface, and a flexible display. The flexible display includes a first region that is disposed in the first housing and that forms a first surface of the electronic device, a second region that is located in the second housing or at least partially forms the first surface of the electronic device together with the first region as the second housing moves, and a third region that is located in the third housing or at least partially forms the first surface of the electronic device together with the first region as the third housing moves. The second region of the flexible display at least partially surrounds the first curved surface of the first panel support member or at least partially surrounds the first curved surface and the second curved surface of the first panel support member. The third region of the flexible display at least partially surrounds the third curved surface of the second panel support member or at least partially surrounds the third curved surface and the fourth curved surface of the second panel support member.

In accordance with another aspect of the disclosure, an electronic device is provided. The electronic device includes a first housing, a second housing that forms a first side surface of the electronic device and that is coupled to the first housing so as to be movable in a first direction from the first housing toward the first side surface, at least a portion of the second housing being disposed in the first housing, a third housing that forms a second side surface of the electronic device and that is coupled to the first housing so as to be movable in a second direction from the first housing toward the second side surface, at least a portion of the third housing being disposed in the first housing, a first panel support member that is fixedly disposed in the second housing and that extends in a direction perpendicular to the first direction, a second panel support member that is fixedly disposed in the second housing and that extends in a direction perpendicular to the second direction, a flexible display including a first region disposed in the first housing and exposed outside the electronic device, a second region that extends from the first region and at least partially surrounds the first panel support member and that is at least partially located in the second housing or is exposed outside the electronic device as the second housing moves in the first direction, and a third region that at least partially surrounds the second panel support member from the first region and that is at least partially located in the third housing or is exposed outside the electronic device as the third housing moves in the second direction, a first variable magnet member fixedly disposed on the first panel support member, a first magnet member that is attached to the second region of the flexible display and that moves away from the first variable magnet member as the second housing moves in the first direction, a second variable magnet member fixedly disposed on the second panel support member, and a second magnet member attached to the third region of the flexible display such that a distance from the second variable magnet member varies as the third housing moves. The second magnet member moves away from the second variable magnet member as the third housing moves in the second direction.

In accordance with another aspect of the disclosure, an electronic device is provided. The electronic device includes a first housing, a second housing at least partially disposed in the first housing and coupled to the first housing so as to be movable in a first direction, a third housing at least partially disposed in the first housing and coupled to the first housing so as to be movable in a second direction, a flexible display that is extendable in the first direction and/or the second direction as the second housing and the third housing move and that includes a first region that is disposed in the first housing and that forms a first surface exposed outside the electronic device, a second region that extends from the first region and that is at least partially located in the second housing or forms the first surface together with the first region as the second housing moves, and a third region that extends from the first region and that is at least partially located in the third housing or forms the first surface together with the first region as the third housing moves, at least one sensor, and at least one processor operationally connected with the at least one sensor. The at least one processor displays a first screen on the first region, determines a direction in which the flexible display is extended and a distance by which the flexible display is extended, based on a value obtained by the at least one sensor, and displays a screen different from the first screen on the second region and/or the third region, based on the determination.

According to the embodiments of the disclosure, a larger-area screen may be provided to a user through the display extendable in the opposite directions.

According to the embodiments of the disclosure, safety and user convenience may be improved by preventing unintended extension of the electronic device or assisting with easy extension of the electronic device.

According to the embodiments of the disclosure, user convenience may be improved by effectively displaying and transferring information desired by a user depending on a change in the size of the screen area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
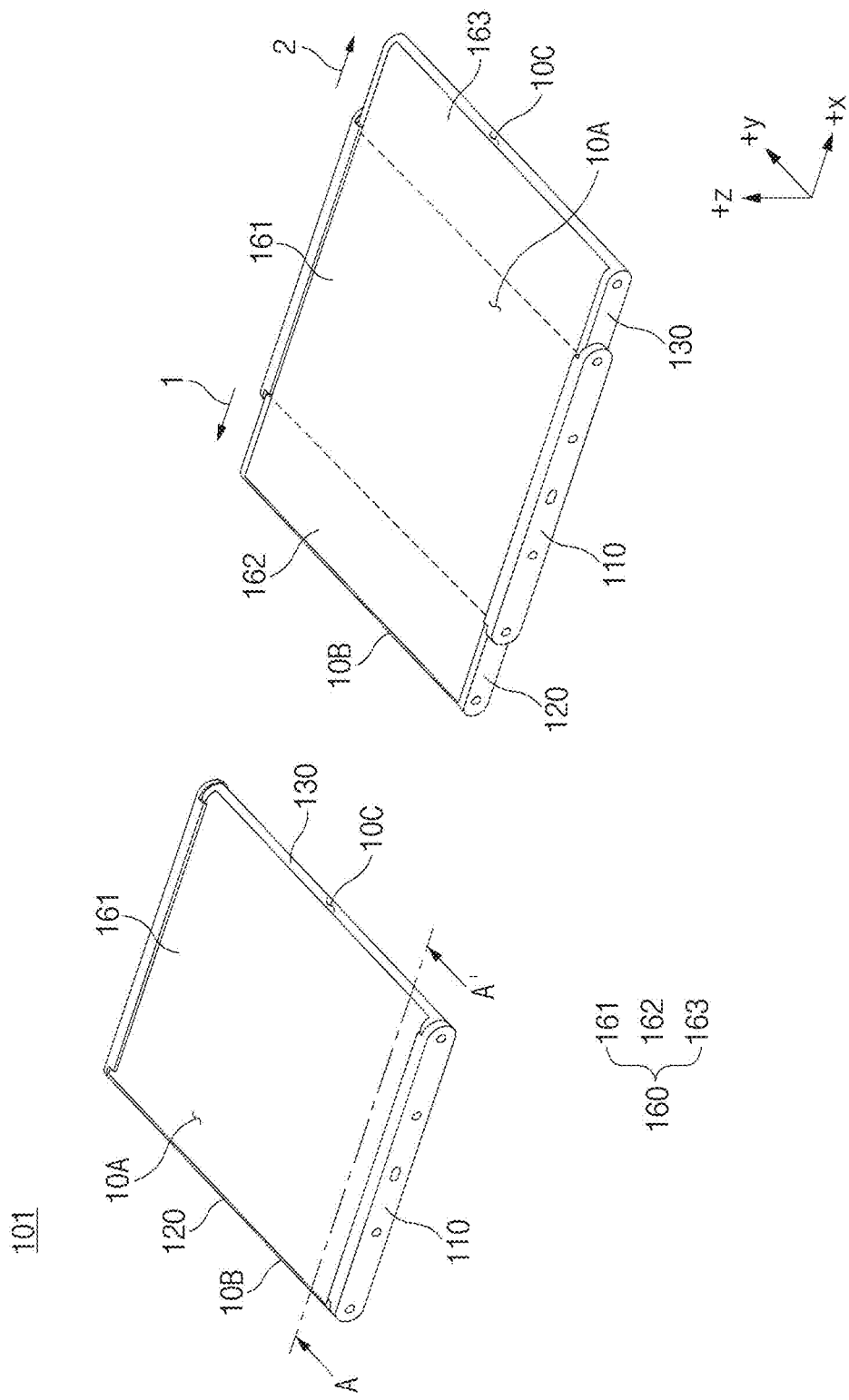
FIG. 1 is a perspective view illustrating an electronic device according to an embodiment of the disclosure.

FIG. 1 is a perspective view illustrating an electronic device according to an embodiment of the disclosure.

Referring to FIG. 1, the electronic device 101 according to an embodiment (e.g., an electronic device 3201 of FIG. 32) may include a first housing (or, a first housing structure) 110, a second housing (or, a second housing structure) 120, a third housing (or, a third housing structure) 130, and a display (or, a flexible display or a rollable display) 160.

In an embodiment of the disclosure, at least a portion of the second housing 120 may be disposed in the first housing 110. In an embodiment of the disclosure, the second housing 120 may at least partially overlap the first housing 110. In an embodiment of the disclosure, the second housing 120 may be coupled to the first housing 110 such that at least a portion is movable to the outside of the first housing 110. For example, the second housing 120 may be coupled to the first housing 110 so as to be movable in a direction away from the center of the first housing 110. For example, the second housing 120 may be coupled to the first housing 110 so as to be movable in a first direction 1. The first direction 1 may be, for example, a direction in which a first side surface 10B of the electronic device 101 formed by the second housing 120 faces. In an embodiment of the disclosure, the second housing 120 may move in the first direction 1 or the direction opposite to the first direction 1. For example, the second housing 120 may reciprocate in the −x direction or the +x direction.

In an embodiment of the disclosure, at least a portion of the third housing 130 may be disposed in the first housing 110. In an embodiment of the disclosure, the third housing 130 may at least partially overlap the first housing 110. In an embodiment of the disclosure, the third housing 130 may be coupled to the first housing 110 such that at least a portion is movable to the outside of the first housing 110. For example, the third housing 130 may be coupled to the first housing 110 so as to be movable in a direction away from the center of the first housing 110. For example, the third housing 130 may be coupled to the first housing 110 so as to be movable in a second direction 2. The second direction 2 may be, for example, a direction in which a second side surface 10C of the electronic device 101 formed by the third housing 130 faces. In an embodiment of the disclosure, the third housing 130 may move in the second direction 2 or the direction opposite to the second direction 2. For example, the third housing 130 may reciprocate in the −x direction or the +x direction.

In an embodiment of the disclosure, the display 160 (e.g., a display module 3260 of FIG. 32) may be provided in a form in which at least a portion (e.g., a second region 162 and a third region 163) is flexible. According to an embodiment of the disclosure, the display 160 may include a panel layer that has a plurality of pixels disposed therein in a matrix form and that displays a screen and an external protective layer disposed on the panel layer. The external protective layer may be formed of a polymer structure (e.g., polyimide) and/or glass. The external protective layer may be formed to be substantially transparent such that light emitted from the panel layer is visible to a user. Additionally, the display 160 may include a touch panel layer (e.g., touch circuitry 3350 of FIG. 33).

In an embodiment of the disclosure, the display 160 may include a first region 161, the second region 162, and the third region 163. In an embodiment of the disclosure, the first region 161 of the display 160 may be located between the second region 162 and the third region 163 and may extend from the second region 162 to the third region 163.

In an embodiment of the disclosure, the display 160 may be disposed on the first housing 110, the second housing 120, and the third housing 130. In an embodiment of the disclosure, the first region 161 of the display 160 may be at least partially accommodated in a space formed by the first housing 110. In an embodiment of the disclosure, the first region 161 of the display 160 disposed in the first housing 110 may form a front surface (or, a first surface) 10A of the electronic device 101.

In an embodiment of the disclosure, the second region 162 of the display 160 may extend from the first region 161. For example, the second region 162 of the display 160 may extend from one side of the first region 161. For example, the second region 162 of the display 160 may extend from the first region 161 in the first direction 1 (e.g., the −x direction). In an embodiment of the disclosure, the second region 162 of the display 160 may extend from the first region 161 into the second housing 120.

In an embodiment of the disclosure, at least a portion of the second region 162 of the display 160 may be disposed in the second housing 120. In an embodiment of the disclosure, the second region 162 of the display 160 at least partially disposed in the second housing 120 may not be exposed outside the electronic device 101. In an embodiment of the disclosure, when the second housing 120 moves in the first direction 1, at least a portion of the second region 162 located in the second housing 120 may be exposed to the outside. In an embodiment of the disclosure, the second region 162 of the display 160 exposed outside the electronic device 101 depending on the movement of the second housing 120 may form the front surface 10A of the electronic device 101 together with the first region 161. In an embodiment of the disclosure, the front surface 10A of the electronic device 101 formed by the display 160 may be extended (e.g., the area of the front surface 10A may be increased) depending on the movement of the second housing 120.

In an embodiment of the disclosure, the third region 163 of the display 160 may extend from the first region 161. For example, the third region 163 of the display 160 may extend from an opposite side of the first region 161. For example, the third region 163 of the display 160 may extend from the first region 161 in the second direction 2 (e.g., the +x direction). In an embodiment of the disclosure, the third region 163 of the display 160 may extend from the first region 161 into the third housing 130.

In an embodiment of the disclosure, at least a portion of the third region 163 of the display 160 may be disposed in the third housing 130. In an embodiment of the disclosure, the third region 163 of the display 160 at least partially disposed in the third housing 130 may not be exposed outside the electronic device 101. In an embodiment of the disclosure, when the third housing 130 moves in the second direction 2, at least a portion of the third region 163 located in the third housing 130 may be exposed to the outside. In an embodiment of the disclosure, the third region 163 of the display 160 exposed outside the electronic device 101 depending on the movement of the third housing 130 may form the front surface 10A of the electronic device 101 together with the first region 161. In an embodiment of the disclosure, the front surface 10A of the electronic device 101 formed by the display 160 may be extended depending on the movement of the third housing 130.

In an embodiment of the disclosure, when the second housing 120 and the third housing 130 move in the first direction 1 and the second direction 2, the second region 162 and the third region 163 of the display 160 may form the front surface 10A of the electronic device 101 together with the first region 161. In an embodiment of the disclosure, the front surface 10A of the electronic device 101 formed by the display 160 may be extended depending on movement of the second housing 120 and the third housing 130. In an embodiment of the disclosure, the extended front surface 10A of the electronic device 101 may be reduced depending on movement of the second housing 120 and/or the third housing 130.

Figure 2:
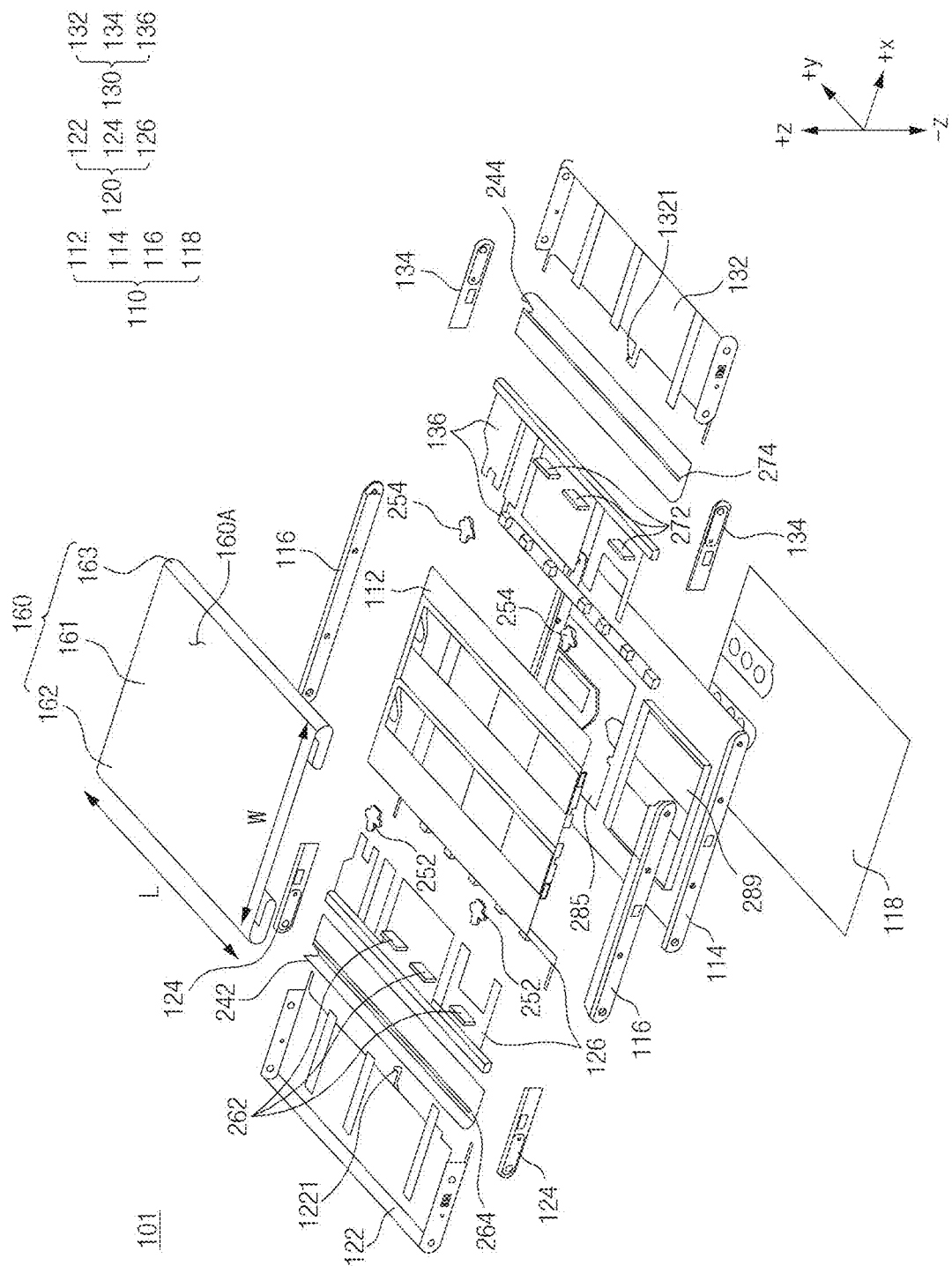
FIG. 2 is an exploded perspective view of an electronic device according to an embodiment of the disclosure.

FIG. 2 is an exploded perspective view of the electronic device according to an embodiment of the disclosure.

Referring to FIG. 2, repetitive descriptions of components having the same reference numerals as those illustrated in FIG. 1 will be omitted.

Figure 32:
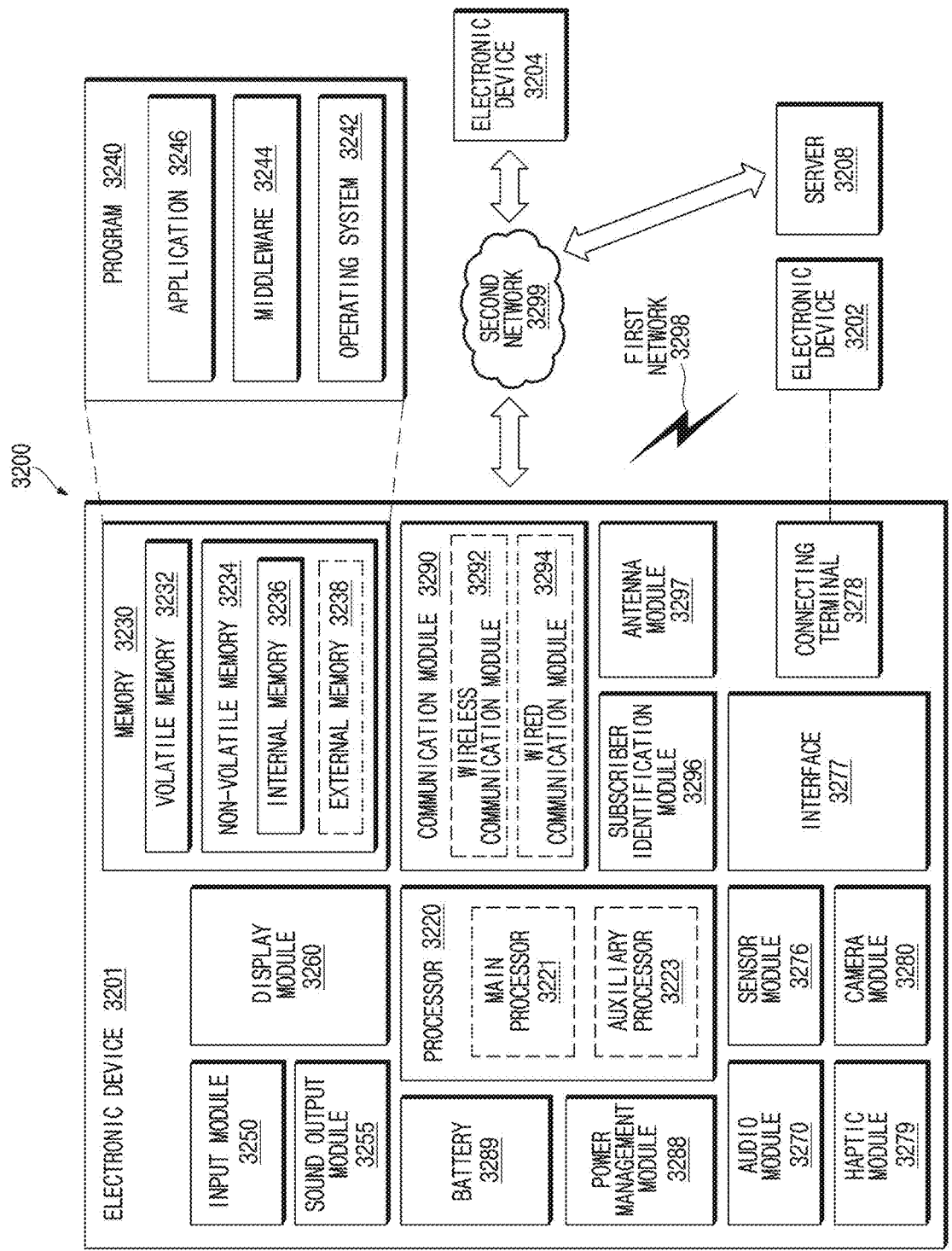
FIG. 32 is a block diagram of an electronic device in a network environment according to an embodiment of the disclosure.

Referring to FIG. 2, the electronic device 101 according to an embodiment may include a printed circuit board (PCB) 285 and a battery 289 (e.g., a battery 3289 of FIG. 32).

In an embodiment of the disclosure, at least one of a processor (e.g., a processor 3220 of FIG. 32), a memory (e.g., a memory 3230 of FIG. 32), or an interface (e.g., an interface 3277 of FIG. 32) may be mounted on the PCB 285. The processor may include, for example, at least one of a central processing unit, an application processor, a graphic processing unit, an image signal processor, a sensor hub processor, or a communication processor. The memory may include, for example, at least one of a volatile memory or a non-volatile memory. The interface may include, for example, at least one of a high definition multimedia interface (HDMI), a universal serial bus (USB) interface, a secure digital (SD) card interface, or an audio interface. For example, the interface may electrically or physically connect the electronic device 101 with an external electronic device and may include at least one of a USB connector, an SD card/multimedia card (MMC) connector, or an audio connector. In another example, at least one of the components of the electronic device 3201 illustrated in FIG. 31 may be disposed on the PCB 285.

In an embodiment of the disclosure, the battery 289, which is a device for supplying power to at least one component of the electronic device 101, may include, for example, a primary cell that is not rechargeable, a secondary cell that is rechargeable, or a fuel cell. At least a portion of the battery 289, for example, may be disposed on substantially the same plane as the PCB 285. The battery 289 may be integrally disposed inside the electronic device 101, or may be disposed so as to be detachable from the electronic device 101.

In an embodiment of the disclosure, the electronic device 101 may include a first support structure 242 and a second support structure 244 that are disposed under the display 160.

In an embodiment of the disclosure, the first support structure 242 may be disposed on a rear surface of the second region 162 of the display 160 (e.g., a surface facing away from a front surface 160A). In an embodiment of the disclosure, the first support structure 242 may be disposed on the rear surface of the second region 162 of the display 160 through an adhesive member (e.g., a double-sided tape).

In an embodiment of the disclosure, the first support structure 242 may include a first plurality of bars. The first plurality of bars may extend in a lengthwise direction L of the display 160 (e.g., the y-axis direction) and may be arranged in a width direction W of the display 160 (e.g., the x-axis direction). The first plurality of bars may be coupled to operate in conjunction with each other such that each of the first plurality of bars is rotatable relative to an adjacent bar in a specified angle range. In an embodiment of the disclosure, the first support structure 242 may be bent depending on a rotation angle provided by the first plurality of bars. In an embodiment of the disclosure, the first support structure 242 may be referred to as a first multi-bar 242 in that the first support structure 242 includes the plurality of bars. However, the first support structure 242 is not necessarily limited to including the plurality of bars. The first support structure 242 may include various structures (e.g., a lattice structure) that are at least partially bendable while supporting the display 160.

In an embodiment of the disclosure, the second support structure 244 may be disposed on a rear surface of the third region 163 of the display 160. In an embodiment of the disclosure, the second support structure 244 may be disposed on the rear surface of the third region 163 of the display 160 through an adhesive member (e.g., a double-sided tape).

In an embodiment of the disclosure, the second support structure 244 may include a second plurality of bars. The second plurality of bars may extend in the lengthwise direction L of the display 160 (e.g., the y-axis direction) and may be arranged in the width direction W of the display 160 (e.g., the x-axis direction). The second plurality of bars may be coupled to operate in conjunction with each other such that each of the second plurality of bars is rotatable relative to an adjacent bar in a specified angle range. In an embodiment of the disclosure, the second support structure 244 may be bent depending on a rotation angle provided by the second plurality of bars. In an embodiment of the disclosure, the second support structure 244 may be referred to as a second multi-bar 244 in that the second support structure 244 includes the plurality of bars. However, the second support structure 244 is not necessarily limited to including the plurality of bars. The second support structure 244 may include various structures (e.g., a lattice structure) that are at least partially bendable while supporting the display 160.

In an embodiment of the disclosure, the first support structure 242 and/or the second support structure 244 may be formed of metal, but is not limited thereto.

The first housing 110 of the electronic device 101 according to an embodiment may include a first support member (or, a front case) 112, a second support member (or, a rear case) 114, side members 116, and a back plate (or, a rear window) 118.

In an embodiment of the disclosure, the first support member 112 may be substantially formed in a plate shape and may be disposed under the display 160 (e.g., in the −z direction). In an embodiment of the disclosure, the display 160 may be partially disposed on the first support member 112. For example, the first region 161 of the display 160 may be disposed on the first support member 112. In an embodiment of the disclosure, at least a portion of the first region 161 of the display 160 may be attached to the first support member 112 through an adhesive member (e.g., a double-sided tape). In an embodiment of the disclosure, the first support member 112 may be formed of a metallic material and/or a non-metallic material (e.g., a polymer) and may have a stiffness required to support the display 160.

In an embodiment of the disclosure, the second support member 114 may be disposed between the first support member 112 and the back plate 118. In an embodiment of the disclosure, the PCB 285 and the battery 289 may be disposed on one surface (e.g., a surface facing in the +z direction) of the second support member 114, and the back plate 118 may be disposed on an opposite surface (e.g., a surface facing away from the one surface) of the second support member 114. In an embodiment of the disclosure, the second support member 114 may support the PCB 285, the battery 289, and the back plate 118. In an embodiment of the disclosure, the second support member 114 may be formed of a metallic material and/or a nonmetallic material (e.g., a polymer).

In an embodiment of the disclosure, the back plate 118 may be disposed under the second support member 114 (e.g., in the −z direction). In an embodiment of the disclosure, the back plate 118 may be coupled with the second support member 114. In an embodiment of the disclosure, a partial region of the back plate 118 may be formed to be substantially transparent. In an embodiment of the disclosure, the back plate 118 may be formed of a metallic material and/or a nonmetallic material (e.g., a polymer and/or glass).

In an embodiment of the disclosure, the side members 116 may be disposed on opposite sides of the second support member 114. For example, the side members 116 may be disposed in the +y direction and the −y direction from the second support member 114. In an embodiment of the disclosure, the side members 116 may be coupled with the second support member. In an embodiment of the disclosure, the side members 116 may be formed of a metallic material and/or a nonmetallic material (e.g., a polymer).

The second housing 120 according to an embodiment of the disclosure may include a first cover 122, a first panel support member 126, and first guide members 124.

In an embodiment of the disclosure, the first cover 122 may form at least a portion of the exterior of the second housing 120. In an embodiment of the disclosure, the first cover 122 may form the first side surface of the electronic device 101 (e.g., the first side surface 10B of FIG. 1). In an embodiment of the disclosure, the first cover 122 may be coupled with the first housing 110. For example, the first cover 122 may be coupled with the side members 116 and/or the second support member 114 of the first housing 110. In an embodiment of the disclosure, the first cover 122 may be coupled to the first housing 110 to slide relative to the first housing 110. For example, for the sliding of the first cover 122, a protrusion 1221 having a step formed on an end portion thereof may be formed on the first cover 122. For reciprocation, the first protrusion 1221 of the first cover 122 may be at least partially accommodated in a receiving recess (not illustrated) formed by the side members 116 and/or the second support member 114 of the housing 110. The first cover 122 may reciprocate along the receiving space. Although not illustrated, a stopping structure corresponding to the step formed on the end portion of the first protrusion 1221 may be formed on the side members 116 and/or the second support member 114 of the first housing 110 to limit a moving distance of the second housing 120 or prevent separation of the second housing 120 from the first housing 110. The above description may be substantially identically, similarly, or correspondingly applied to a second cover 132 and a second protrusion 1321 of the second cover 132. However, a structure for reciprocation of the first cover 122 and the second cover 132 is not limited by the above-described example, and various structures available to those skilled in the art may be applied.

In an embodiment of the disclosure, the first guide members 124 may be disposed on opposite sides of the first panel support member 126. For example, the first guide members 124 may be disposed in the +y direction and the −y direction of the first panel support member 126. In an embodiment of the disclosure, the first guide members 124 may be coupled with the first panel support member 126 and the first cover 122. In an embodiment of the disclosure, the first guide members 124 may be fixedly disposed in the first cover 122 and may move together with the first cover 122.

In an embodiment of the disclosure, the first panel support member 126 may be disposed in the second housing 120. For example, the first panel support member 126 may be disposed in a space formed by the first cover 122. In an embodiment of the disclosure, the first panel support member 126 may be coupled with the first cover 122 with the first guide members 124 therebetween. In an embodiment of the disclosure, the first panel support member 126 may be fixedly disposed in the first cover 122 and may move together with the first cover 122. In an embodiment of the disclosure, the first panel support member 126 may support the display 160 and the first support structure 242. In an embodiment of the disclosure, the first support structure 242 and the second region 162 of the display 160 may be disposed to at least partially surround the first panel support member 126.

The third housing 130 according to an embodiment may include the second cover 132, a second panel support member 136, and second guide members 134.

In an embodiment of the disclosure, the above descriptions of the first cover 122, the first panel support member 126, and the first guide members 124 of the second housing 120 may be correspondingly applied to the second cover 132, the second panel support member 136, and the second guide members 134 of the third housing 130. For example, the second cover 132 may form the second side surface of the electronic device 101 (e.g., the second side surface 10C of FIG. 1). For example, the second cover 132 may be coupled to the first housing 110 so as to slide. For example, the second panel support member 136 may be coupled with the second cover 132 with the second guide members 134 therebetween. For example, the second panel support member 136 and the second guide members 134 may move together with the second cover 132.

The electronic device 101 according to an embodiment may include a first actuator 252 and a second actuator 254. In an embodiment of the disclosure, the first actuator 252 and the second actuator 254 may be disposed on the first support member 112. In an embodiment of the disclosure, the first actuator 252 may be disposed on the first support member 112 so as to be adjacent to the second housing 120 and may provide, to the second housing 120, a physical force for supporting movement. In an embodiment of the disclosure, the second actuator 254 may be disposed on the first support member 112 so as to be adjacent to the third housing 130 and may provide, to the third housing 130, a physical force for supporting movement.

In an embodiment of the disclosure, various types of driving devices available to those skilled in the art may be applied to the first actuator 252 and the second actuator 254. For example, the first actuator 252 and/or the second actuator 254 may include an electric actuator or a piezoelectric actuator capable of a linear motion in the width direction W of the display 160, but is not limited thereto.

In an embodiment of the disclosure, two first actuators 252 and two second actuators 254 are illustrated in FIG. 2. However, the number of first actuators 252 and the number of second actuators 254 are not limited by the illustrated example. For example, one first actuator 252 and/or one second actuator 254 may be provided, and in another example, three or more first actuators 252 and/or three or more second actuators 254 may be provided.

The electronic device 101 according to an embodiment may include a first variable magnet member 262 and a first magnet member 264. In an embodiment of the disclosure, an attractive or repulsive force may act between the first variable magnet member 262 and the first magnet member 264. In an embodiment of the disclosure, the first variable magnet member 262 may be disposed on the first panel support member 126, and the first magnet member 264 may be disposed at one end of the first support structure 242. In an embodiment of the disclosure, the first magnet member 264 may have a bar shape extending in the lengthwise direction L, but is not limited thereto. For example, the first magnet member 264 may be segmented into a plurality of pieces and may be coupled with the first support structure 242. In this case, for example, a striker member 960 illustrated in FIG. 9 may be disposed in a space formed by the segmentation of the first magnet member 264.

In an embodiment of the disclosure, a plurality of first variable magnet members 262 may be formed. In this case, the first variable magnet members 262 may be arranged at predetermined intervals in a lengthwise direction of the first magnet member 264 (e.g., a direction parallel to the lengthwise direction L). Unlike that illustrated in FIG. 2, one first variable magnet member 262 may be formed. In this case, the first variable magnet member 262 may have substantially the same length as the first magnet member 264. In another embodiment of the disclosure, the number and/or shape of first variable magnet members 262 may vary depending on a required attractive or repulsive force with the first magnet member 264.

The electronic device 101 according to an embodiment may include a second variable magnet member 272 and a second magnet member 274. The above descriptions of the first variable magnet member 262 and the first magnet member 264 may be substantially identically, similarly, or correspondingly applied to the second variable magnet member 272 and the second magnet member 274. For example, the second variable magnet member 272 may be disposed on the second panel support member 136, and the second magnet member 274 may be disposed at one end of the second support structure 244. For example, an attractive or repulsive force may act between the second variable magnet member 272 and the second magnet member 274. For example, the second magnet member 274 may have a bar shape extending in the lengthwise direction L. For example, similarly to the first variable magnet member 262, the number and/or shape of second variable magnet members 272 may vary depending on a required attractive or repulsive force with the second magnet member 274.

Figure 3A:
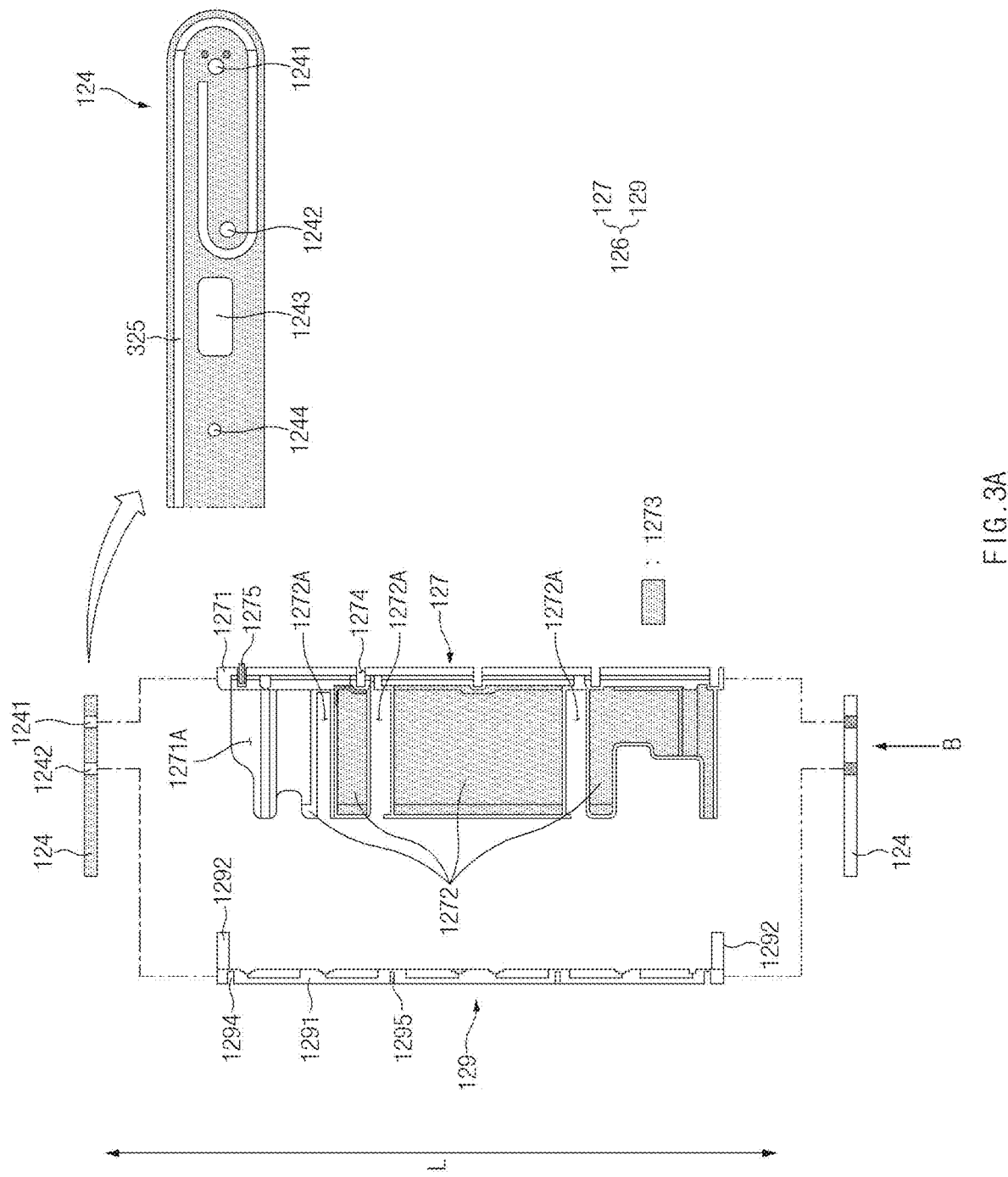
FIG. 3A illustrates first guide members and a first panel support member according to an embodiment of the disclosure.

FIG. 3A illustrates the first guide members and the first panel support member according to an embodiment of the disclosure. A lengthwise direction L illustrated in FIG. 3A may be a direction parallel to the lengthwise direction L of the display 160 illustrated in FIG. 2.

Figure 3B:
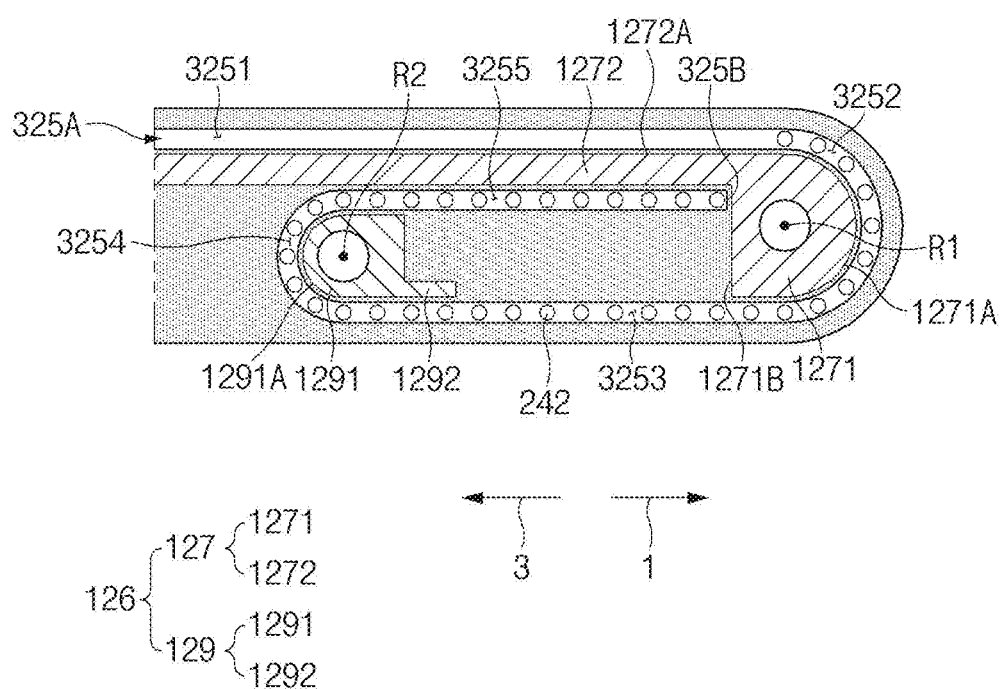
FIG. 3B is a projection view when a first guide members and a first panel support member of FIG. 3A are viewed in a direction B according to an embodiment of the disclosure.

FIG. 3B is a projection view when the first guide members and the first panel support member of FIG. 3A are viewed in a direction B. For convenience of description, the first support structure 242 accommodated in a guide rail 325 of the first guide member 124 is illustrated together in FIG. 3B according to an embodiment of the disclosure.

Referring to FIGS. 3A and 3B, the first panel support member 126 according to an embodiment may include a first member 127 and a second member 129.

In an embodiment of the disclosure, the first member 127 of the first panel support member 126 may include a first roll bar 1271 and a first extension 1272. In an embodiment of the disclosure, the first roll bar 1271 may extend in the lengthwise direction L. For example, the first roll bar 1271 may extend in a direction perpendicular to the first direction 1 of FIG. 1. In an embodiment of the disclosure, at least a portion of the first roll bar 1271 may be formed of a curved surface. For example, a section of the first roll bar 1271 taken in a direction perpendicular to the lengthwise direction L may include a curved surface. For example, the first roll bar 1271 may include a curved surface 1271A facing toward the first side surface of the electronic device 101 (e.g., the first side surface 10B of FIG. 1).

In an embodiment of the disclosure, the first guide members 124 may be disposed on opposite sides of the first roll bar 1271. For example, the first guide members 124 may be disposed at opposite ends of the first roll bar 1271 with respect to the lengthwise direction L. In an embodiment of the disclosure, screws (not illustrated) that pass through first fastening holes 1241 may be fastened to the first roll bar 1271 to couple the first roll bar 1271 and the first guide members 124. However, the disclosure is not limited thereto.

In an embodiment of the disclosure, the first extension 1272 may extend from the first roll bar 1271 in a direction toward the second member 129 (e.g., the direction opposite to the first direction 1 of FIG. 1). For example, the first extension 1272 may extend from the first roll bar 1271 in a direction (e.g., the second direction 2) toward the third housing (e.g., the third housing 130 of FIG. 2). In an embodiment of the disclosure, the first extension 1272 may have a plate shape extending in the direction perpendicular to the lengthwise direction L (e.g., the width direction W of FIG. 2). In an embodiment of the disclosure, the first extension 1272 may have slits 1272A formed therein for preventing interference of movement of the second housing (e.g., the second housing 120 of FIG. 2).

In an embodiment of the disclosure, the first extension 1272 may overlap the second member 129. For example, the first extension 1272 may include a first portion extending from the first roll bar 1271 to a second roll bar 1291 to overlap the second member 129 and a second portion extending from the first portion toward the third housing beyond the second roll bar 1291.

In an embodiment of the disclosure, the second member 129 disposed under the first extension 1272 may include the second roll bar 1291 and a second extension 1292. In an embodiment of the disclosure, the second roll bar 1291 substantially parallel to the first member 127 may extend in the lengthwise direction L. For example, the second roll bar 1291 may extend in a direction perpendicular to the width direction W of FIG. 2. For example, the second roll bar 1291 may extend in a direction perpendicular to the first direction 1 of FIG. 1.

In an embodiment of the disclosure, at least a portion of the second roll bar 1291 may be formed of a curved surface. In an embodiment of the disclosure, a section of the second roll bar 1291 taken in the direction perpendicular to the lengthwise direction L may include a curved surface. For example, the second roll bar 1291 may include a curved surface 1291A facing toward the second side surface of the electronic device 101 (e.g., the second side surface 10C of FIG. 1). In another example, the second roll bar 1291 may include the curved surface 1291A facing toward the third housing. In an embodiment of the disclosure, the curved surface 1291A of the second roll bar 1291 may have a smaller radius of curvature than the curved surface 1271A of the first roll bar 1271.

In an embodiment of the disclosure, the first guide members 124 may be disposed on opposite sides of the second roll bar 1291. For example, the first guide members 124 may be disposed at opposite ends of the second roll bar 1291 with respect to the lengthwise direction L. In an embodiment of the disclosure, screws (not illustrated) that pass through second fastening holes 1242 may be fastened to the second roll bar 1291 to couple the second roll bar 1291 and the first guide members 124. However, the disclosure is not limited thereto.

In an embodiment of the disclosure, the second extension 1292 of the second member 129 may extend from the second roll bar 1291. For example, the second extension 1292 may extend from the second roll bar 1291 toward the first roll bar 1271. In an embodiment of the disclosure, the second extension 1292 may extend at a height lower than the height of the first extension 1272 in the second housing (e.g., the second housing 120 of FIG. 2). For example, under the first extension 1272, the second extension 1292 may extend in a direction (e.g., the first direction 1) away from the first housing (e.g., the first housing 110 of FIG. 2). In an embodiment of the disclosure, the second extension 1292 may be substantially parallel to the first extension 1272.

In an embodiment of the disclosure, each of the first guide members 124 may have openings 1243 and 1244 formed therein. For example, a receptacle of a non-illustrated connector may be disposed in the opening 1243. For example, the opening 1244 may be a microphone hole of a non-illustrated speaker module (e.g., an audio module 3270 of FIG. 32). However, the disclosure is not limited by the above example.

In an embodiment of the disclosure, the first guide member 124 may have the guide rail 325 formed therein in which the first support structure 242 is accommodated. In an embodiment of the disclosure, the guide rail 325 may include a first section 3251, a second section 3252, a third section 3253, and a fourth section 3254.

In an embodiment of the disclosure, the first section 3251 may extend from one end 325A of the guide rail 325 to the second section 3252. In an embodiment of the disclosure, over the first extension 1272, the first section 3251 may extend along a first surface 1272A of the first extension 1272. In an embodiment of the disclosure, the first section 3251 may be parallel to the first extension 1272. In an embodiment of the disclosure, the first section 3251 may be formed substantially straight.

In an embodiment of the disclosure, the second section 3252 may extend from the first section 3251 to the third section 3253. In an embodiment of the disclosure, the second section 3252 may extend around the first roll bar 1271 along the curved surface 1271A of the first roll bar 1271. For example, based on FIG. 3B, the second section 3252 may extend from the first section 3251 to the third section 3253 while being bent in the clockwise direction. In an embodiment of the disclosure, the second section 3252 may be bent to correspond to the curved surface 1271A of the first roll bar 1271.

In an embodiment of the disclosure, the third section 3253 may extend from the second section 3252 to the fourth section 3254. In an embodiment of the disclosure, under the second extension 1292, the third section 3253 may extend parallel to the first extension 1272. In an embodiment of the disclosure, the third section 3253 may be formed substantially straight.

In an embodiment of the disclosure, the fourth section 3254 may extend from the third section 3253 to a fifth section 3255. In an embodiment of the disclosure, the fourth section 3254 may extend around the second roll bar 1291 along the curved surface 1291A of the second roll bar 1291. For example, based on FIG. 3B, the fourth section 3254 may extend from the third section 3253 to the fifth section 3255 while being bent in the clockwise direction. In an embodiment of the disclosure, the fourth section 3254 may be bent to correspond to the curved surface 1291A of the second roll bar 1291.

In an embodiment of the disclosure, the fifth section 3255 may extend from the fourth section 3254 to an opposite end 325B of the guide rail 325. In an embodiment of the disclosure, the fifth section 3255 may extend from the fourth section 3254 toward the second section 3252. In an embodiment of the disclosure, under the first extension 1272, the fifth section 3255 may extend parallel to the first extension 1272. In an embodiment of the disclosure, the fifth section 3255 may be located between the first extension 1272 and the second roll bar 1291 (or, the second extension 1292). In an embodiment of the disclosure, the fifth section 3255 may be located between the first section 3251 and the third section 3253.

In an embodiment of the disclosure, the first support structure 242 may move along a path provided by the guide rail 325 of the first guide member 124 and the first panel support member 126. In an embodiment of the disclosure, the first support structure 242 may perform a sliding motion along a circumferential surface of the first panel support member 126 (e.g., the first surface 1272A of the first extension 1272, the curved surface 1271A of the first roll bar 1271, and the curved surface 1291A of the second roll bar 1291) while being guided along the path of the guide rail 325. In an embodiment of the disclosure, the first support structure 242 may move toward the one end 325A or the opposite end 325B of the guide rail 325 along the path of the guide rail 325.

In an embodiment of the disclosure, the guide rail 325 may have a shape bent about at least two axes. For example, the second section 3252 of the guide rail 325 may be bent about a first axis R1, and the fourth section 3254 may be bent about a second axis R2. Correspondingly, the first panel support member 126 may include a curved surface bent about the at least two axes. For example, the first panel support member 126 may include the curved surface 1271A of the first roll bar 1271 bent about the first axis R1 and the curved surface 1291A of the second roll bar 1291 bent about the second axis R2. In an embodiment of the disclosure, the curved surface 1271A of the first roll bar 1271 and the curved surface 1291A of the second roll bar 1291 may face away from each other.

In an embodiment of the disclosure, the first support structure 242 that is accommodated in the guide rail 325 and that at least partially surrounds the first panel support member 126 may also have a bent or unbent shape to correspond to the guide rail 325. For example, as illustrated in FIG. 3B, the first support structure 242 may have a shape bent about the first axis R1 and the second axis R2 in a state (e.g., a normal state of FIG. 4A to be described below) in which the first support structure 242 is moved to the opposite end 325B of the guide rail 325. For example, in the state in which the first support structure 242 is moved to the opposite end 325B of the guide rail 325, the first support structure 242 may include a portion corresponding to the second section 3252 of the guide rail 325, a portion corresponding to the third section 3253 of the guide rail 325, a portion corresponding to the fourth section 3254 of the guide rail 325, and a portion corresponding to the fifth section 3255 of the guide rail 325. Although not illustrated, the first region (e.g., the first region 161 of FIG. 2) of the display (e.g., the display 160 of FIG. 2) to which the first support structure 242 is attached may also include portions corresponding to the second section 3252, the third section 3253, the fourth section 3254, and the fifth section 3255 of the guide rail 325, respectively, in the state in which the first support structure 242 is moved to the opposite end 325B of the guide rail 325.

In an embodiment of the disclosure, the guide rail 325 may be formed to be a groove and/or an opening. In an embodiment of the disclosure, the one end 325A of the guide rail 325 is illustrated as being open, but is not limited thereto. For example, the one end 325A of the guide rail 325 may be closed to limit movement of the first structure 242 to the one end 325A.

In an embodiment of the disclosure, a sliding member 1273 for reducing a frictional force with the first support structure 242 may be disposed on at least a portion of the first surface 1272A of the first extension 1272. In an embodiment of the disclosure, the sliding member 1273 may include, for example, a tape (e.g., a Teflon tape) and/or a coating layer that has a lower coefficient of friction than the first extension 1272.

In an embodiment of the disclosure, at least one first groove 1274 may be formed on the first roll bar 1271. In an embodiment of the disclosure, at least one first roller 1275 may be disposed in the at least one first groove 1274 to enable the first support structure 242 to easily slide along the curved surface 1271A of the first roll bar 1271. The at least one first roller 1275 may include a bearing, but is not limited thereto. In an embodiment of the disclosure, in a case in which a plurality of first grooves 1274 and a plurality of first rollers 1275 are implemented, the plurality of first grooves 1274 and the plurality of first rollers 1275 may be arranged in the lengthwise direction L of the first roll bar 1271 at specified intervals.

In an embodiment of the disclosure, at least one second groove 1294 may be formed on the second roll bar 1291. In an embodiment of the disclosure, at least one second roller 1295 may be disposed in the at least one second groove 1294 to enable the first support structure 242 to easily slide along the curved surface 1291A of the second roll bar 1291. The at least one second roller 1295 may include a bearing, but is not limited thereto. In an embodiment of the disclosure, in a case in which a plurality of second grooves 1294 and a plurality of second rollers 1295 are implemented, the plurality of second grooves 1294 and the plurality of second rollers 1295 may be arranged in the lengthwise direction L of the second roll bar 1291 at specified intervals.

In an embodiment of the disclosure, the first panel support member 126 is illustrated as being divided into the first member 127 and the second member 129, but is not limited thereto. In another embodiment of the disclosure, the first member 127 and the second member 129 may be integrally formed with each other.

The descriptions of the first guide members 124, the first panel support member 126, and the first support structure 242 of the second housing 120, which have been given with reference to FIGS. 3A and 3B, may be substantially identically, similarly, or correspondingly applied to the second guide members 134, the second panel support member 136, and the second support structure 244 of the third housing 130 that are not illustrated.

Figure 4A:
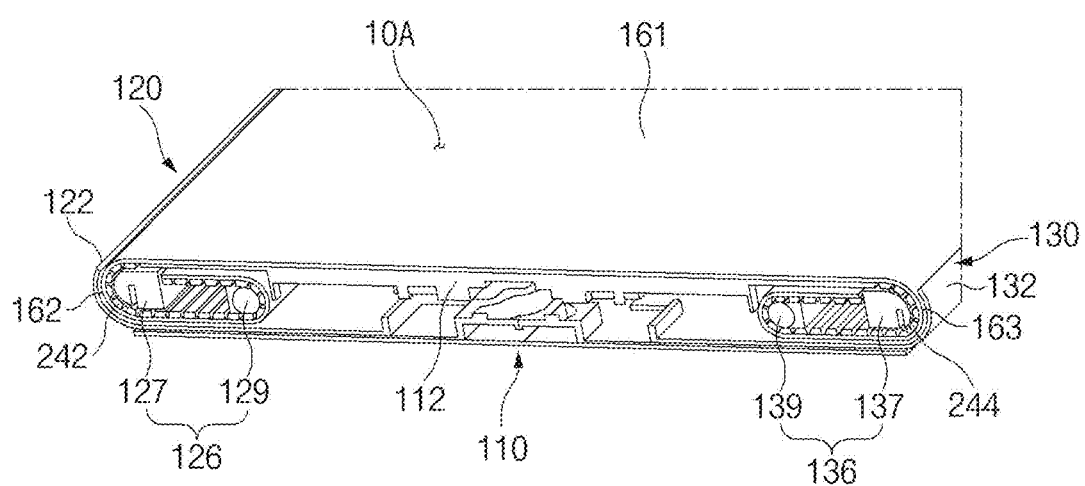
FIG. 4A illustrates an electronic device in a normal state (or, a normal mode) according to an embodiment of the disclosure.
Figure 4A:

FIG. 4A illustrates the electronic device in a normal state (or, a normal mode) according to an embodiment of the disclosure. FIG. 4A may be a sectional perspective view of the electronic device 101 of FIG. 1 taken along line A-A'.

Figure 4B:
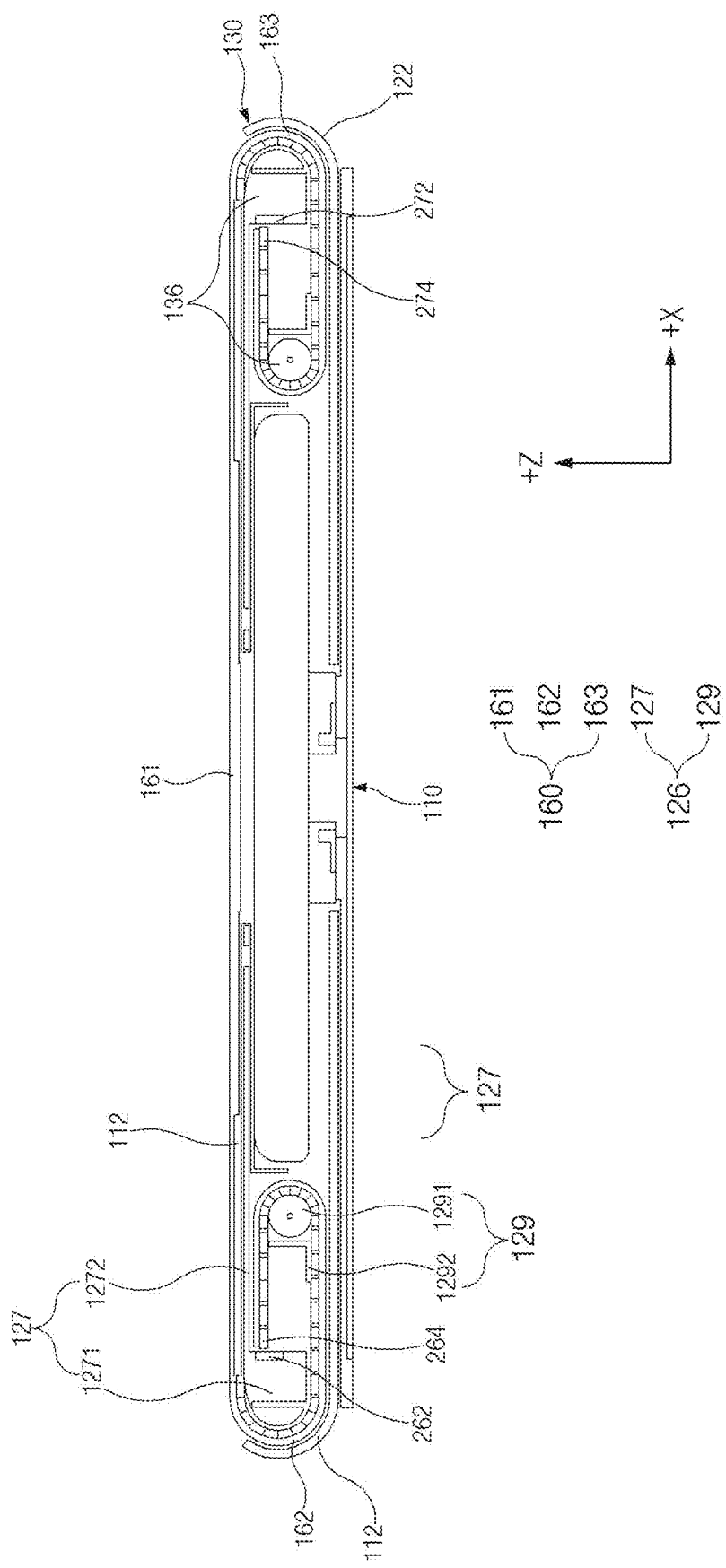
FIG. 4B is a sectional view illustrating an electronic device in a normal state according to an embodiment of the disclosure.

FIG. 4B is a sectional view illustrating the electronic device in the normal state according to an embodiment of the disclosure. FIG. 4B may be a sectional view of the electronic device 101 of FIG. 1 taken along line A-A'.

Figure 4C:
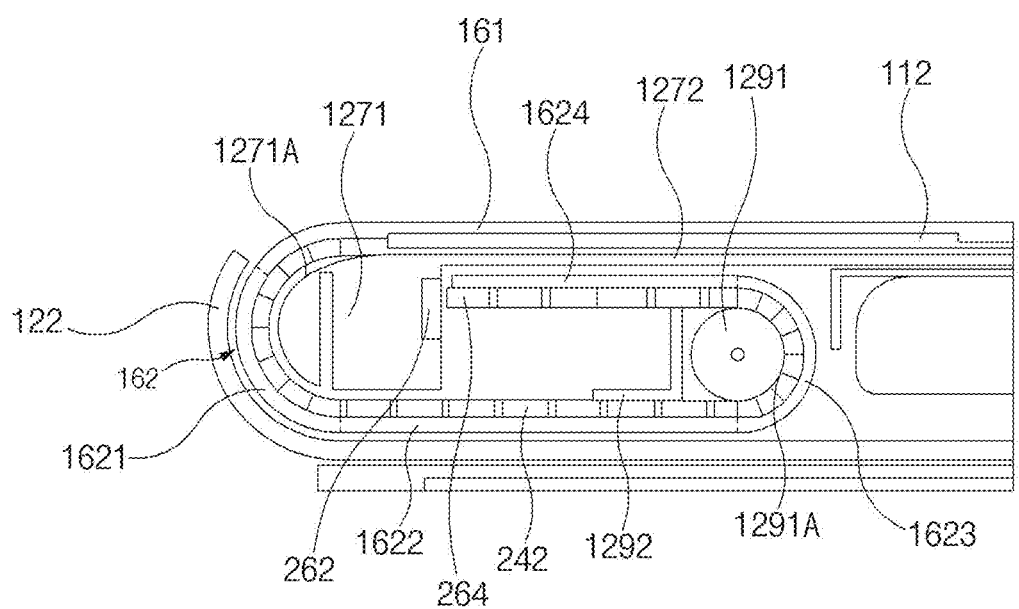
FIG. 4C is an enlarged sectional view illustrating a second housing illustrated in FIG. 4B according to an embodiment of the disclosure.

FIG. 4C is an enlarged sectional view illustrating the second housing illustrated in FIG. 4B according to an embodiment of the disclosure.

The normal state of the electronic device 101 according to an embodiment may refer to a state in which the second housing 120 and the third housing 130 of the electronic device 101 are completely slid into the first housing 110.

The normal state of the electronic device 101 according to an embodiment may refer to a state in which only the first region 161 of the display 160 is exposed outside the electronic device 101 and the second region 162 and the third region 163 of the display 160 are not exposed outside the electronic device 101.

The normal state of the electronic device 101 according to an embodiment may refer to a state in which the front surface 10A of the electronic device 101 is formed by only the first region 161 of the display 160.

The following description will be given based on the electronic device 101 in the normal state with reference to FIGS. 4A, 4B, and 4C.

Referring to FIGS. 4A, 4B, and 4C, the second panel support member 136 according to an embodiment may include a first member 137 and a second member 139 and the first region 161 of the display 160 according to an embodiment may be exposed to the outside. For example, the first region 161 of the display 160 may form the front surface 10A of the electronic device 101. In an embodiment of the disclosure, the first region 161 of the display 160 may be at least partially supported by the first support member 112. In an embodiment of the disclosure, the first region 161 supported by the first support member 112 may form a substantially flat surface.

At least a portion of the first support structure 242 according to an embodiment may be located in the second housing 120. In an embodiment of the disclosure, the first support structure 242 may be disposed in the second housing 120 to at least partially surround the first panel support member 126. In an embodiment of the disclosure, the second region 162 of the display 160 to which the first support structure 242 is attached may also be bent to correspond to the first support structure 242. In an embodiment of the disclosure, the second region 162 of the display 160 may be at least partially disposed in the second housing 120. In an embodiment of the disclosure, the second region 162 of the display 160 may include a first portion 1621 extending from the first region 161 in the counterclockwise direction (based on FIG. 4C) along the curved surface 1271A of the first roll bar 1271, a second portion 1622 extending from the first portion 1621 toward the second roll bar 1291, a third portion 1623 extending from the second portion 1622 in the counterclockwise direction (based on FIG. 4C) along the curved surface 1291A of the second roll bar 1291, and a fourth portion 1624 extending from the third portion 1623 toward the first roll bar 1271. In an embodiment of the disclosure, the second region 162 of the display 160 may overlap the first region 161. For example, the second portion 1622, the third portion 1623, and the fourth portion 1624 of the second region 162 may overlap the first region 161. In an embodiment of the disclosure, the second portion 1622 of the second region 162 may overlap the fourth portion 1624. In an embodiment of the disclosure, the first portion 1621 and the second portion 1622 of the second region 162 may be located between the first cover 122 and the first panel support member 126. In an embodiment of the disclosure, the fourth portion 1624 of the second region 162 may be located between the first extension 1272 and the second roll bar 1291. In an embodiment of the disclosure, the second region 162 of the display 160 may be hidden by the first cover 122 and may not be exposed outside the electronic device 101.

In an embodiment of the disclosure, the above descriptions of the second housing 120, the first support structure 242, and the second region 162 of the display 160 may be correspondingly applied to the third housing 130, the second support structure 244, and the third region 163 of the display 160 that are located on the opposite side with respect to the first housing 110. For example, at least a portion of the second support structure 244 may be located in the third housing 130. For example, the second support structure 244 may be disposed in the third housing 130 to at least partially surround the second panel support member 136. For example, the third region 163 of the display 160 attached with the second support structure 244 may also be bent to correspond to the second support structure 244 and may be disposed in the third housing 130. For example, the third region 163 of the display 160 may be hidden by the second cover 132 and may not be exposed outside the electronic device 101.

In an embodiment of the disclosure, when the electronic device 101 is in the normal state, the display 160 may be exposed to the outside by a first area. For example, the first area may be substantially the same as the area of the front surface 10A formed by the first region 161.

In an embodiment of the disclosure, when the electronic device 101 is in the normal state, the first variable magnet member 262 and the first magnet member 264 may face each other, and the distance therebetween may be a first distance. In an embodiment of the disclosure, when the electronic device 101 is in the normal state, the first variable magnet member 262 and the first magnet member 264 may make contact with each other, but are not limited thereto. In another embodiment of the disclosure, when the electronic device 101 is in the normal state, the first variable magnet member 262 and the first magnet member 264 may be spaced apart from each other.

In an embodiment of the disclosure, when the electronic device 101 is in the normal state, the second variable magnet member 272 and the second magnet member 274 may face each other, and the distance therebetween may be the first distance. In an embodiment of the disclosure, when the electronic device 101 is in the normal state, the second variable magnet member 272 and the second magnet member 274 may make contact with each other, but are not limited thereto. In another embodiment of the disclosure, when the electronic device 101 is in the normal state, the second variable magnet member 272 and the second magnet member 274 may be spaced apart from each other.

Figure 5A:
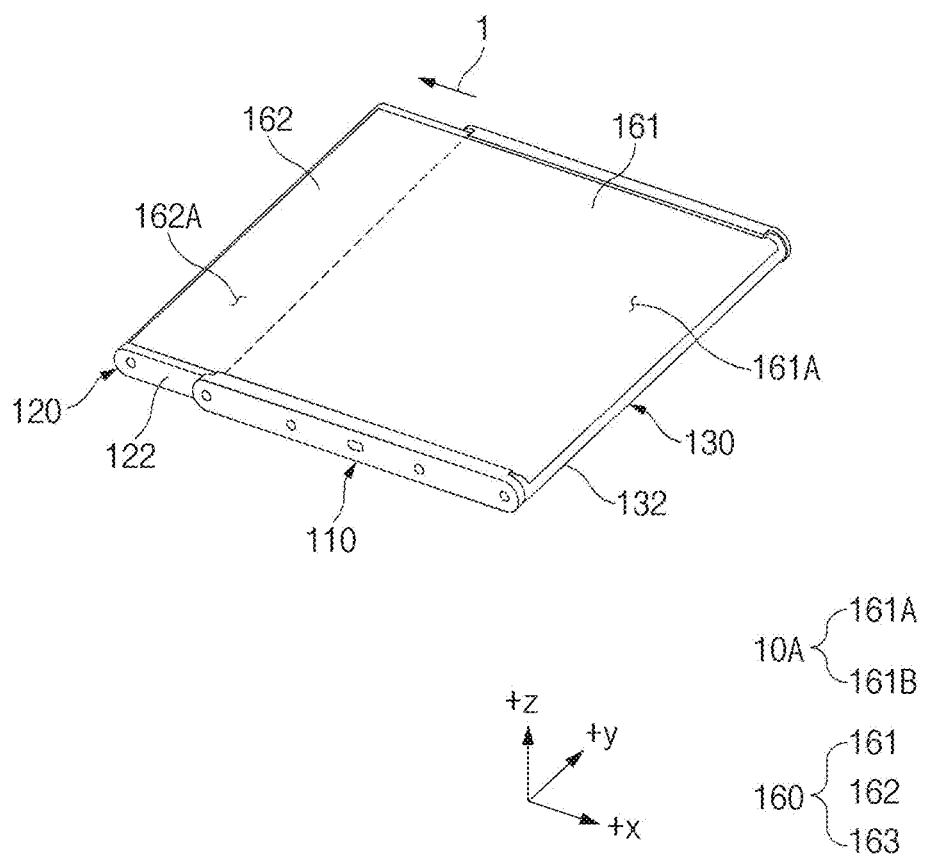
FIG. 5A is a perspective view illustrating an electronic device in a first extended state (or, a first extended mode) according to an embodiment of the disclosure.

FIG. 5A is a perspective view illustrating the electronic device in a first extended state (or, a first extended mode) according to an embodiment of the disclosure.

Figure 5B:
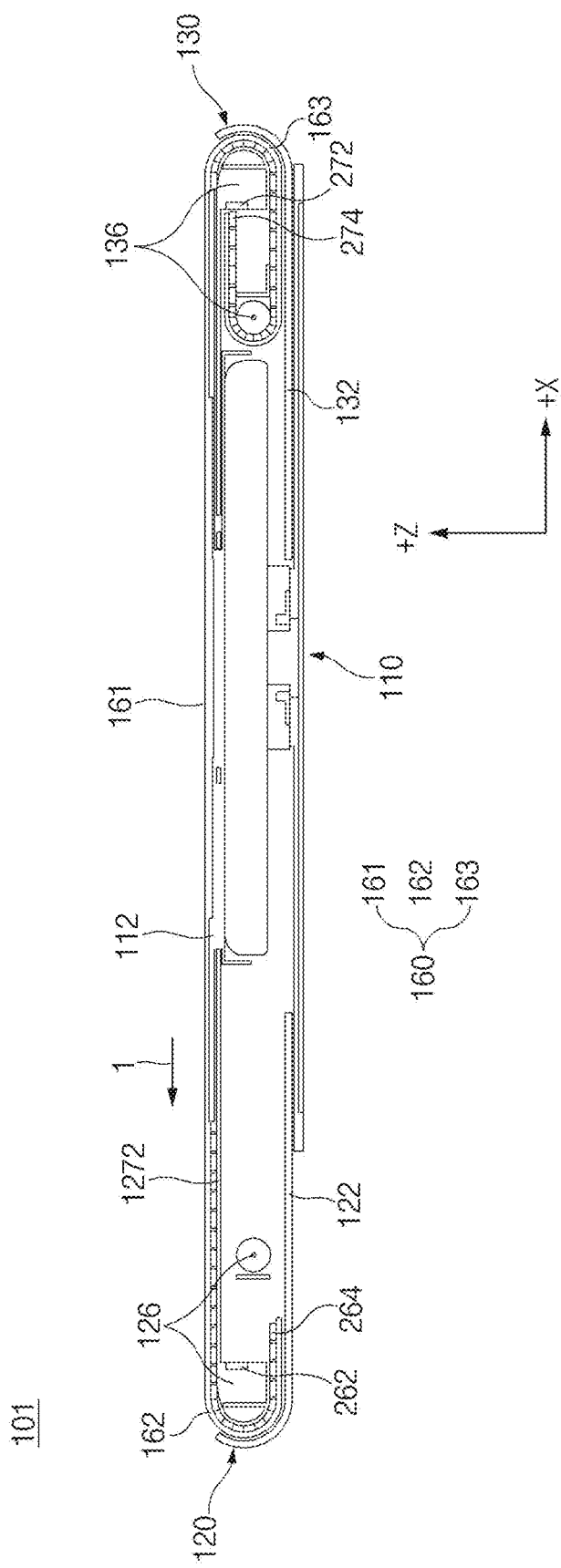
FIG. 5B is a sectional view illustrating an electronic device in a first extended state according to an embodiment of the disclosure.

FIG. 5B is a sectional view illustrating the electronic device in the first extended state according to an embodiment of the disclosure.

Figure 5C:
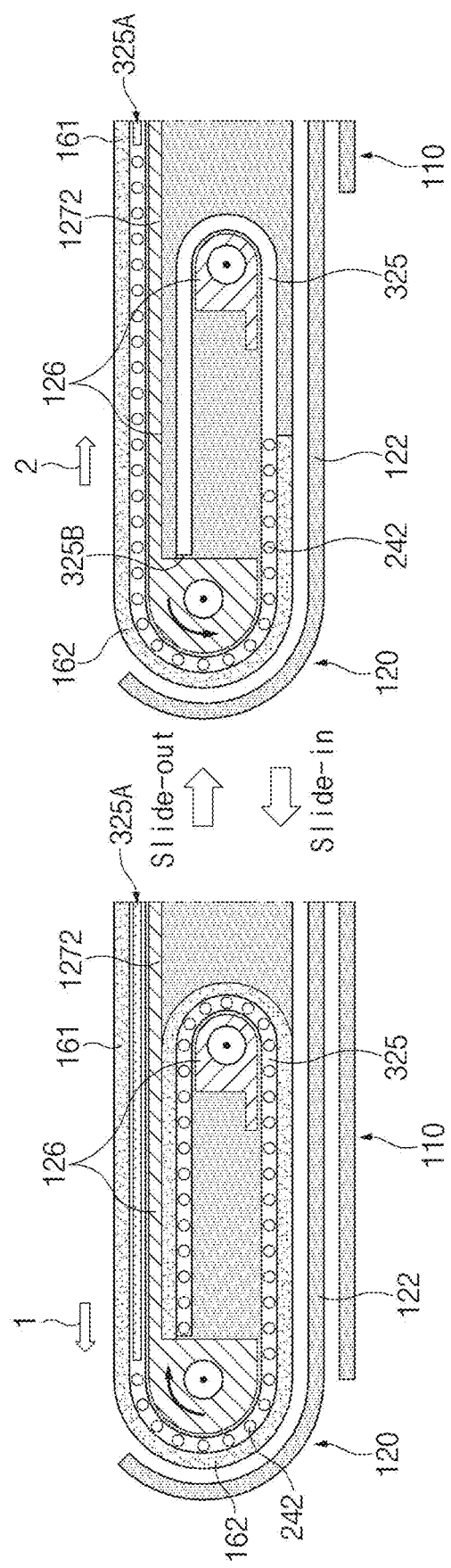
FIG. 5C is a view illustrating extension or reduction of a second region of a display depending on a sliding motion of a second housing of an electronic device according to an embodiment of the disclosure.

FIG. 5C is a view illustrating extension or reduction of the second region of the display depending on a sliding motion of the second housing of the electronic device according to an embodiment of the disclosure. In an embodiment of the disclosure, when the second region 162 of the display 160 is extended or reduced, it may mean that a region (or, an area) where the second region 162 of the display 160 is exposed to the outside is increased or decreased.

In an embodiment of the disclosure, the first extended state of the electronic device 101 may refer to a state in which at least a portion of the second housing 120 is slid outside the first housing 110 and the third housing 130 is completely slid into the first housing 110.

In an embodiment of the disclosure, the first extended state of the electronic device 101 may refer to a state in which at least a portion of the second region 162 of the display 160 is exposed outside the electronic device 101 and the third region 163 is not exposed outside the electronic device 101.

The following description will be given based on the electronic device 101 in the first extended state with reference to FIGS. 5A and 5B.

Referring to FIGS. 5A and 5B, the second housing 120 according to an embodiment may slide outside the first housing 110. In an embodiment of the disclosure, the second region 162 of the display 160 may be exposed to the outside as the second housing 120 is moved. For example, referring to FIG. 5C, the second housing 120 may move in the first direction 1 away from the center of the first housing 110. In an embodiment of the disclosure, the first cover 122, the first guide member (not illustrated) (e.g., the first guide member 124 of FIG. 3A), and the first panel support member 126 of the second housing 120 may move in the first direction 1. In this case, the first support structure 242 may move along the path facing toward the one end 325A of the guide rail 325. In an embodiment of the disclosure, the second region 162 of the display 160 attached with the first support structure 242 may move along the guide rail 325 together with the first support structure 242. In an embodiment of the disclosure, as the second region 162 of the display 160 moves together with the guide rail 325, the second region 162 of the display 160 may be exposed outside the second housing 120 (or, may be withdrawn outside the second housing 120). In an embodiment of the disclosure, the second region 162 exposed outside the second housing 120 may be supported by the first extension 1272 of the first panel support member 126. In an embodiment of the disclosure, the second region 162 exposed to the outside may form a substantially flat surface together with the first region 161. In an embodiment of the disclosure, the display 160 may be extended in the first direction 1 as the second housing 120 slides outside the first housing 110.

Referring to FIGS. 5A and 5B, in an embodiment of the disclosure, the third region 163 of the display 160 may not be exposed outside the electronic device 101. In an embodiment of the disclosure, the descriptions of the third housing 130 and the third region 163 of the display 160 in the normal state, which have been given with reference to FIGS. 4A, 4B, and 4C, may be substantially identically applied to descriptions of the third housing 130 and the third region 163 of the display 160 in the first extended state of FIGS. 5A and 5B.

In an embodiment of the disclosure, the distance between the first variable magnet member 262 and the first magnet member 264 may be a second distance greater than the first distance. In an embodiment of the disclosure, the first variable magnet member 262 and the first magnet member 264 may not face each other.

In an embodiment of the disclosure, the distance between the second variable magnet member 272 and the second magnet member 274 may be the first distance. In an embodiment of the disclosure, the second variable magnet member 272 and the second magnet member 274 may face each other.

In an embodiment of the disclosure, when the electronic device 101 is in the first extended state, the display 160 may be exposed to the outside by a second area greater than the first area. For example, the second area may be substantially the same as the area of the front surface 10A formed by a surface 161A on which the first region 161 of the display 160 is exposed to the outside and a surface 162A on which the second region 162 is exposed to the outside.

Figure 6A:
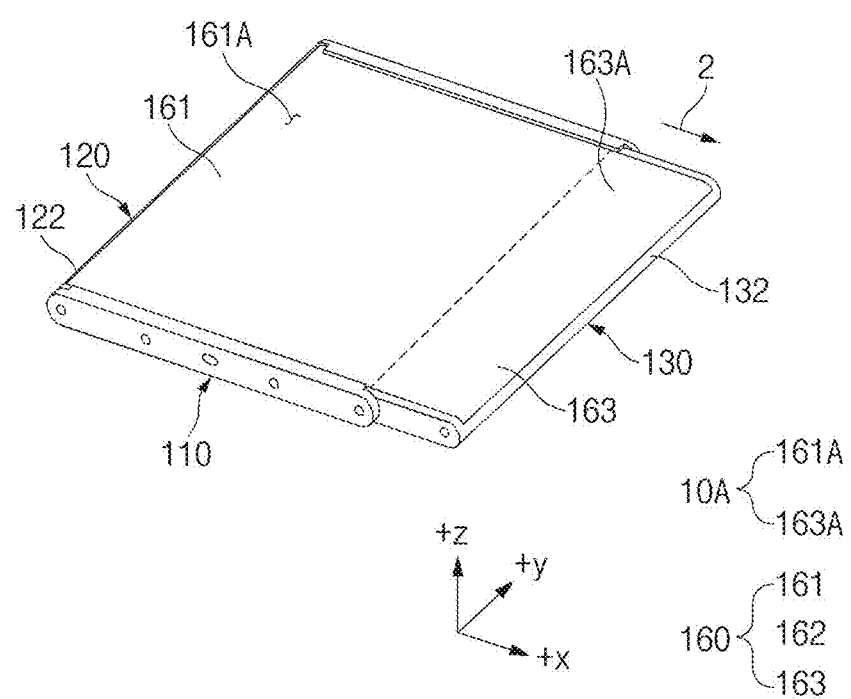
FIG. 6A is a perspective view illustrating an electronic device in a second extended state (or, a second extended mode) according to an embodiment of the disclosure.

FIG. 6A is a perspective view illustrating the electronic device in a second extended state (or, a second extended mode) according to an embodiment of the disclosure.

Figure 6B:
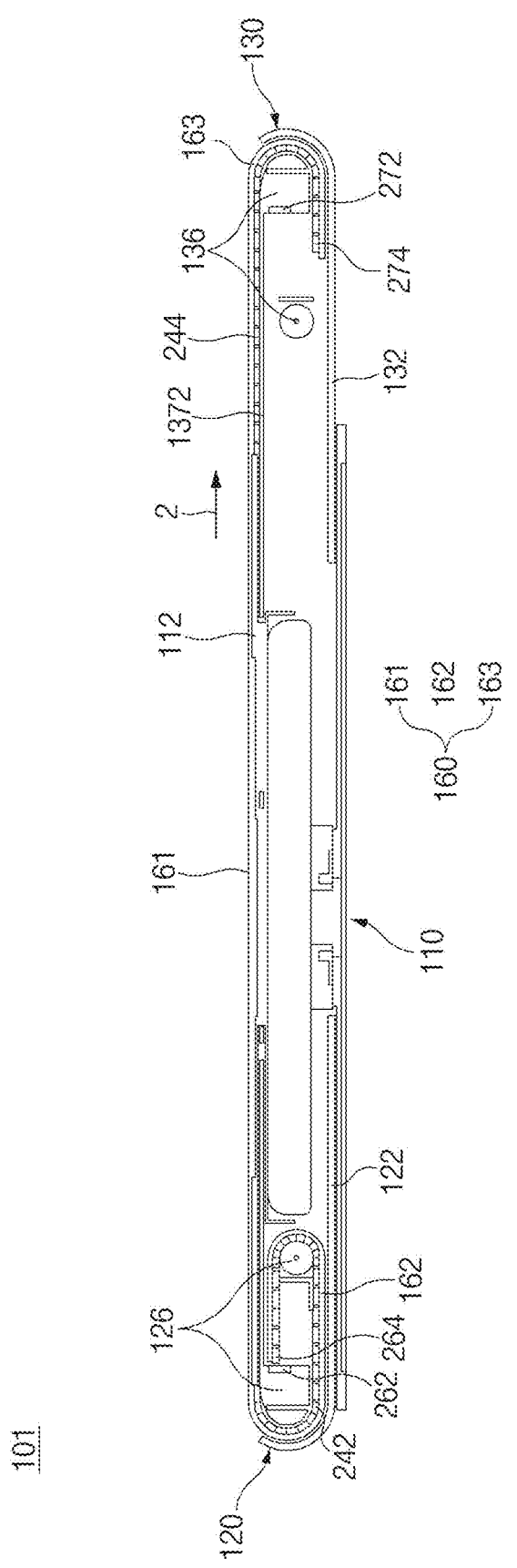
FIG. 6B is a sectional view illustrating an electronic device in a second extended state according to an embodiment of the disclosure.

FIG. 6B is a sectional view illustrating the electronic device in the second extended state according to an embodiment of the disclosure.

When the electronic device 101 according to an embodiment is in the second extended state, at least a portion of the third housing 130 may be slid outside the first housing 110, and the second housing 120 may be completely slid into the first housing 110.

In an embodiment of the disclosure, in the second extended state, at least a portion of the third region 163 of the display 160 may be exposed outside the electronic device 101, and the second region 162 may not be exposed outside the electronic device 101.

The following description will be given based on the electronic device 101 in the second extended state with reference to FIGS. 6A and 6B together with FIG. 5C.

Referring to FIGS. 6A and 6B, in an embodiment of the disclosure, the second region 162 of the display 160 may not be exposed outside the electronic device 101. In an embodiment of the disclosure, the descriptions of the second housing 120 and the second region 162 of the display 160 in the normal state, which have been given with reference to FIGS. 4A, 4B, and 4C, may be substantially identically applied to descriptions of the second housing 120 and the second region 162 of the display 160 in the second extended state of FIGS. 6A and 6B.

When the electronic device 101 according to an embodiment of the disclosure is changed from the first extended state to the second extended state, the second housing 120 may slide into the first housing 110. In an embodiment of the disclosure, the second region 162 of the display 160 exposed to the outside may be inserted into the second housing 120 as the second housing 120 is moved into the first housing 110. For example, referring to FIG. 5C, the second housing 120 may move in the second direction 2 toward the first housing 110. In an embodiment of the disclosure, the first cover 122, the first guide member (not illustrated) (e.g., the first guide member 124 of FIG. 3A), and the first panel support member 126 of the second housing 120 may move in the second direction 2. In this case, the first support structure 242 may move along the path facing toward the opposite end 325B of the guide rail 325. In an embodiment of the disclosure, the second region 162 of the display 160 attached with the first support structure 242 may move along the guide rail 325 together with the first support structure 242. In an embodiment of the disclosure, as the second region 162 of the display 160 moves together with the guide rail 325, the second region 162 of the display 160 may be inserted into the second housing 120 (or, may not be exposed outside the second housing 120). In an embodiment of the disclosure, the display 160 may be reduced as the second housing 120 slides into the first housing 110.

Referring to FIGS. 6A and 6B, the third housing 130 according to an embodiment may slide outside the first housing 110. In an embodiment of the disclosure, the display 160 may be extended in the second direction 2 as the second housing 120 slides. The descriptions of the first housing 110 and the second region 162 of the display 160, which have been given with reference to FIGS. 5A, 5B, and 5C, may be correspondingly applied to descriptions of the third housing 130 and the third region 163 of the display 160 in the second extended state. For example, the third housing 130 may move in the second direction 2 away from the first housing 110. In an embodiment of the disclosure, the second cover 132, the second guide member (not illustrated) (e.g., the second guide member 134 of FIG. 2), and the second panel support member 136 of the third housing 130 may move in the second direction 2. In this case, the second support structure 244 may move along the path of the guide rail (not illustrated), and the third region 163 of the display 160 attached with the second support structure 244 may also move together with the second support structure 244. In an embodiment of the disclosure, as the third region 163 of the display 160 moves together with the guide rail 325, the third region 163 of the display 160 may be exposed outside the third housing 130 (or, may be withdrawn outside the third housing 130). In an embodiment of the disclosure, the third region 163 exposed outside the third housing 130 may be supported by the second panel support member 136. In an embodiment of the disclosure, the third region 163 exposed to the outside may form a substantially flat surface together with the first region 161.

In an embodiment of the disclosure, the distance between the first variable magnet member 262 and the first magnet member 264 may be the first distance. In an embodiment of the disclosure, the first variable magnet member 262 and the first magnet member 264 may face each other.

In an embodiment of the disclosure, the distance between the second variable magnet member 272 and the second magnet member 274 may be a third distance greater than the first distance. In an embodiment of the disclosure, the second variable magnet member 272 and the second magnet member 274 may not face each other.

In an embodiment of the disclosure, when the electronic device 101 is in the second extended state, the display 160 may be exposed to the outside by a third area greater than the first area. For example, the third area may be the area of the front surface 10A formed by the surface 161A on which the first region 161 of the display 160 is exposed and a surface 163A on which the third region 163 is exposed.

Figure 7A:
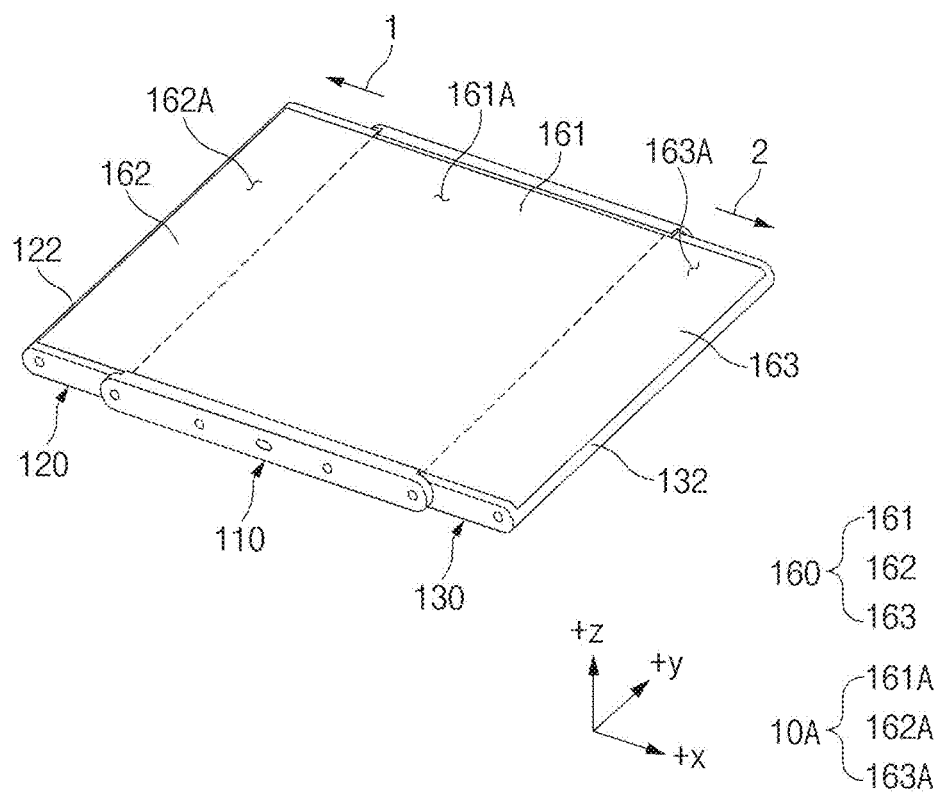
FIG. 7A is a perspective view illustrating an electronic device in a third extended state (or, a third extended mode) according to an embodiment of the disclosure.

FIG. 7A is a perspective view illustrating the electronic device in a third extended state (or, a third extended mode) according to an embodiment of the disclosure.

Figure 7B:
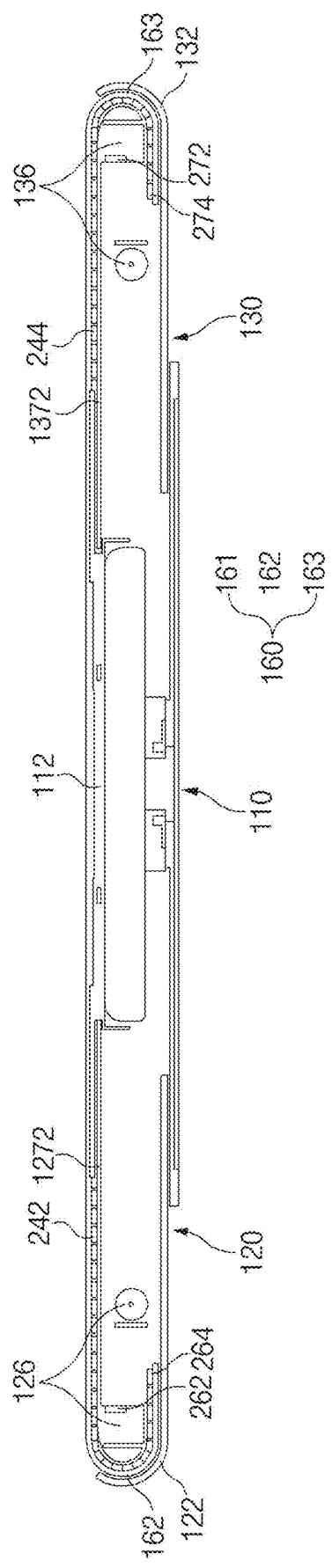
FIG. 7B is a sectional view illustrating an electronic device in a third extended state according to an embodiment of the disclosure.

FIG. 7B is a sectional view illustrating the electronic device in the third extended state according to an embodiment of the disclosure.

Referring to FIGS. 7A and 7B, when the electronic device 101 according to an embodiment is in the third extended state, at least a portion of the second housing 120 may be slid outside the first housing 110. In an embodiment of the disclosure, in the third extended state, at least a portion of the second region 162 of the display 160 may be exposed outside the electronic device 101. The descriptions of the second housing 120 and the second region 162 of the display 160 in the first extended state, which have been given with reference to FIGS. 5A, 5B, and 5C, may be substantially identically applied to descriptions of the second housing 120 and the second region 162 of the display 160 in the third extended state.

In an embodiment of the disclosure, when the electronic device 101 is in the third extended state, at least a portion of the third housing 130 may be slid outside the first housing 110. In an embodiment of the disclosure, in the third extended state, at least a portion of the third region 163 of the display 160 may be exposed outside the electronic device 101. The descriptions of the third housing 130 and the third region 163 of the display 160 in the second extended state, which have been given with reference to FIGS. 6A and 6B, may be substantially identically applied to descriptions of the third housing 130 and the third region 163 of the display 160 in the third extended state.

In an embodiment of the disclosure, the distance between the first variable magnet member 262 and the first magnet member 264 may be the second distance. In an embodiment of the disclosure, the first variable magnet member 262 and the first magnet member 264 may not face each other.

In an embodiment of the disclosure, the distance between the second variable magnet member 272 and the second magnet member 274 may be the third distance. In an embodiment of the disclosure, the second variable magnet member 272 and the second magnet member 274 may not face each other.

In an embodiment of the disclosure, when the electronic device 101 is in the third extended state, the display 160 may be exposed to the outside by a fourth area that is greater than the first area, the second area, and the third area. For example, the fourth area may be the area of the front surface 10A formed by the surface 161A on which the first region 161 of the display 160 is exposed, the surface 162A on which the second region 162 is exposed, and the surface 163A on which the third region 163 is exposed.

Figure 8A:
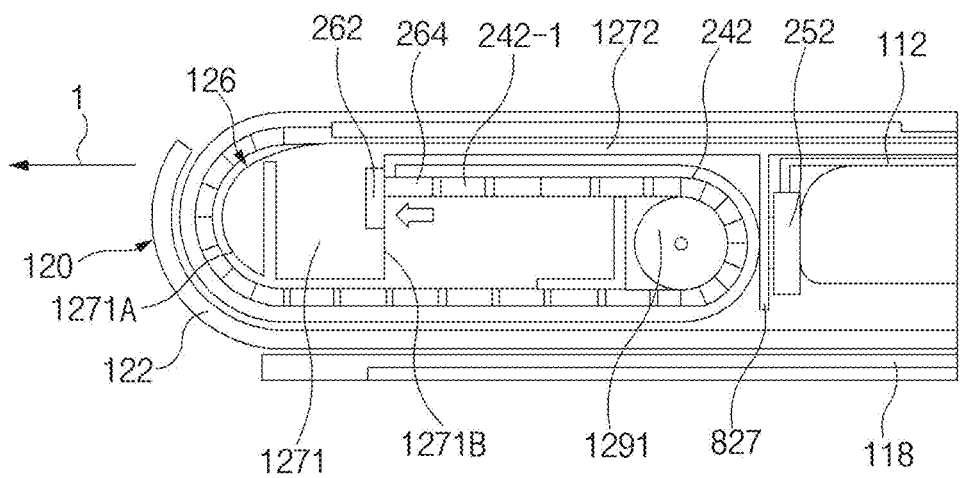
FIG. 8A illustrates an electronic device including an actuator according to an embodiment of the disclosure.

FIG. 8A illustrates the electronic device including an actuator according to an embodiment of the disclosure.

Figure 8B:
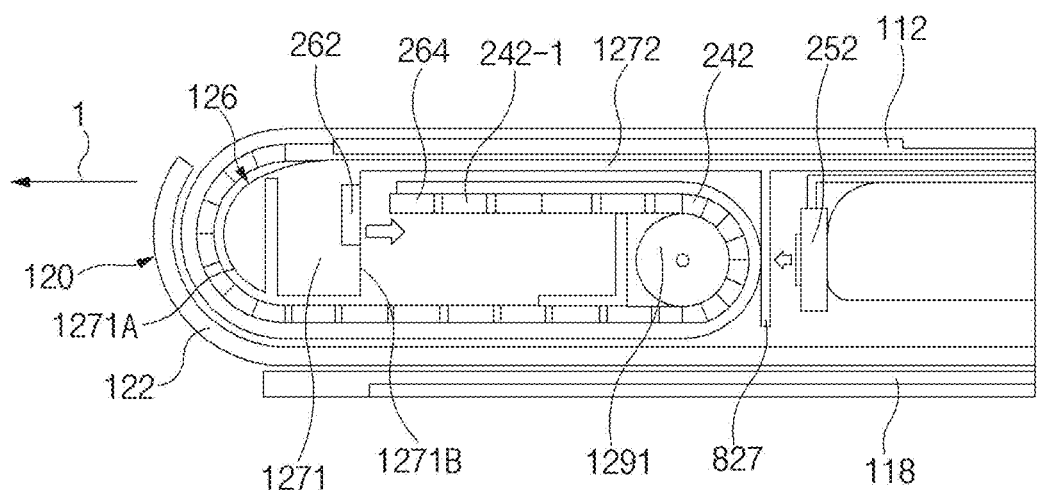
FIG. 8B illustrates an electronic device including an actuator according to an embodiment of the disclosure.

FIG. 8B illustrates the electronic device including the actuator according to an embodiment of the disclosure.

Figure 8C:
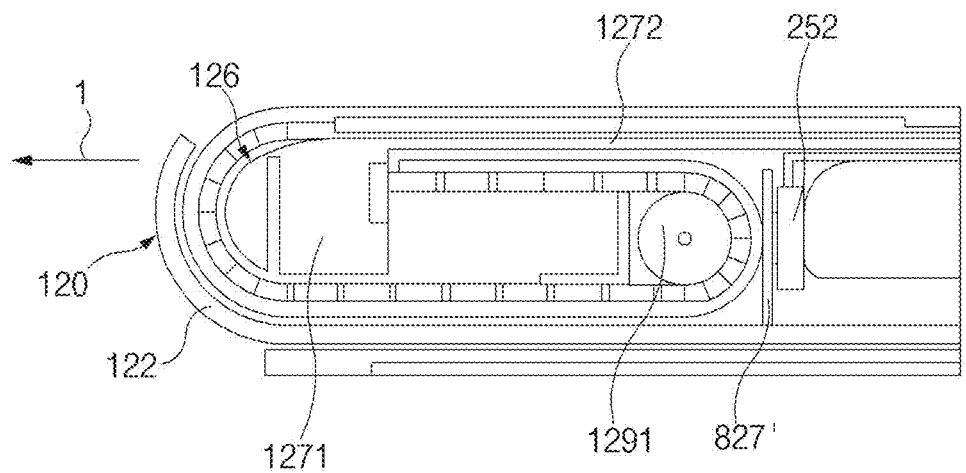
FIG. 8C illustrates an electronic device including an actuator according to an embodiment of the disclosure.

FIG. 8C illustrates the electronic device including an actuator according to another embodiment of the disclosure.

Referring to FIGS. 8A and 8B, in an embodiment of the disclosure, the first panel support member 126 may include the first variable magnet member 262 disposed on the first roll bar 1271. For example, the first variable magnet member 262 may be disposed on an opposite surface 1271B facing away from the first curved surface 1271A of the first roll bar 1271. For example, the first variable magnet member 262 may be at least partially accommodated in a groove formed on the opposite surface 1271B of the first roll bar 1271.

In an embodiment of the disclosure, the first magnet member 264 may be coupled to one end of the first support structure 242 (e.g., an end closer to the opposite end 325B of the guide rail 325 within the path of the guide rail 325 of FIG. 3B). For example, the first magnet member 264 may be disposed adjacent to a first bar 242-1 located at the one end of the first support structure 242. For example, the first magnet member 264 may be coupled with the first bar 242-1 so as to be rotatable within a specified angle range.

In an embodiment of the disclosure, the first variable magnet member 262 may include an electromagnet having a coil wound around an iron core or a hybrid electromagnet having a coil wound around a permanent magnet. In an embodiment of the disclosure, the direction and/or intensity of a magnetic field formed by the first variable magnet member 262 may vary depending on an electric current applied to the first variable magnet member 262. In an embodiment of the disclosure, the first magnet member 264 may include a permanent magnet.

In an embodiment of the disclosure, the distance between the first variable magnet member 262 and the first magnet member 264 may vary depending on movement of the first support structure 242. For example, in the normal state of the electronic device 101, the distance between the first variable magnet member 262 and the first magnet member 264 may be a first distance. However, physical contact between the first variable magnet member 262 and the first magnet member 264 is not excluded. For example, when the first distance is equal to 0, the first variable magnet member 262 and the first magnet member 264 may make physical contact with each other. For example, in the first extended state or the third extended state of the electronic device 101, the distance between the first variable magnet member 262 and the first magnet member 264 may be a second distance greater than the first distance.

In an embodiment of the disclosure, in the normal state or the second extended state of the electronic device 101, the first variable magnet member 262 may be controlled such that opposite poles of the first variable magnet member 262 and the first magnet member 264 face each other. In an embodiment of the disclosure, in the normal state or the second extended state of the electronic device 101, an attractive force may act between the first variable magnet member 262 and the first magnet member 264. The attractive force may suppress movement of the second housing 120, may prevent the second housing 120 from being extended in a way that is not intended by a user, and may prevent an injury to the user due to unintended extension of the second housing 120.

However, when the user wants to extend the second housing 120, the second housing 120 may be required to be easily extended. For example, the electronic device 101 according to an embodiment may detect movement of the second housing 120 in the normal state or the second extended state and may allow the same poles of the first variable magnet member 262 and the first magnet member 264 to face each other. In this case, a repulsive force may act between the first variable magnet member 262 and the first magnet member 264. The repulsive force may support an operation in which the second housing 120 moves in the first direction 1. In another example, the electronic device 101 may include a lock mode (or, a child safety mode) in which a first state in which an attractive force acts between the first variable magnet member 262 and the first magnet member 264 is maintained. For example, the lock mode may be enabled or disabled through a user operation. For example, when the lock mode is disabled, the electronic device may be changed from the first state to a second state in which a repulsive force acts between the first variable magnet member 262 and the first magnet member 264. In another example, when the lock mode is disabled, the electronic device 101 may be changed from the first state to the second state in response to detection of movement of the second housing 120 while the electronic device 101 is in the normal state or the second extended state.

The descriptions of the first variable magnet member 262 and the first magnet member 264, which have been given with reference to FIGS. 8A and 8B, may be substantially identically, similarly, or correspondingly applied to the second variable magnet member (e.g., the second variable magnet member 272 of FIG. 7B) and the second magnet (e.g., the second magnet member 274 of FIG. 7B) that are not illustrated. For example, the second variable magnet member may include an electromagnet or a hybrid electromagnet, and the second magnet member may include a permanent magnet. For example, the distance between the second variable magnet member and the second magnet member in the normal state may be a third distance, and the distance between the second variable magnet member and the second magnet member in the second extended state or the third extended state may be a fourth distance greater than the third distance. For example, an attractive or repulsive force may act between the second variable magnet member and the second magnet member depending on a state of the electronic device 101, and thus the second variable magnet member and the second magnet member may limit or support movement of the third housing 130. For example, when the electronic device 101 is in the normal state or the first extended state or the lock mode is enabled by the user, the electronic device 101 may control the second variable magnet member such that an attractive force acts between the second variable magnet member and the second magnet member. In another example, when movement of the third housing 130 is detected while the electronic device 101 is in the normal state or the first extended state, the electronic device 101 may control the second variable magnet member such that a repulsive force acts between the second variable magnet member and the second magnet member. In another example, when the electronic device 101 in the normal state or the first extended state detects movement of the third housing after the user disables the lock mode, the electronic device 101 may control the second variable magnet member such that a repulsive force acts between the second variable magnet member and the second magnet member.

In an embodiment of the disclosure, the first panel support member 126 may include a first support part 827 extending from the first extension 1272. In an embodiment of the disclosure, the first support part 827 may extend from the first extension 1272 into the space between the second roll bar 1291 and the first actuator 252. In an embodiment of the disclosure, the first support part 827 may extend from the first extension 1272 toward the back plate 118.

In an embodiment of the disclosure, the first actuator 252 may provide a physical force to the first support part 827 in a direction (e.g., the first direction 1) in which the second housing 120 slides outside the first housing 110. In an embodiment of the disclosure, the physical force provided from the first actuator 252 may be transmitted, through the first support part 827, to the first panel support member 126 and the second housing 120 coupled with the first panel support member 126.

In an embodiment of the disclosure, the physical force provided from the first actuator 252 may enable the second housing 120 to easily slide outside the first housing 110 or may enable the second region 162 of the display 160 to be easily extended.

In an embodiment of the disclosure, in the normal state or the second extended state, the electronic device 101 may detect movement of the second housing 120. In an embodiment of the disclosure, in response to the detection, the electronic device 101 may control the first actuator 252 to apply a force to the second housing 120.

The descriptions of the first support part 827 and the first actuator 252, which have been given with reference to FIGS. 8A and 8B, may be correspondingly applied to the second actuator (e.g., the second actuator 254 of FIG. 2) disposed in the third housing (e.g., the third housing 130 of FIG. 2) and a second support part (not illustrated) extending from the second panel support member (e.g., the second panel support member 136 of FIG. 2). The second actuator 254 may apply a force to the second support part in a direction (e.g., the second direction 2) in which the third housing 130 slides. Accordingly, the third housing 130 may easily slide. For example, in the normal state or the first extended state, the electronic device 101 may detect movement of the third housing 130. For example, in response to the detection, the electronic device 101 may control the second actuator 254 to apply a force to the third housing 130.

Referring to FIG. 8C, a first support part 827' may extend from the first cover 122 into the space between the second roll bar 1291 and the first actuator 252. The first support part 827' may extend from the first cover 122 toward the first extension 1272. In this case, the first actuator 252 may provide a physical force to the first support part 827' in a direction (e.g., the first direction 1) in which the second housing 120 slides outside the first housing 110. In an embodiment of the disclosure, the physical force provided from the first actuator 252 may be transmitted to the first cover 122 of the second housing 120 through the first support part 827'.

Figure 9:
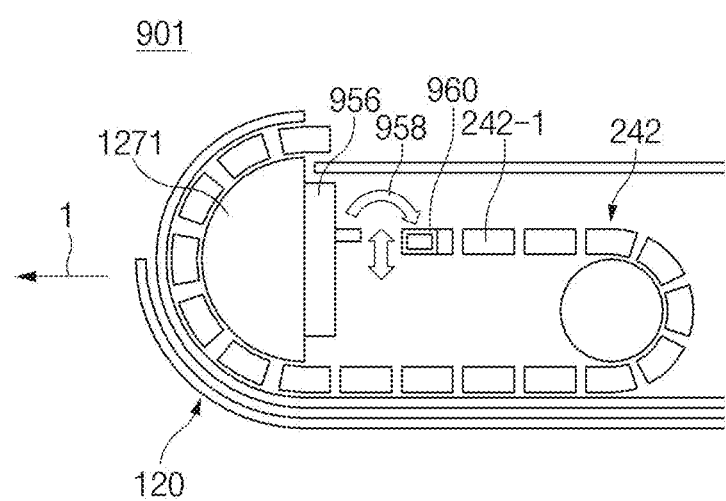
FIG. 9 illustrates an electronic device according to an embodiment of the disclosure.

FIG. 9 illustrates an electronic device according to an embodiment of the disclosure.

Referring to FIG. 9, the electronic device 101 according to an embodiment of the disclosure may include a third actuator 956, a latch member 958, and the striker member 960.

In an embodiment of the disclosure, the third actuator 956 may be disposed on an opposite surface of a first roll bar 1271 (e.g., the opposite surface 1271B of FIG. 3B). In an embodiment of the disclosure, the third connector 956 may be operationally coupled with the first latch member 958.

In an embodiment of the disclosure, the first striker member 960 may be disposed at one end of the first support structure 242. For example, the first striker member 960 may be coupled with a first bar 242-1 of the first support structure 242.

In an embodiment of the disclosure, the first latch member 958 may be selectively coupled to the first striker member 960 by power provided from the third actuator 956. In an embodiment of the disclosure, when the first latch member 958 is coupled with the first striker member 960, movement of the first support structure 242 and a second housing 120 may be limited.

Although not illustrated, the third actuator 956, the first latch member 958, and the first striker member 960 according to an embodiment of the disclosure may be symmetrically disposed in a third housing 130 located on the opposite side to the second housing 120 with respect to a first housing 110 and may be referred to as a fourth actuator, a second latch member, and a second striker, respectively. Although not illustrated, the electronic device 101 according to an embodiment may selectively limit movement of the third housing 130 using the fourth actuator, the second latch member, and the second striker member in the same way as the third actuator 956, the first latch member 958, and the first striker member 960.

Figure 10A:
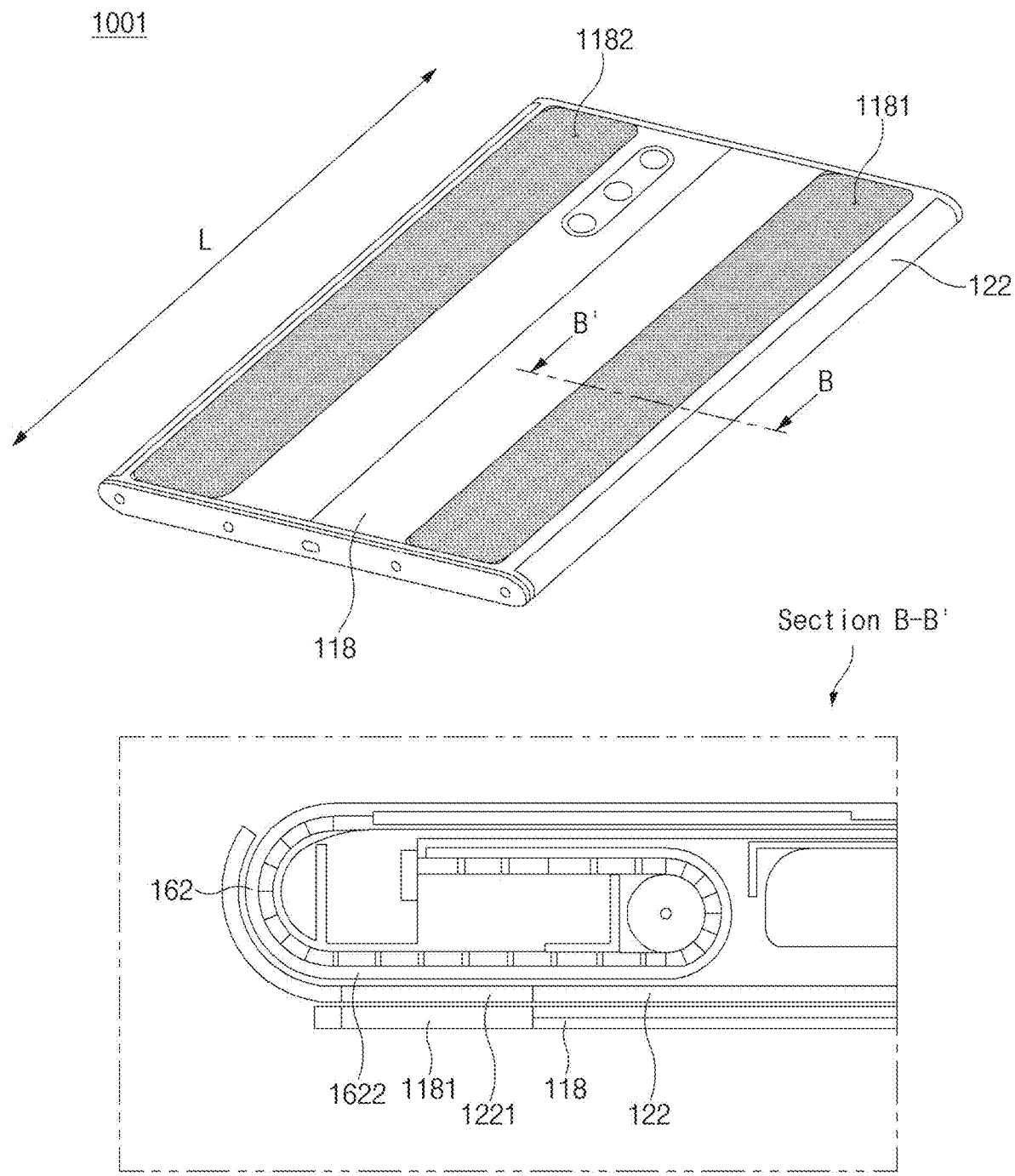
FIG. 10A is a perspective view illustrating a rear surface of an electronic device according to an embodiment of the disclosure.

FIG. 10A is a perspective view illustrating a rear surface of an electronic device according to an embodiment of the disclosure.

Figure 10B:
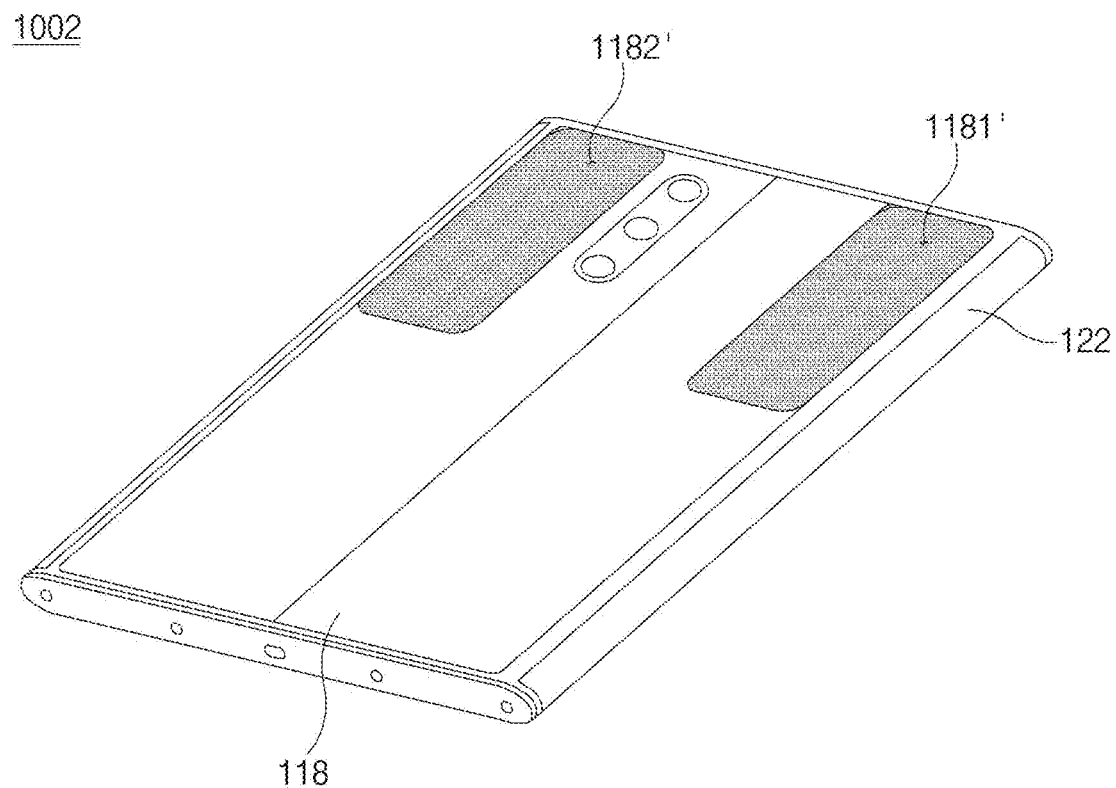
FIG. 10B is a perspective view illustrating a rear surface of an electronic device according to an embodiment of the disclosure.

FIG. 10B is a perspective view illustrating a rear surface of an electronic device according to an embodiment of the disclosure.

Figure 10C:
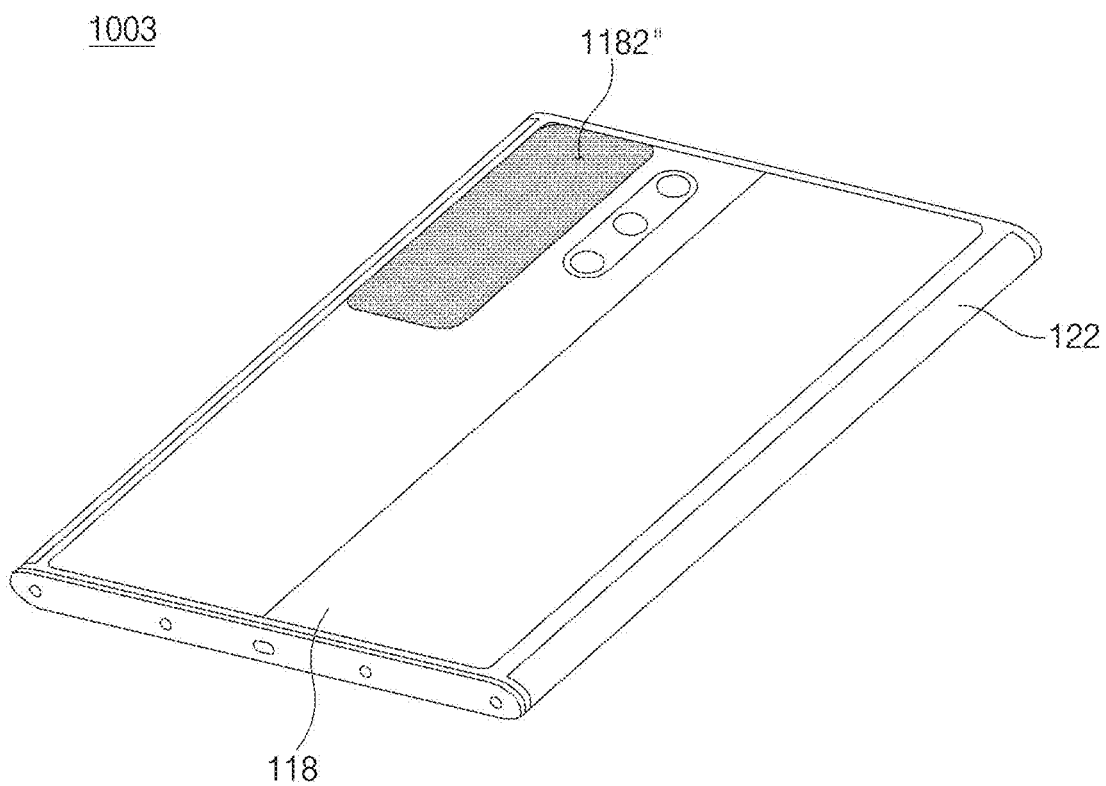
FIG. 10C is a perspective view illustrating a rear surface of an electronic device according to an embodiment of the disclosure.

FIG. 10C is a perspective view illustrating a rear surface of an electronic device according to an embodiment of the disclosure.

Referring to FIG. 10A, a portion of a back plate 118 according to an embodiment may be formed to be substantially transparent. For example, the back plate 118 may include a first specified region 1181 and a second specified region 1182 that are substantially transparent. In an embodiment of the disclosure, the first specified region 1181 and the second specified region 1182 may extend in a lengthwise direction L of the back plate 118 and may have a length similar to the length of the back plate 118. In an embodiment of the disclosure, based on a normal state of the electronic device 101, the first specified region 1181 may have a width corresponding to a portion of a second region 162 of a display 160 that faces the back plate 118 and is substantially parallel to the back plate 118. For example, the first specified region 1181 may overlap the portion of the second region 162 of the display 160. In an embodiment of the disclosure, a portion 1181 of a first cover 122 that overlaps the first specified region 1181 may be formed to be substantially transparent.

Similarly to the first specified region 1181, the second specified region 1182 according to an embodiment may overlap a portion of a third region (not illustrated) of the display 160 (e.g., the third region 163 of FIG. 4A) that faces the back plate 118 and is substantially parallel to the back plate 118. Similarly to the portion 1181 of the first cover 122, a second portion (not illustrated) of the first cover 122 that overlaps the second specified region 1182 may be substantially transparent.

In an embodiment of the disclosure, in the normal state of the electronic device 101, a screen displayed on the second region 162 and the third region 163 of the display 160 may be visible through the first specified region 1181 and the second specified region 1182 of the back plate 118.

Referring to FIG. 10B, a first specified region 1281' and a second specified region 1282' of a back plate 118 may be shorter than the first specified region 1181 and the second specified region 1182 illustrated in FIG. 10A.

Referring to FIG. 10C, only a second specified region 1182" of a back plate 118 may be formed to be substantially transparent, and the remaining portion may be formed to be opaque. For example, the first specified region 1181' illustrated in FIG. 10B may be omitted.

An electronic device according to various embodiments (e.g., the electronic device 101 of FIG. 1) may include a first housing (e.g., the first housing 110 of FIG. 1), a second housing (e.g., the second housing 120 of FIG. 1) that forms a first side surface of the electronic device (e.g., the first side surface 10B of FIG. 1) and that is coupled to the first housing so as to be movable in a first direction (e.g., the first direction 1 of FIG. 1), at least a portion of the second housing being located in the first housing, a third housing (e.g., the third housing 130 of FIG. 1) that forms a second side surface of the electronic device (e.g., the second side surface 10C of FIG. 1) and that is coupled to the first housing so as to be movable in a second direction (e.g., the second direction 2 of FIG. 1), at least a portion of the third housing being located in the first housing, a first panel support member (e.g., the first panel support member 126 of FIG. 2) fixedly disposed in the second housing, the first panel support member including a first curved surface (e.g., the curved surface 1271A of FIG. 3B) that faces toward the first side surface and a second curved surface (e.g., 1291A of FIG. 3B) that faces toward the second side surface, a second panel support member (e.g., the second panel support member 136 of FIG. 2) fixedly disposed in the third housing, the second panel support member including a third curved surface that faces toward the second side surface and a fourth curved surface that faces toward the first side surface, and a flexible display (e.g., the display 160 of FIG. 1). The flexible display may include a first region (e.g., the first region 161 of FIG. 1) that is disposed in the first housing and that forms a first surface (e.g., the front surface 10A of FIG. 1) of the electronic device, a second region (e.g., the second region 162 of FIG. 1) that is located in the second housing or at least partially forms the first surface of the electronic device together with the first region as the second housing moves, and a third region (e.g., the third region 163 of FIG. 1) that is located in the third housing or at least partially forms the first surface of the electronic device together with the first region as the third housing moves. The second region of the flexible display may at least partially surround the first curved surface of the first panel support member or may at least partially surround the first curved surface and the second curved surface of the first panel support member. The third region of the flexible display may at least partially surround the third curved surface of the second panel support member or may at least partially surround the third curved surface and the fourth curved surface of the second panel support member.

In an embodiment of the disclosure, the first panel support member may include a first roll bar (e.g., the first roll bar 1271 of FIG. 3A) that forms the first curved surface and extends in a direction perpendicular to the first direction and a second roll bar (e.g., the second roll bar 1291 of FIG. 3A) that forms the second curved surface and extends in the direction perpendicular to the first direction, the second roll bar being spaced apart from the first roll bar.

In an embodiment of the disclosure, the electronic device may include a normal state (e.g., the state of the electronic device 101 illustrated in FIG. 4A) in which the second region of the flexible display is located in the second housing and the third region of the flexible display is located in the third housing. In the normal state, the second region of the flexible display may include a first portion (e.g., the first portion 1621 of FIG. 4C) that extends in the counterclockwise direction along the first curved surface of the first roll bar, a second portion (e.g., the second portion 1622 of FIG. 4C) that extends from the first portion to the second roll bar, a third portion (e.g., the third portion 1623 of FIG. 4C) that extends from the second portion in the counterclockwise direction along the second curved surface of the second roll bar, and a fourth portion (e.g., the fourth portion 1624 of FIG. 4C) that extends from the third portion toward the first roll bar.

In an embodiment of the disclosure, in the normal state, the second portion and the third portion of the second region and the first region may overlap each other.

In an embodiment of the disclosure, the electronic device may further include a first extension (e.g., the first extension 1272 of FIG. 3A) that extends from the first roll bar toward the second roll bar and a second extension (e.g., the second extension 1292 of FIG. 3A) that extends from the second roll bar toward the first roll bar. The first extension may support at least a portion of the second region of the flexible display as the second housing moves in the first direction.

In an embodiment of the disclosure, in the normal state, the second portion of the second region may extend under the second extension to the second roll bar, and the fourth portion of the second region may extend under the first extension toward the first roll bar.

In an embodiment of the disclosure, the electronic device may further include a first multi-bar (e.g., the first support structure 242 of FIG. 2) attached to a rear surface of the second region of the flexible display and a second multi-bar (e.g., the second support structure 244 of FIG. 2) attached to a rear surface of the third region of the flexible display. The first multi-bar may at least partially surround the first roll bar and the second roll bar, and the second multi-bar may at least partially surround the third roll bar and the fourth roll bar.

In an embodiment of the disclosure, the electronic device may further include first guide members (e.g., the first guide member 124 of FIG. 2) coupled to opposite ends of the first roll bar and opposite ends of the second roll bar. Opposite ends of the first multi-bar may be accommodated in guide rails (e.g., the guide rails 325 of FIG. 3A) formed in the first guide members, and the first multi-bar may pull the second region of the flexible display while moving in the guide rails.

In an embodiment of the disclosure, the electronic device may further include a first actuator (e.g., the first actuator 252 of FIG. 2) disposed in the first housing so as to be adjacent to the second housing and a second actuator (e.g., the second actuator 254 of FIG. 2) disposed in the first housing so as to be adjacent to the third housing. The first actuator may apply a force to the second housing in the first direction, and the second actuator may apply a force to the third housing in the second direction.

In various embodiments of the disclosure, the first panel support member may include a first roll bar (e.g., the first roll bar 1271 of FIG. 3A) that forms the first curved surface and extends in a direction perpendicular to the first direction, a second roll bar (e.g., the second roll bar 1291 of FIG. 3A) that forms the second curved surface and extends in the direction perpendicular to the first direction and that is spaced apart from the first roll bar, a first extension (e.g., the first extension 1272 of FIG. 3A) that extends from the first roll bar toward the third housing beyond the second roll bar, and a first support part (e.g., the first support part 827 of FIG. 8A) that extends from the first extension into a space between the second roll bar and the first actuator. The first actuator may apply a force to the first support part in the first direction.

In an embodiment of the disclosure, the electronic device may further include at least one sensor (e.g., a sensor module 1176 of FIG. 11) and at least one processor (e.g., a processor 1120 of FIG. 11) operationally connected with the first actuator, the second actuator, and the at least one sensor. The at least one processor may detect movement of the second housing and the third housing using the at least one sensor, may control the first actuator to apply a force to the second housing in the first direction in response to detection of movement of the second housing in the first direction, and may control the second actuator to apply a force to the third housing in the second direction in response to detection of movement of the third housing in the second direction.

In various embodiment of the disclosure s, the electronic device may further include a first variable magnet member (e.g., the first variable magnet member 262 of FIG. 2) disposed on the first roll bar, a first magnet member (e.g., the first magnet member 264 of FIG. 2) disposed on a rear surface of the second region of the flexible display, a second variable magnet member (e.g., the second variable magnet member 272 of FIG. 2) disposed on the second roll bar, and a second magnet member (e.g., the magnet member 274 of FIG. 2) disposed on a rear surface of the third region of the flexible display. The first magnet member may move away from the first variable magnet member as the second housing moves, and the second magnet member may move away from the second variable magnet member as the third housing moves.

In an embodiment of the disclosure, the electronic device may include at least one sensor (e.g., the sensor module 1176 of FIG. 11) and at least one processor (e.g., the processor 1120 of FIG. 11) operationally connected with the first variable magnet member, the second variable magnet member, and the at least one sensor. The electronic device may include a normal state (e.g., the state of the electronic device 101 of FIG. 4A) in which the second region of the flexible display is located in the second housing and the third region of the flexible display is located in the third housing. The at least one processor may detect whether the electronic device is in the normal state, by using the at least one sensor, may control the first variable magnet member such that opposite poles of the first magnet member and the first variable magnet member face each other while the electronic device is in the normal state, and may control the second variable magnet member such that opposite poles of the second magnet member and the second variable magnet member face each other while the electronic device is in the normal state.

In an embodiment of the disclosure, the first housing may include a back plate (e.g., the back plate 118 of FIG. 10A) that forms a rear surface of the electronic device, and the back plate may include a first specified region (e.g., the first specified region 1181 of FIG. 10A) and a second specified region (e.g., the second specified region 1182 of FIG. 10A) that are formed to be substantially transparent.

In an embodiment of the disclosure, the electronic device may include a normal state in which the second region of the flexible display is located in the second housing and the third region of the flexible display is located in the third housing. In the normal state, the first specified region may at least partially overlap the second region of the flexible display, and in the normal state, the second specified region may at least partially overlap the third region of the flexible display.

An electronic device according to various embodiments (e.g., the electronic device 101 of FIG. 1) may include a first housing (e.g., the first housing 110 of FIG. 1), a second housing (e.g., the second housing 120 of FIG. 1) that forms a first side surface of the electronic device (e.g., the first side surface 10B of FIG. 1) and that is coupled to the first housing so as to be movable in a first direction (e.g., the first direction 1 of FIG. 1) from the first housing toward the first side surface, at least a portion of the second housing being disposed in the first housing, a third housing (e.g., the third housing 130 of FIG. 1) that forms a second side surface of the electronic device (e.g., the second side surface 10C of FIG. 1) and that is coupled to the first housing so as to be movable in a second direction (e.g., the second direction 2 of FIG. 1) from the first housing toward the second side surface, at least a portion of the third housing being disposed in the first housing, a first panel support member (e.g., the first panel support member 126 of FIG. 2) that is fixedly disposed in the second housing and that extends in a direction perpendicular to the first direction, a second panel support member (e.g., the second panel support member 136 of FIG. 2) that is fixedly disposed in the second housing and that extends in a direction perpendicular to the second direction, a flexible display (e.g., the display 160 of FIG. 1) including a first region (e.g., the first region 161 of FIG. 1) disposed in the first housing and exposed outside the electronic device, a second region (e.g., the second region 162 of FIG. 1) that extends from the first region and at least partially surrounds the first panel support member and that is at least partially located in the second housing or is exposed outside the electronic device as the second housing moves in the first direction, and a third region (e.g., the third region 163 of FIG. 1) that at least partially surrounds the second panel support member from the first region and that is at least partially located in the third housing or is exposed outside the electronic device as the third housing moves in the second direction, a first variable magnet member (e.g., the first variable magnet member 262 of FIG. 2) fixedly disposed on the first panel support member, a first magnet member (e.g., the first magnet member 264 of FIG. 2) that is attached to the second region of the flexible display and that moves away from the first variable magnet member as the second housing moves in the first direction, a second variable magnet member (e.g., the second variable magnet member 272 of FIG. 2) fixedly disposed on the second panel support member, and a second magnet member (e.g., the second magnet member 274 of FIG. 2) attached to the third region of the flexible display such that a distance from the second variable magnet member varies as the third housing moves. The second magnet member may move away from the second variable magnet member as the third housing moves in the second direction.

In an embodiment of the disclosure, the electronic device may further include at least one sensor (e.g., the sensor module 1176 of FIG. 11) and at least one processor (e.g., the processor 1120 of FIG. 11) operationally connected with the first variable magnet member, the second variable magnet member, and the at least one sensor. The electronic device may include a normal state in which the second region of the flexible display is located in the second housing and the third region is located in the third housing. The at least one processor may detect whether the electronic device is in the normal state, by using the at least one sensor, may control the first variable magnet member such that opposite poles of the first magnet member and the first variable magnet member face each other in the normal state, and may control the second variable magnet member such that opposite poles of the second magnet member and the second variable magnet member face each other in the normal state.

In an embodiment of the disclosure, the electronic device may further include a first actuator (e.g., the first actuator 252 of FIG. 2) disposed in the first housing so as to be adjacent to the second housing and a second actuator (e.g., the second actuator 254 of FIG. 2) disposed in the first housing so as to be adjacent to the third housing. The at least one processor may detect movement of the second housing and the third housing using the at least one sensor, may control the first actuator to apply a force to the second housing in the second direction in response to detection of movement of the second housing in the first direction, and may control the second actuator to apply a force to the third housing in the second direction in response to detection of movement of the third housing in the second direction.

In an embodiment of the disclosure, the at least one processor may detect movement of the second housing and the third housing using the at least one sensor, may control the first variable magnet member such that the same poles of the first magnet member and the first variable magnet member face each other, in response to detection of movement of the second housing in the first direction, and may control the second variable magnet member such that the same poles of the second magnet member and the second variable magnet member face each other, in response to detection of movement of the third housing in the second direction.

In an embodiment of the disclosure, the electronic device may further include a first multi-bar (e.g., the first support structure 242 of FIG. 2) that is disposed on a rear surface of the second region of the flexible display and that performs a sliding motion along a circumference of the first panel support member. The first magnet member may be disposed at one end of the first multi-bar. The first panel support member may include a first roll bar (e.g., the first roll bar 1271 of FIG. 3A) that extends in a direction perpendicular to the first direction and that is fixedly disposed in the second housing, a second roll bar (e.g., the second roll bar 1291 of FIG. 3A) that extends parallel to the first roll bar and that is fixedly disposed in the second housing and spaced apart from the first roll bar in the second direction, a first extension (e.g., the first extension 1272 of FIG. 3A) that extends from the first roll bar toward the second roll bar, and a second extension (e.g., the second extension 1292 of FIG. 3A) that extends from the second roll bar toward the first roll bar.

Figure 11:
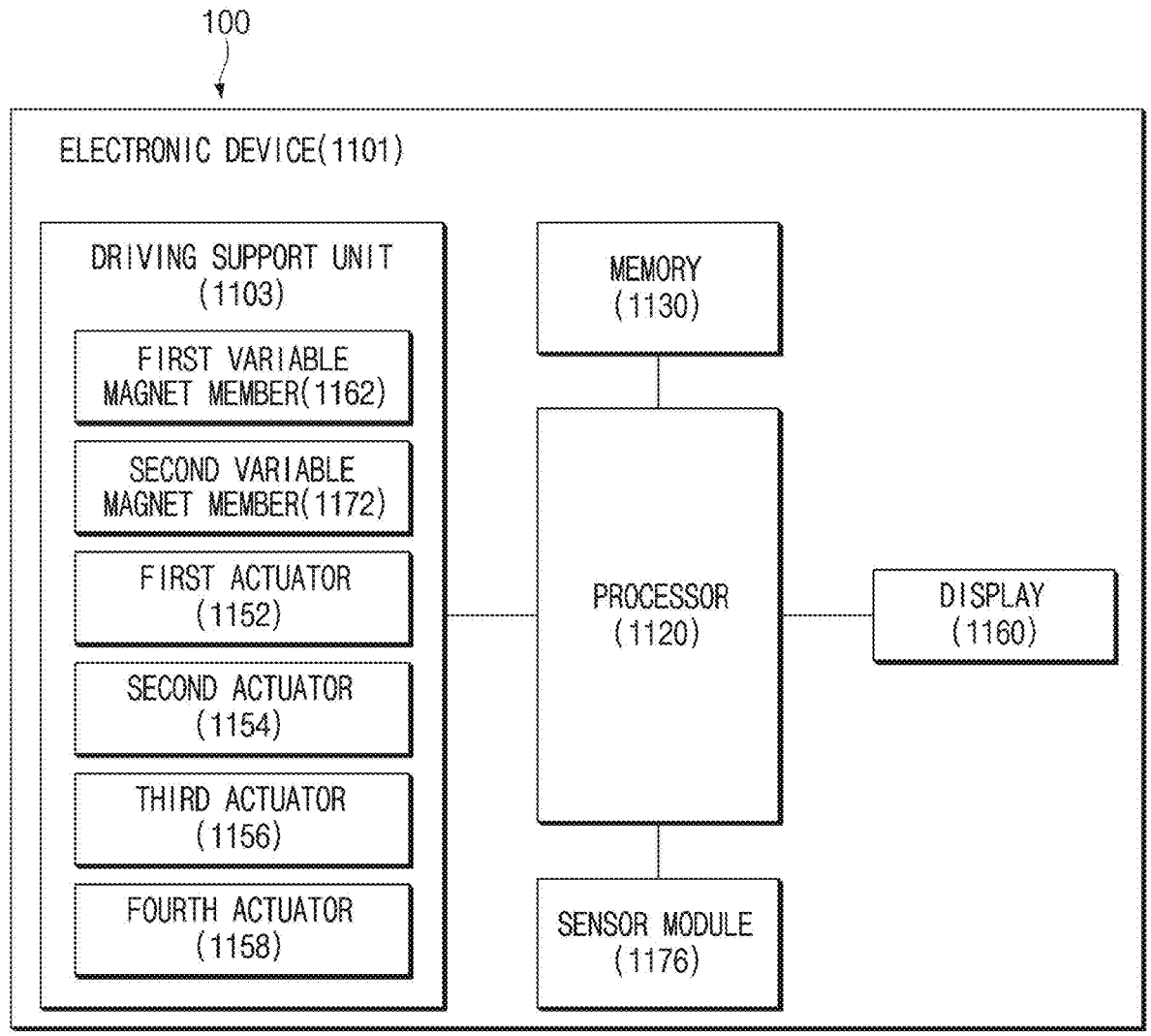
FIG. 11 is a functional block diagram illustrating a configuration of an electronic device according to an embodiment of the disclosure.

FIG. 11 is a functional block diagram 100 illustrating a configuration of an electronic device according to an embodiment of the disclosure.

Referring to FIG. 11, the electronic device 1101 according to an embodiment (e.g., the electronic device 101 of FIG. 1 or the electronic device 3201 of FIG. 32) may include the processor 1120, a memory 1130, a display 1160, the sensor module 1176, a driving support unit 1103, and a housing (not illustrated) (e.g., the first housing 110, the second housing 120, and the third housing 130 of FIG. 1) that accommodates the aforementioned components.

In an embodiment of the disclosure, the processor 1120 (e.g., the processor 3220 of FIG. 32) may be operationally connected with the memory 1130, the display 1160, the sensor module 1176, and the driving support unit 1103. In an embodiment of the disclosure, the processor 1120 may execute instructions stored in the memory 1130. The electronic device 1101 according to an embodiment may control the display 1160, the sensor module 1176, and the driving support unit 1103 and may perform various operations, by executing the instructions stored in the memory 1130 using the processor 1120. Operations described as operations of the electronic device 1101 in the disclosure may be referred to as operations of the processor 1120.

In an embodiment of the disclosure, the display 1160 may include a rollable display (or, a flexible display). In an embodiment of the disclosure, the display 1160 may be referred to as the display 160 of FIG. 1. For example, the display 1160 may include a second region (e.g., the second region 162 of FIG. 4A) that is able to be extended or reduced depending on a sliding motion of a second housing (e.g., the second housing 120 of FIG. 4A), a third region (e.g., the third region 163 of FIG. 4A) that is able to be extended or reduced depending on a sliding motion of a third housing (e.g., the third housing 130 of FIG. 4A), and a first region (e.g., the first region 161 of FIG. 4A) that extends from the first region to the third region and that is exposed to the outside irrespective of a state of the electronic device 101.

In an embodiment of the disclosure, the sensor module 1176 (e.g., a sensor module 3276 of FIG. 32) may include at least one sensor. For example, the sensor module 1176 may include at least one of a grip sensor, a proximity sensor, an acceleration sensor, a gyro sensor, an acoustic wave sensor, a radio wave sensor (e.g., a radar sensor), a magnetic sensor (e.g., a Hall sensor), and/or an optical sensor (e.g., an infrared sensor or a LIDAR sensor).

In an embodiment of the disclosure, the sensor module 1176 may detect a state of the electronic device 1110 or an external state and may output a value corresponding to the detected state and provide the value to the processor 1120. For example, the sensor module 1176 may detect the positions of the second housing and the third housing of the electronic device 1110 and may provide values corresponding to the positions to the processor 1120. The processor 1120 may determine the directions of movement and/or the moving distances of the second housing and the third housing, based on the values obtained from the sensor module 1176.

For example, the sensor module 1176 may include a plurality of contact points disposed in a first housing and arranged to correspond to a path along which the second housing moves and a conductive member disposed in the second housing. When the second housing moves, the conductive member may sequentially make contact with the plurality of contact points along the moving path, and the sensor module 1176 may output an electrical signal (e.g., a voltage) corresponding thereto. The processor 1120 may determine the direction of movement and/or the moving distance of the second housing, based on the signal provided from the sensor module 1176.

In another example, a plurality of contact points may be disposed in a guide rail (e.g., the guide rail 325 of FIG. 3B) of a first guide member (e.g., the first guide member 124 of FIG. 3B). At least a portion of a first multi-bar (e.g., the first support structure 242 of FIG. 3B) may be formed of a conductive material. The first multi-bar may make electrical contact with the plurality of contact points while moving a path of the guide rail, and the sensor module 1176 may output a signal corresponding thereto.

In another example, the sensor module 1176 may include a proximity sensor and may output a value corresponding to a distance from the second housing using the proximity sensor.

However, a method of determining, by the electronic device 1101, the directions of movement and the moving distances of the second housing and the third housing is not limited by the above-described examples. For example, a method available to those skilled in the art may be applied to identify the directions of movement and the moving distances of the second housing and the third housing.

The electronic device 1101 according to an embodiment may determine whether a first side surface of the second housing (e.g., the first side surface 10B of FIG. 1) and/or a second side surface of the third housing (e.g., the second side surface 10C of FIG. 1) is gripped by a user, based on a value obtained by the sensor module 1176. For example, the sensor module 1176 may include a grip sensor. For example, the grip sensor may detect a change (or, the amount of change) in permittivity that occurs when the user grips the housing of the electronic device 1101 and may output a value corresponding thereto. The processor 1120 may determine whether the second housing and/or the third housing is gripped, by using the sensor module 1176. However, without being limited thereto, various methods available to those skilled in the art may be applied. In the disclosure, for convenience of description, a case in which the second housing (or, the first side surface) is gripped by the user may be described as a case in which the electronic device 1101 is gripped by the user's left hand. In the disclosure, for convenience of description, a case in which the third housing (or, the second side surface) is gripped by the user may be described as a case in which the electronic device 1101 is gripped by the user's right hand. In the disclosure, for convenience of description, a case in which the second housing and the third housing are gripped by the user may be described as a case in which the electronic device 101 is gripped by the user's hands.

In an embodiment of the disclosure, the driving support unit 1103 may include a first variable magnet member 1162, a second variable magnet member 1172, a first actuator 1152, a second actuator 1154, a third actuator 1156, and a fourth actuator 1158.

In an embodiment of the disclosure, the first variable magnet member 1162 and the second variable magnet member 1172 may correspond to the first variable magnet member 262 and the second variable magnet member 272 of FIG. 2, respectively.

In an embodiment of the disclosure, the first actuator 1152 and the second actuator 1154 may correspond to the first actuator 252 and the second actuator 254 of FIG. 2, respectively.

In an embodiment of the disclosure, the third actuator 1156 may correspond to the third actuator 956 of FIG. 9.

In an embodiment of the disclosure, the fourth actuator 1158 may correspond to the fourth actuator (not illustrated) that has been described with reference to FIG. 9.

The electronic device 1101 according to an embodiment may determine a direction in which the display 1160 is extended and/or an area by which the display 1160 is extended, by using the sensor module 1176. In an embodiment of the disclosure, the direction in which the display 1160 is extended and/or the area by which the display 1160 is extended may be determined based on the moving distance and/or the direction of movement of the second housing and/or the third housing. In an embodiment of the disclosure, the electronic device 1101 may determine the area by which the display 1160 is exposed outside the electronic device 1101, based on extension information of the housing (e.g., the direction of movement and/or the moving distance of the first housing and/or the second housing) and/or extension information of the display 1160 (e.g., the extension direction and/or the extension distance of the display 1160) obtained by using the sensor module 1176. In an embodiment of the disclosure, based on the determination, the electronic device 1101 may display a screen having a size and/or resolution corresponding to the area by which the display 1160 is exposed to the outside. In the following description, a screen displayed through the display 1160 will be described based on the first region, the second region, and the third region without distinction of a region actually exposed to the outside. However, this is only for the convenience of description. For example, in a case in which the second region of the display 1160 is partially exposed to the outside, displaying a screen on the second region may not mean that the screen is displayed on the entire second region, but may mean that the screen is displayed only on a portion of the second region exposed to the outside. In another example, as illustrated in FIG. 10A, the second region may be visible through a transparent region of a back plate (e.g., the first specified region 1181 of FIG. 10A) even though the entire second region of the display 1160 is located in the second housing. In this case, displaying a screen on the second region may not mean that the screen is displayed on the entire second region, but may mean that the screen is displayed on a portion of the second region that is visible from the outside (e.g., the second portion 1622 of FIG. 10A).

The description of the method of determining the extension direction and/or the extension distance of the display 1160 may correspond to operation 3104 of FIG. 31 to be described below.

Hereinafter, various operations of the electronic device 1101 will be described with reference to FIGS. 12A to 12D, 13A to 13C, 14A, 14B, 15A, 15B, 16A, 16B, 17A, 17B, 18A, 18B, 19A, 19B, 20A, 20B, 21A to 21C, 22A, 22B, 23A to 23D, 24A to 24D, 25A to 25C, 26A, 26B, 27A, 27B, 28A to 28C, 29A to 29C, 30A, 30B, and 31 together with FIG. 11.

Figure 12A:
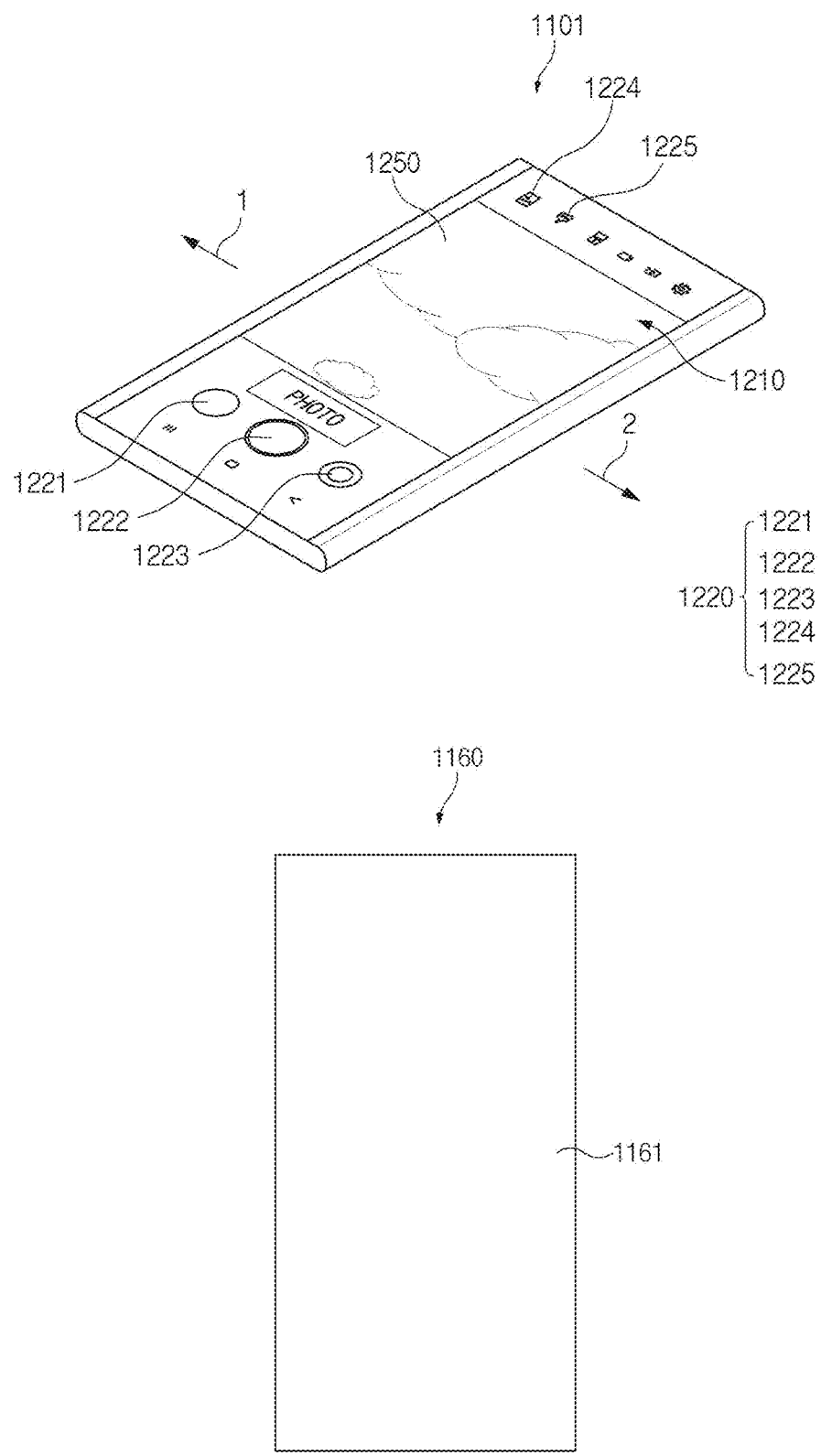
FIG. 12A illustrates an electronic device according to an embodiment of the disclosure.

FIG. 12A illustrates the electronic device according to an embodiment of the disclosure.

Figure 12B:
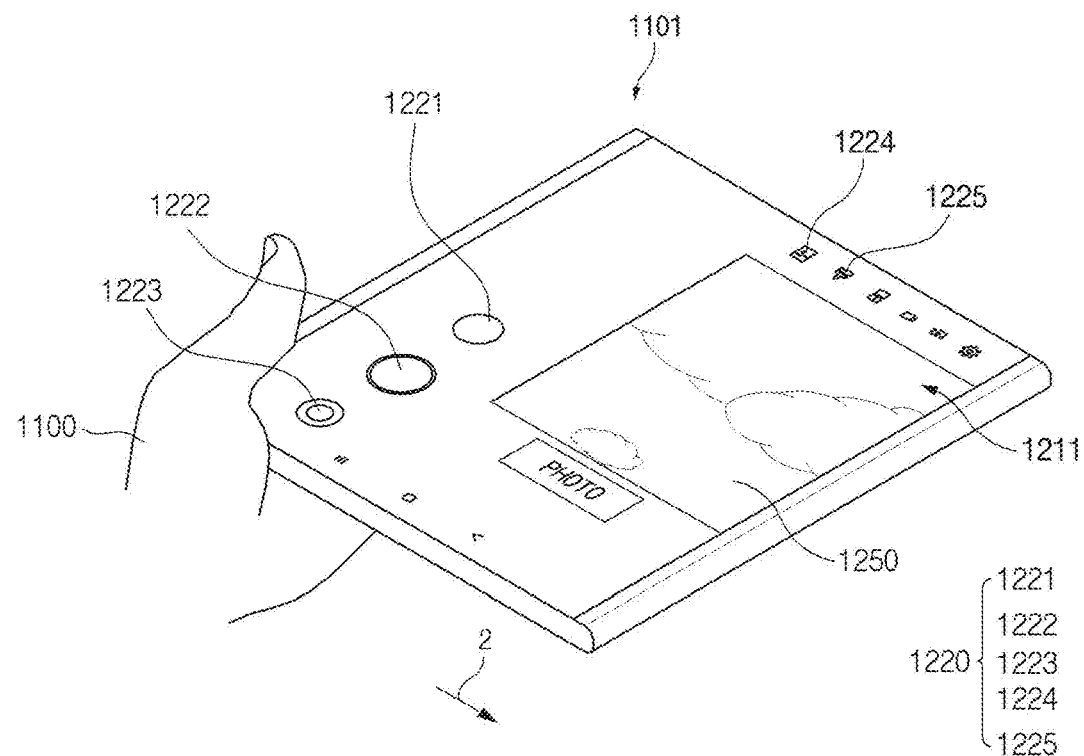
FIG. 12B illustrates an electronic device according to an embodiment of the disclosure.
Figure 12B:
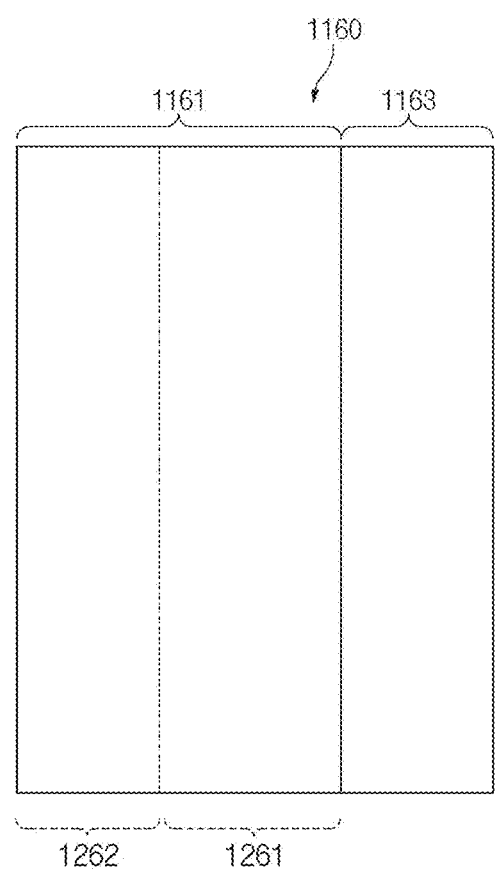

FIG. 12B illustrates the electronic device according to an embodiment of the disclosure.

Figure 12C:
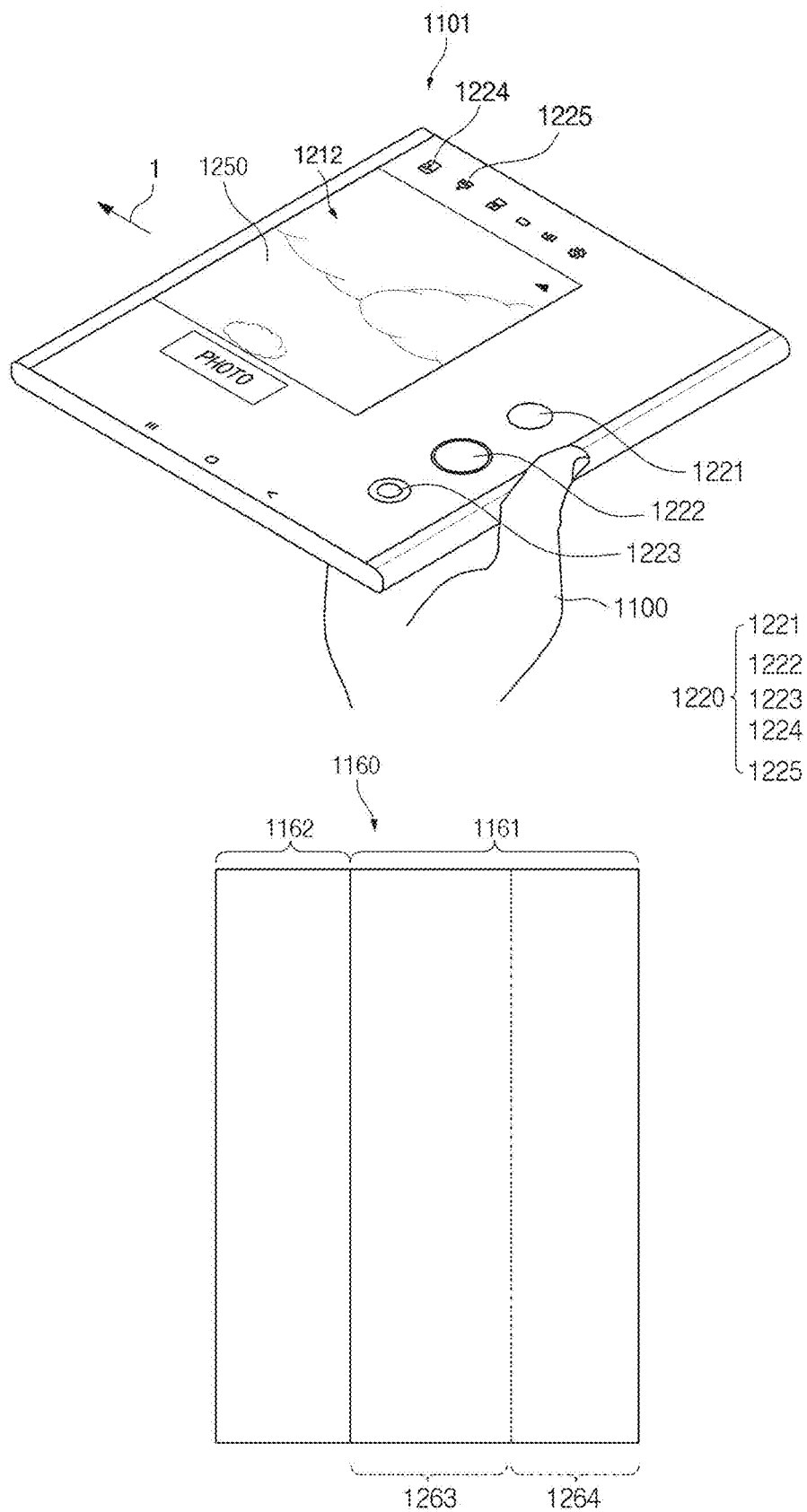
FIG. 12C illustrates an electronic device according to an embodiment of the disclosure.

FIG. 12C illustrates the electronic device according to an embodiment of the disclosure.

Figure 12D:
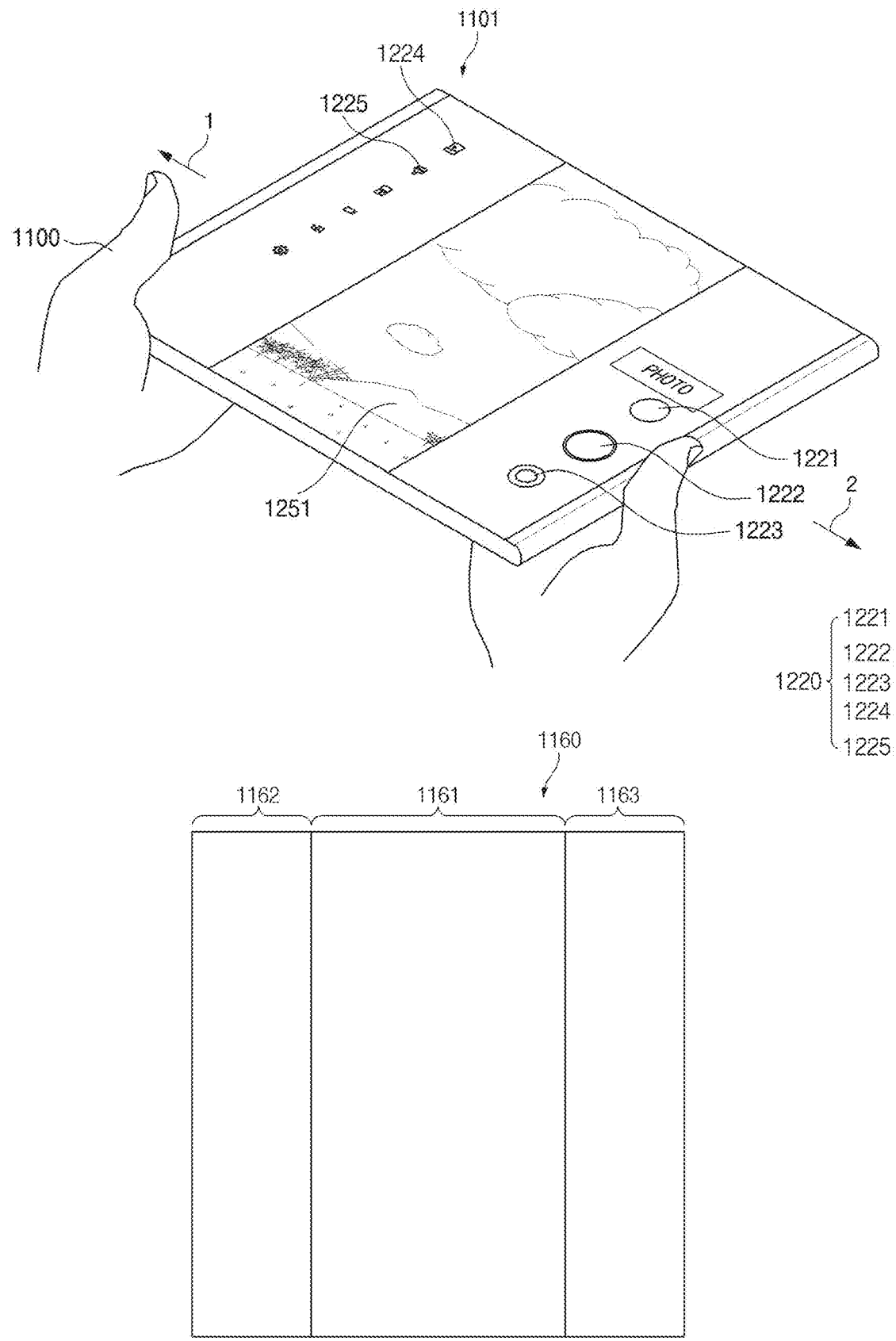
FIG. 12D illustrates an electronic device according to an embodiment of the disclosure.

FIG. 12D illustrates the electronic device according to an embodiment of the disclosure.

Referring to FIG. 12A, the electronic device 1101 according to an embodiment may display a first screen 1210 on the first region 1161 of the display 1160. In an embodiment of the disclosure, the first screen 1210 may be an execution screen of a camera application. In an embodiment of the disclosure, the first screen 1210 may include a preview image 1250 based on at least some of images obtained from at least one camera of the electronic device 1101 (e.g., a camera module 3280 of FIG. 32) and a plurality of objects 1220 for controlling the at least one camera. The plurality of objects 1220 may include a first object 1221, a second object 1222, a third object 1223, a fourth object 1224, and a fifth object 1225. In an embodiment of the disclosure, each of the plurality of objects 1220 may correspond to at least one of control functions of the at least one camera, for example, a shutter, a flash setting, a sensitivity setting, a focus setting, a white balance setting, a timer setting, an exposure setting, access to a setting menu, and/or access to a gallery, but is not limited by the above-described examples.

The electronic device 1101 according to an embodiment may determine whether the electronic device 1101 is gripped by a left hand, a right hand, or both hands of a user 1100. In an embodiment of the disclosure, the electronic device 1101 may detect whether the display 1160 is extended in a first direction 1 and/or a second direction 2.

Referring to FIG. 12B, in an embodiment of the disclosure, when the electronic device 1101 is gripped by the left hand of the user 1100 and the display 1160 is extended in the second direction 2, the electronic device 1101 may display a second screen 1211 on the third region 1163 and a partial region 1261 of the first region 1161 extending from the third region 1163. In an embodiment of the disclosure, the second screen 1211 may include the remaining objects other than at least some of the plurality of objects 1220. For example, the second screen 1211 may include the fourth object 1224 and the fifth object 1225 other than the first object 1221, the second object 1222, and the third object 1223 among the plurality of objects 1220. In an embodiment of the disclosure, when the electronic device 1101 is gripped by the left hand of the user 1100 and the display 1160 is extended in the second direction 2, the electronic device 1101 may display the at least some objects excluded from the second screen 1221 on the remaining region 1262 of the first region 1161. For example, the at least some objects may include the first object 1221, the second object 1222, and the third object 1223. In an embodiment of the disclosure, the partial region 1261 and the remaining region 1262 may be regions obtained by dividing the first region 1161 into left and right portions at a specified ratio.

In an embodiment of the disclosure, when it is determined that the display 1160 is extended in the second direction 2, the electronic device 1101 may control the second variable magnet member 1172 such that a repulsive force acts between a second magnet member (e.g., the second magnet member 274 of FIG. 2) and the second variable magnet member 1172.

In an embodiment of the disclosure, when it is determined that the display 1160 is extended in the second direction 2, the electronic device 1101 may control the second actuator 1154 to apply a force to the third housing (e.g., the third housing 130 of FIG. 4A) in the second direction 2.

Referring to FIG. 12C, when the electronic device 1101 is gripped by the right hand of the user 1100 and the display 1160 is extended in the first direction 1, the electronic device 1101 according to an embodiment may display a third screen 1222 on the second region 1162 and a partial region 1263 of the first region 1161 extending from the second region 1162. In an embodiment of the disclosure, the third screen 1221 may include the remaining objects (e.g., the fourth object 1224 and the fifth object 1225) other than at least some objects (e.g., the first to third objects 1221 to 1223) among the plurality of objects 1220. When the electronic device 1101 is gripped by the right hand of the user 1100 and the display 1160 is extended in the first direction 1, the electronic device 1101 according to an embodiment may display the at least some objects (e.g., the objects 1221, 1222, and 1223) excluded from the second screen 1221 on the remaining region 1264 of the first region 1161. In an embodiment of the disclosure, the partial region 1263 and the remaining region 1264 may be regions obtained by dividing the first region 1161 into left and right portions at a specified ratio.

In an embodiment of the disclosure, when it is determined that the display 1160 is extended in the first direction 1, the electronic device 1101 may control the first variable magnet member 1162 such that a repulsive force acts between a first magnet member (e.g., the first magnet member 274 of FIG. 8A) and the first variable magnet member 1162.

In an embodiment of the disclosure, when it is determined that the display 1160 is extended in the first direction 1, the electronic device 1101 may control the second actuator 1154 to apply a force to the second housing (e.g., the second housing 120 of FIG. 4A) in the second direction 2.

Referring to FIG. 12D, when the electronic device 1101 is gripped by both the hands of the user 1100 and the display 1160 is extended in the first direction 1 and the second direction 2, the electronic device 1101 according to an embodiment may display a first group of objects (e.g., the fourth object 1224 and the fifth object 1225) among the plurality of objects 1220 on the second region 1162 and may display a second group of objects (e.g., the first to third objects 1221 to 1223) among the plurality of objects 1220 on the third region 1163. In an embodiment of the disclosure, the electronic device 1101 may magnify a preview image 1151 obtained by using the at least one camera such that the preview image 1151 corresponds to the area of the first region 1161.

Figure 31:
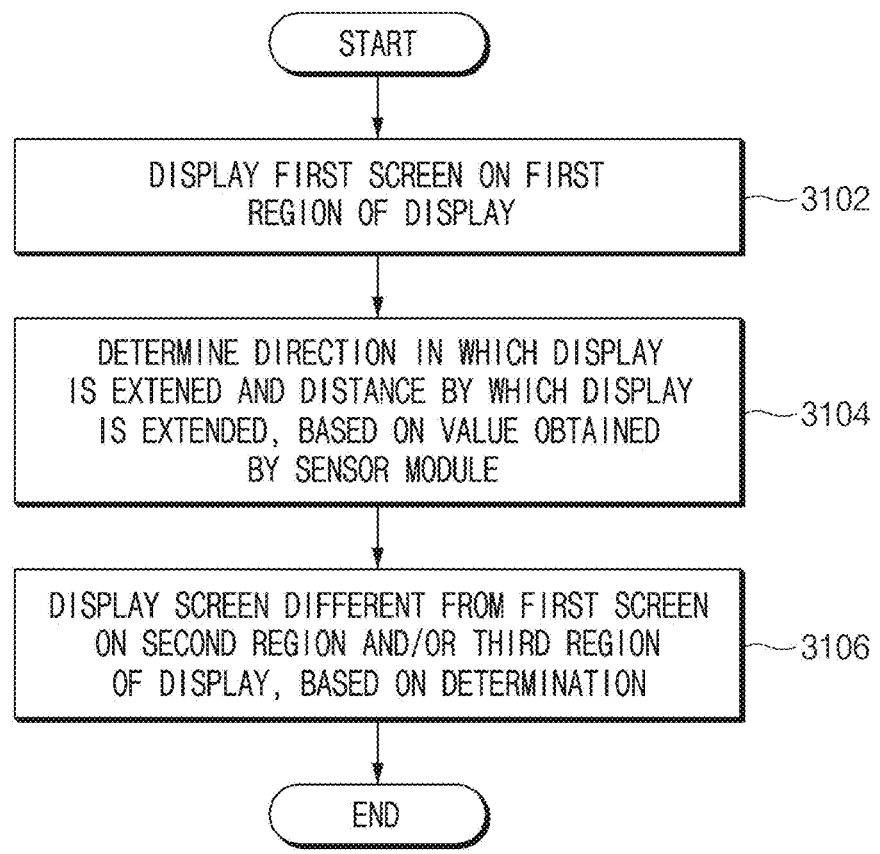
FIG. 31 is a flowchart illustrating operations performed by an electronic device according to an embodiment of the disclosure.

The description given with reference to FIG. 12A may correspond to operation 3102 of FIG. 31.

The descriptions given with reference to FIGS. 12B, 12C, and 12D may correspond to operation 3106 of FIG. 31.

Figure 13A:
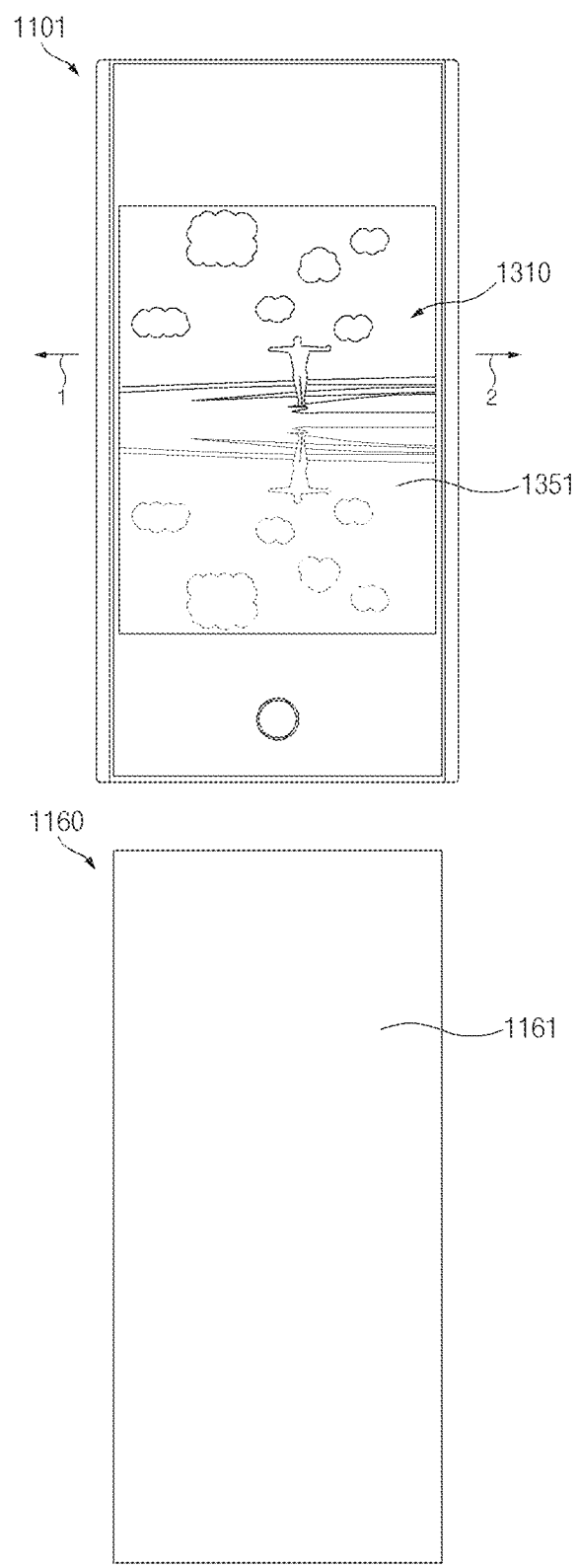
FIG. 13A illustrates an electronic device according to an embodiment of the disclosure.

FIG. 13A illustrates the electronic device according to an embodiment of the disclosure.

Figure 13B:
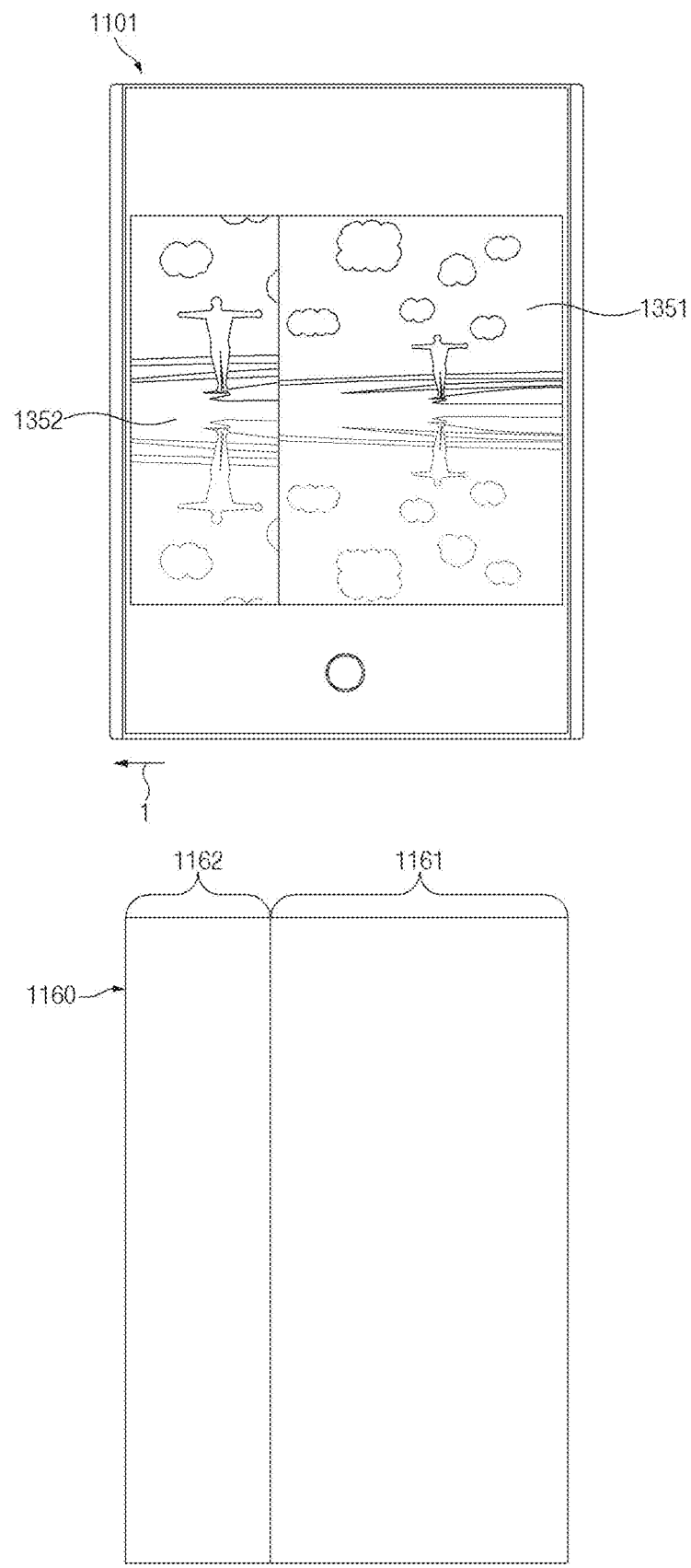
FIG. 13B illustrates an electronic device according to an embodiment of the disclosure.

FIG. 13B illustrates the electronic device according to an embodiment of the disclosure.

Figure 13C:
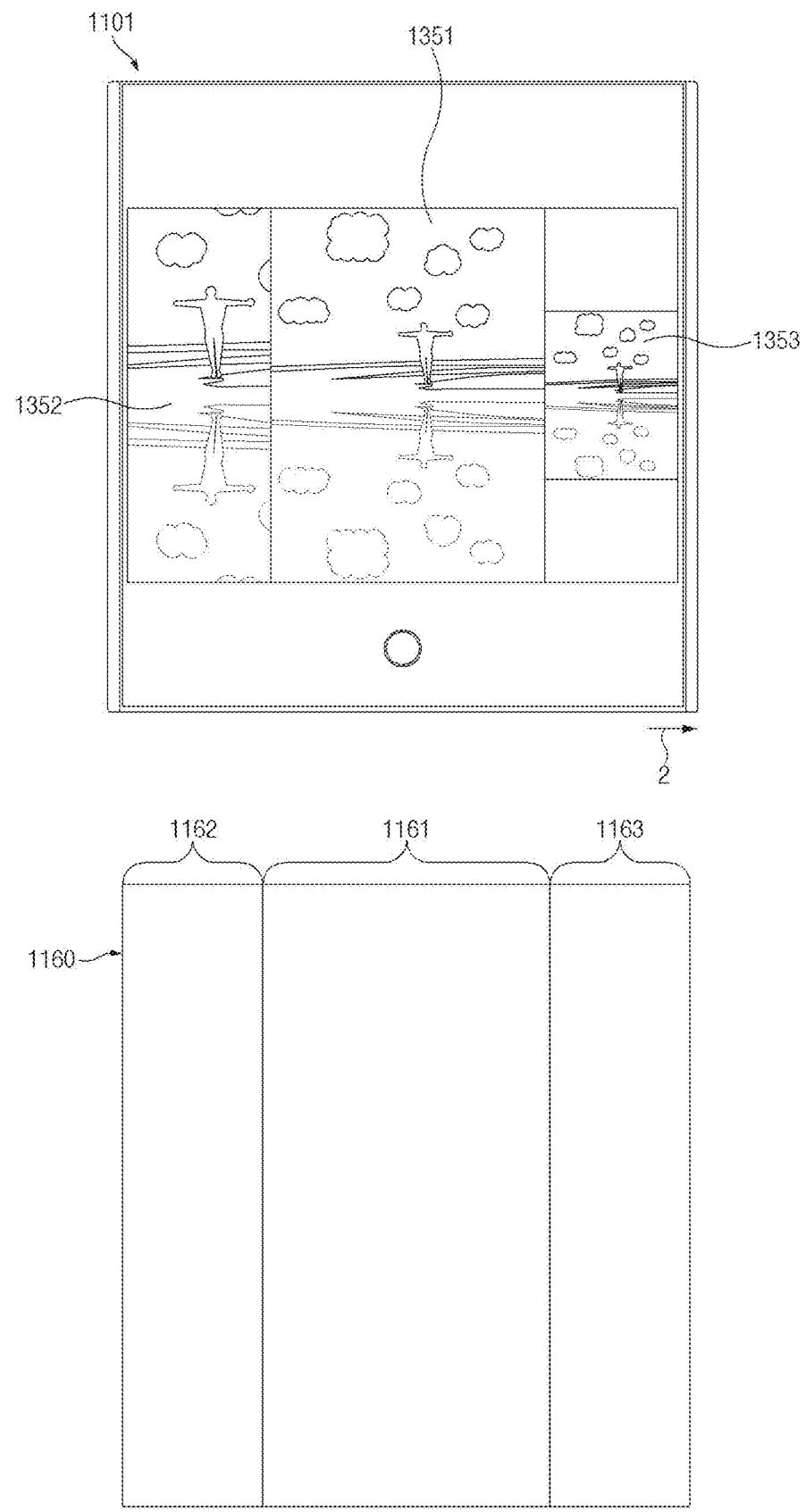
FIG. 13C illustrates an electronic device according to an embodiment of the disclosure.

FIG. 13C illustrates the electronic device according to an embodiment of the disclosure.

Referring to FIG. 13A, the electronic device 1101 according to an embodiment may display a first screen 1310 including a first preview image 1351 on the first region 1161 of the display 1160. In an embodiment of the disclosure, the electronic device 1101 may obtain the first preview image 1351, based on at least some of images obtained from a first camera.

Referring to FIG. 13B, when the display 1160 is extended in the first direction 1, the electronic device 1101 according to an embodiment may display a second preview image 1352 based on images obtained from a second camera on the second region 1162 of the display 1160.

Referring to FIG. 13C, when the display 1160 is extended in the second direction 2, the electronic device 1101 according to an embodiment may display a third preview image 1353 based on images obtained from a third camera on the third region 1163 of the display 1160. In an embodiment of the disclosure, the third camera may differ from the first camera and the second camera. In an embodiment of the disclosure, the second camera may differ from the first camera. For example, the third camera may have a larger field of view (FOV) than the first camera. For example, the first camera may have a larger field of view than the second camera.

In an embodiment of the disclosure, the electronic device 1101 may determine a camera to display a preview image depending on the area of an exposed region of the display. For example, the electronic device 1101 according to an embodiment may detect the area by which the display 160 is exposed and may display a preview image based on the detection. For example, unlike in FIG. 13C, the electronic device 1101 may display a preview image (e.g., the third preview image 1353) of the third camera having a larger field of view than the first camera on the first region 1161 having a larger area than the third region 1163. In another example, the electronic device 1101 may display a preview image (e.g., the second preview image 1352) of the second camera having a smaller field of view than the first camera on the second region 1162 having a smaller area than the first region 1161.

The description given with reference to FIG. 13A may correspond to operation 3102 of FIG. 31.

The descriptions given with reference to FIGS. 13B and 13C may correspond to operation 3106 of FIG. 31.

Figure 14A:
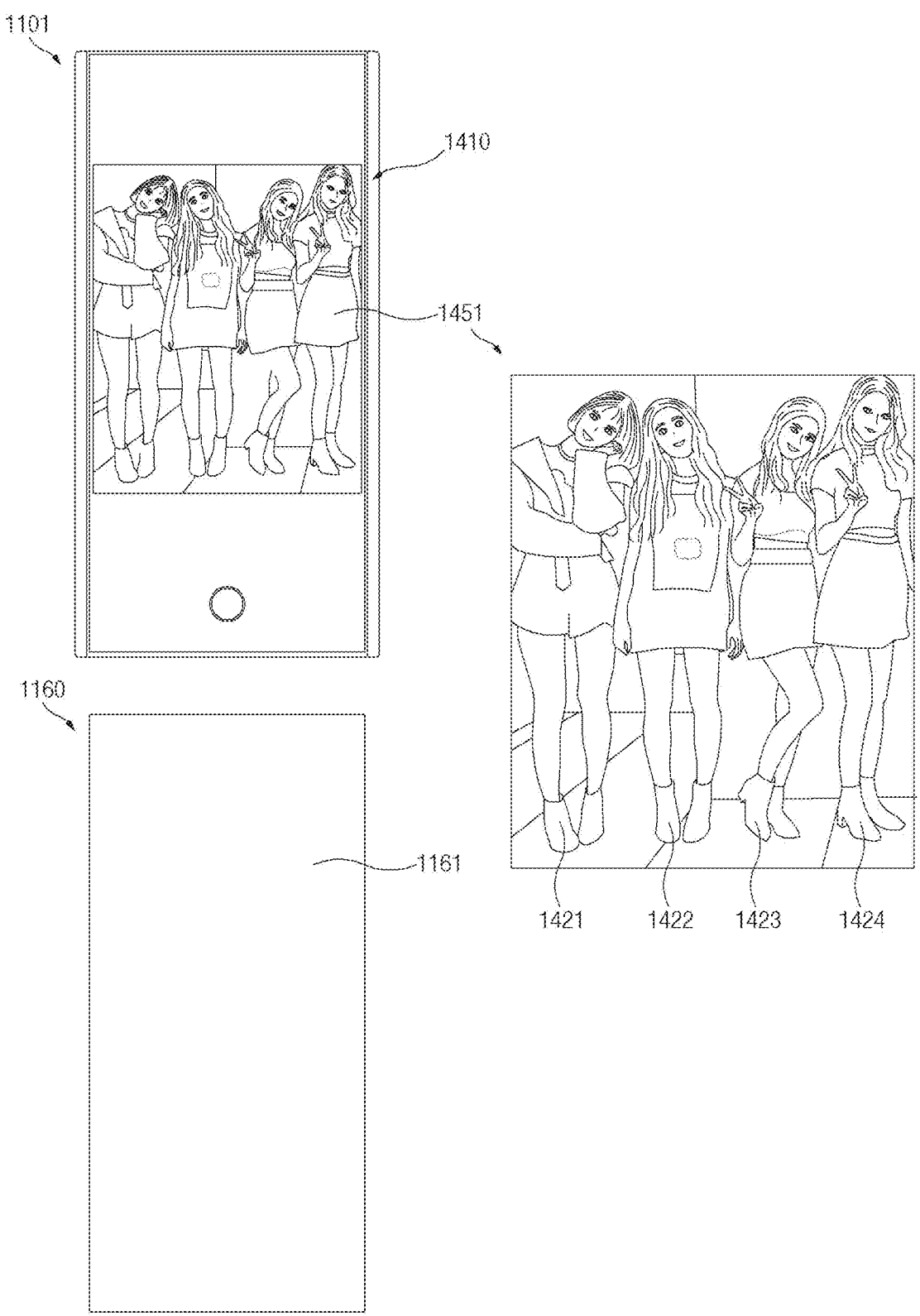
FIG. 14A illustrates a front surface of an electronic device according to an embodiment of the disclosure.

FIG. 14A illustrates the front surface of the electronic device according to an embodiment of the disclosure.

Figure 14B:
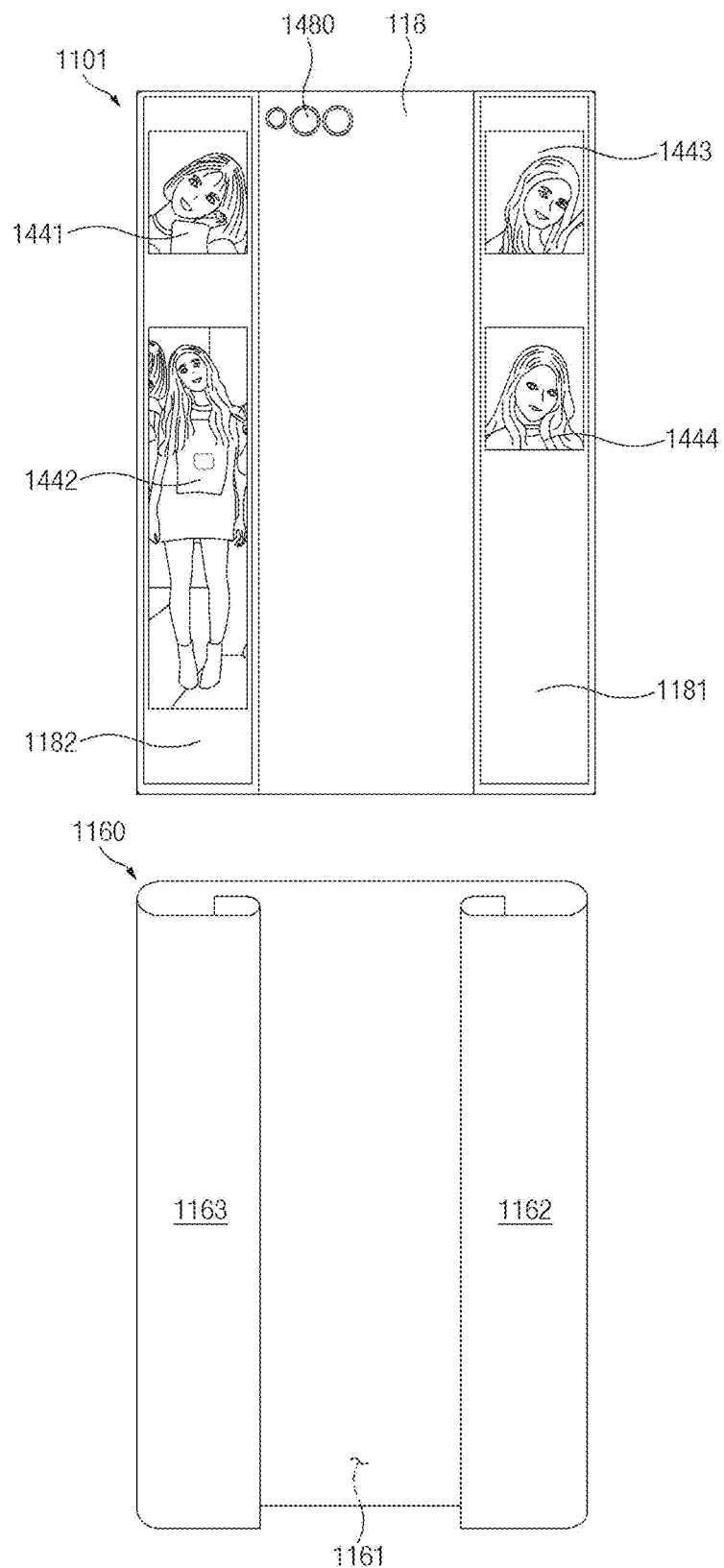
FIG. 14B illustrates a rear surface of an electronic device according to an embodiment of the disclosure.

FIG. 14B illustrates the rear surface of the electronic device according to an embodiment of the disclosure.

Referring to FIGS. 14A and 14B, the electronic device 1101 according to an embodiment may display, on the first region 1161 of the display 1160, a first screen 1410 including a first preview image 1451 based on at least some of images obtained through at least one camera 1480.

The electronic device 1101 according to an embodiment may identify subjects 1421, 1422, 1423, and 1424 included in the first preview image 1451. The electronic device 1101 according to an embodiment may obtain images 1441, 1442, 1443, and 1444 corresponding to the subjects 1421, 1422, 1423, and 1424, based on the identification. For example, the electronic device 1101 may obtain the first image 1441 corresponding to a face of the identified first subject 1421. In another example, the electronic device 1101 may obtain the second image 1442 corresponding to a whole body of the identified second subject 1422.

When the display 1600 is not extended (or, while the electronic device 1101 is in a normal state), the electronic device 1101 according to an embodiment may display the images 1441, 1442, 1443, and 1444 on the first region 1611 and/or the second region 1612 of the display 1600. For example, the electronic device 1101 may display the third image 1443 corresponding to the third subject 1423 on the second region 1162. In another example, the electronic device 1101 may display the second image 1442 corresponding to the second subject 1422 on the third region 1163.

In an embodiment of the disclosure, the images 1441, 1442, 1443, and 1444 displayed on the second region 1162 and/or the third region 1163 of the display 1160 may be visible through a first specified region 1181 and a second specified region 11182 of the back plate 118 that is substantially transparent.

Although the plurality of subjects included in the first preview image 1451 and the plurality of images corresponding to the subjects are illustrated in FIGS. 14A and 14B, the disclosure is not limited thereto. For example, the electronic device 1101 may identify only one subject from the first preview image 1451 and may obtain only one image corresponding to the one subject, based on the identification. In this respect, the subjects 1421, 1422, 1423, and 1424 may be referred to as at least one subject, and the images 1441, 1442, 1443, and 1444 may be referred to as at least one image.

The description given with reference to FIG. 14A may correspond to operation 3102 of FIG. 31.

The description given with reference to FIG. 14B may correspond to operation 3106 of FIG. 31.

Figure 15A:
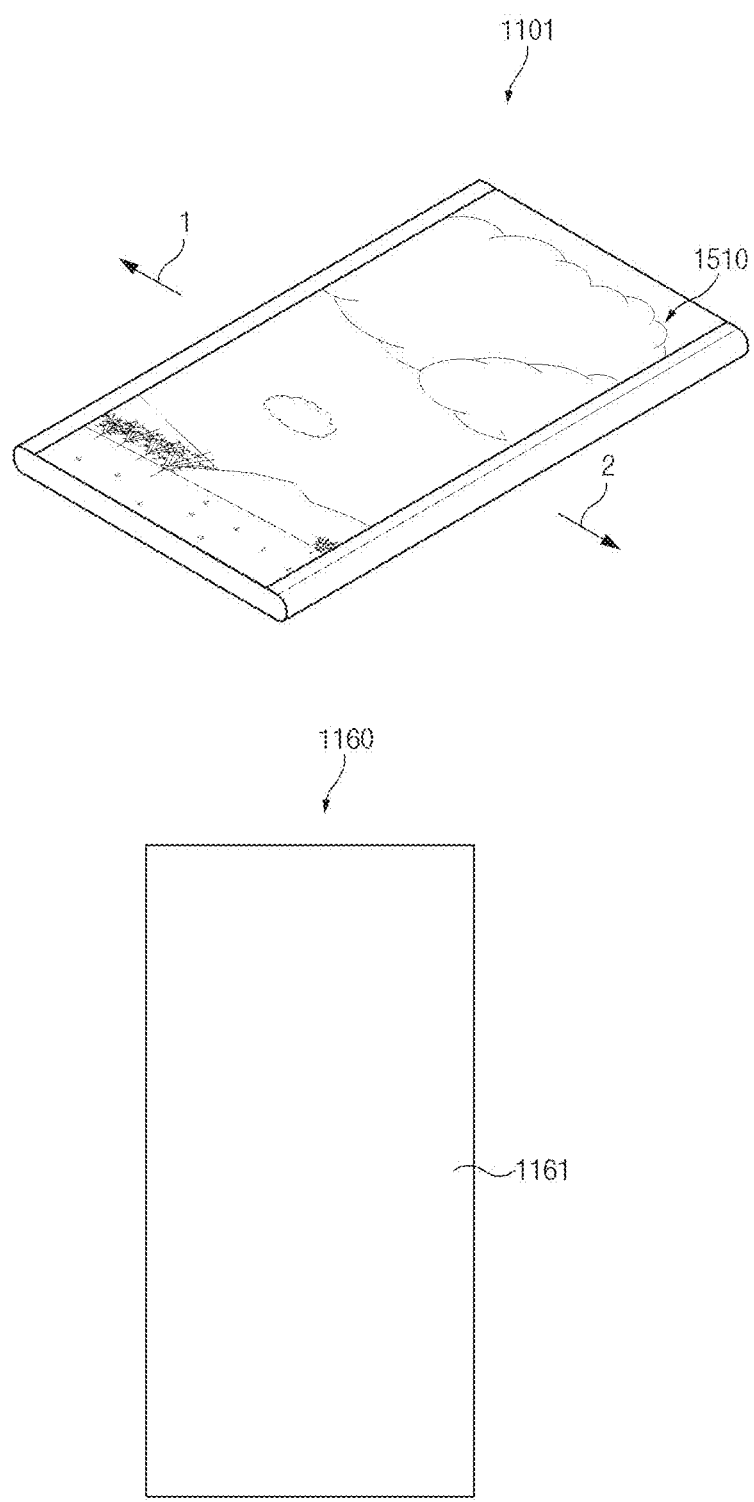
FIG. 15A illustrates an electronic device according to an embodiment of the disclosure.

FIG. 15A illustrates the electronic device according to an embodiment of the disclosure.

Figure 15B:
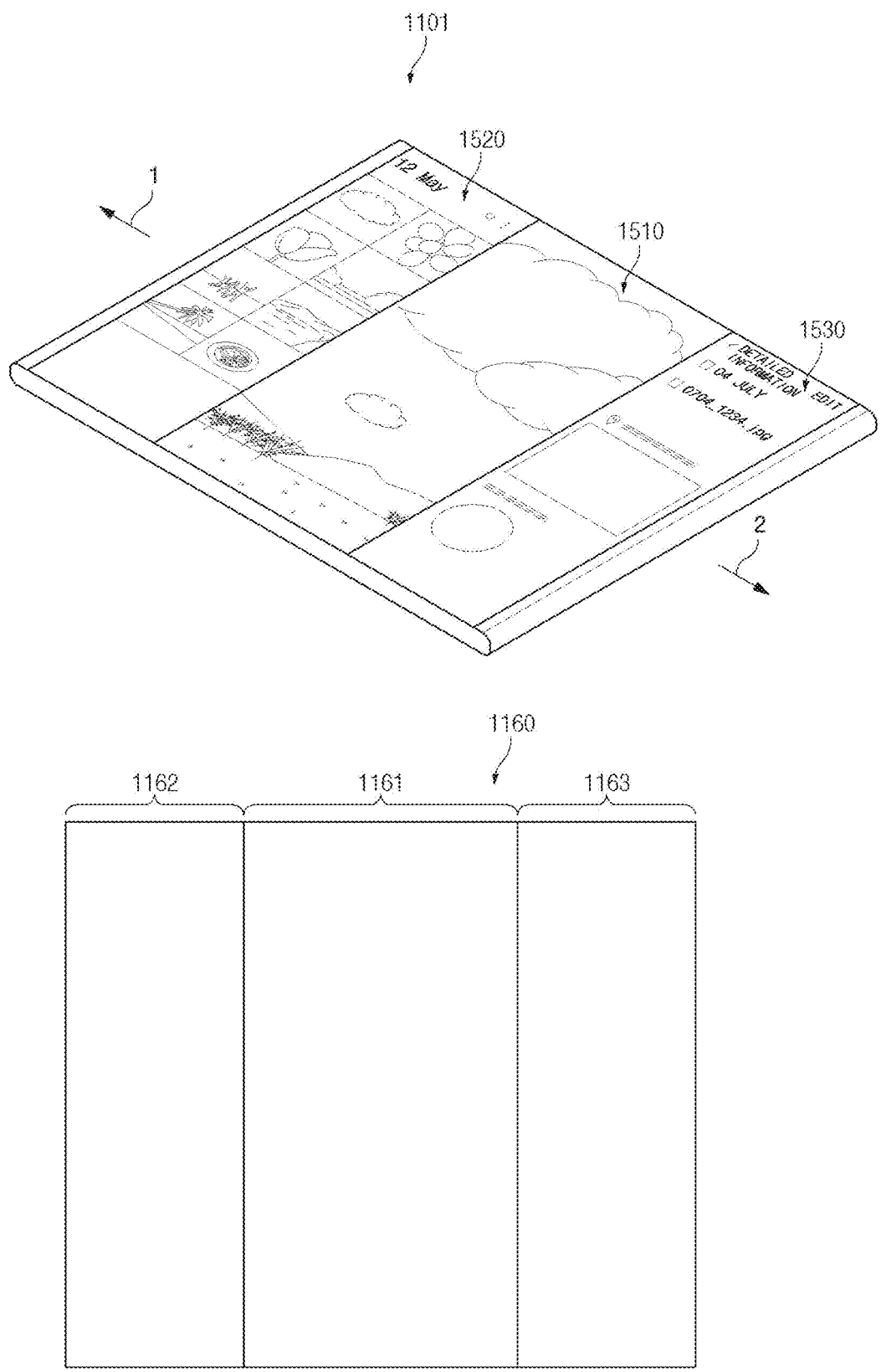
FIG. 15B illustrates an electronic device according to an embodiment of the disclosure.

FIG. 15B illustrates the electronic device according to an embodiment of the disclosure.

Figure 16A:
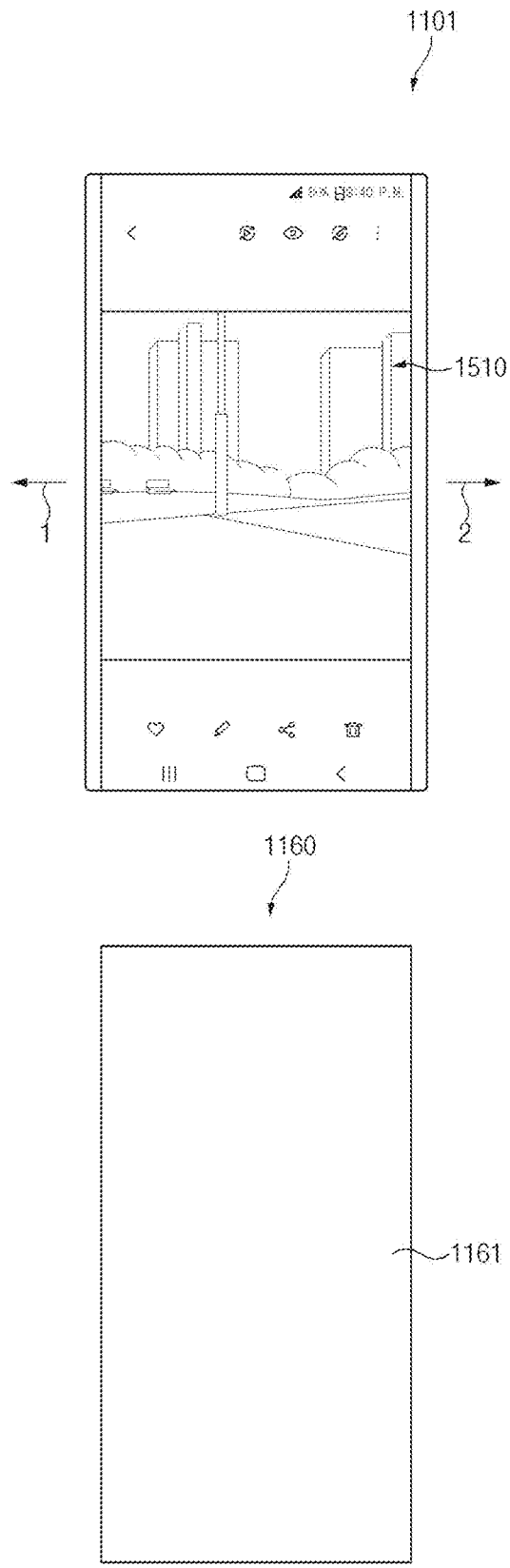
FIG. 16A illustrates an electronic device according to an embodiment of the disclosure.

FIG. 16A illustrates the electronic device according to an embodiment of the disclosure.

Figure 16B:
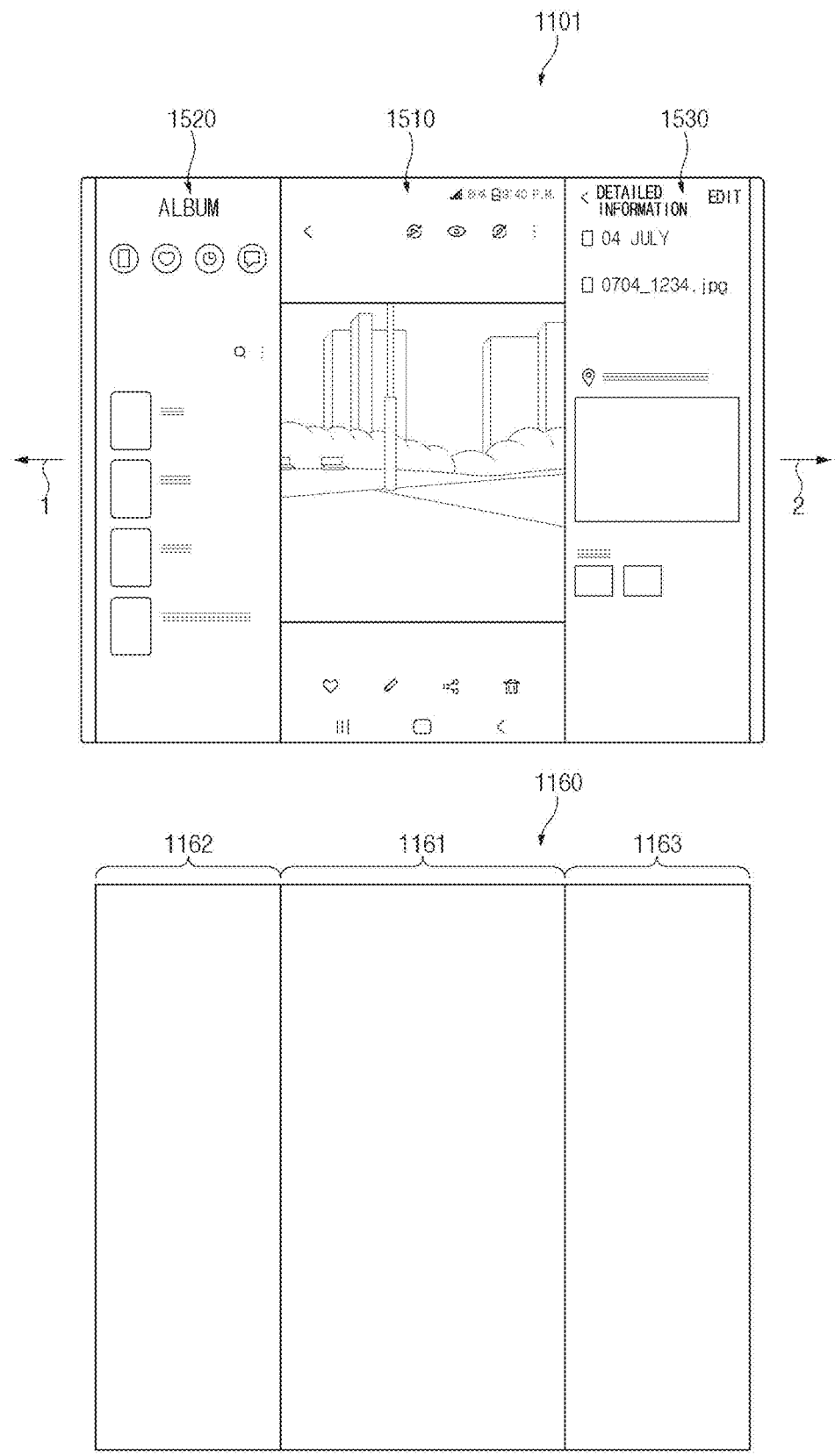
FIG. 16B illustrates an electronic device according to an embodiment of the disclosure.

FIG. 16B illustrates the electronic device according to an embodiment of the disclosure.

Referring to FIGS. 15A and 16A, the electronic device 1101 according to an embodiment may display, on the first region 1161 of the display 1160, a first screen 1510 representing first content among contents stored in the electronic device 1101. For example, the first content may be an image or a video stored in the memory 1103 of the electronic device 1101, and the first screen 1510 may be a playback screen of the image or the video. In another example, the first screen 1510 may be an execution screen of an application for managing the contents stored in the electronic device 1101.

Referring to FIGS. 15B and 16B, when the display 1160 is extended in the first direction 1, the electronic device 1101 according to an embodiment may display, on the second region 1162, a first user interface (UI) 1520 representing first information related to the contents. For example, the first information may be information representing the list of the contents stored in the electronic device 1101.

When the display 11620 is extended in the second direction 2, the electronic device 1101 according to an embodiment may display, on the third region 1163, a second UI 1530 representing second information that is related to the first content displayed on the first screen 1510 and that differs from the first information. For example, the second information may include detailed information of the first content. For example, in a case in which the first content is a photo file, the second information may include the name and size of the photo file, the date and time when the photo was taken, and the location where the photo was taken. However, the disclosure is not limited by the above example. For example, the first information and the second information provided through the first UI 1520 and the second UI 1530 may be previously defined, and the pre-defined first information and the pre-defined second information may differ from the above example.

The descriptions given with reference to FIGS. 15A and 16A may correspond to operation 3102 of FIG. 31.

The descriptions given with reference to FIGS. 15B and 16B may correspond to operation 3106 of FIG. 31.

Figure 17A:
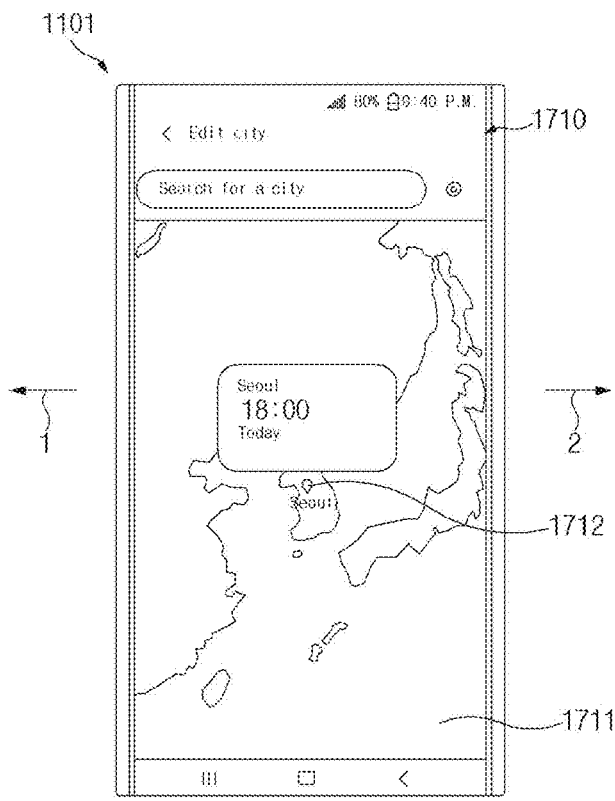
FIG. 17A illustrates an electronic device according to an embodiment of the disclosure.
Figure 17A:
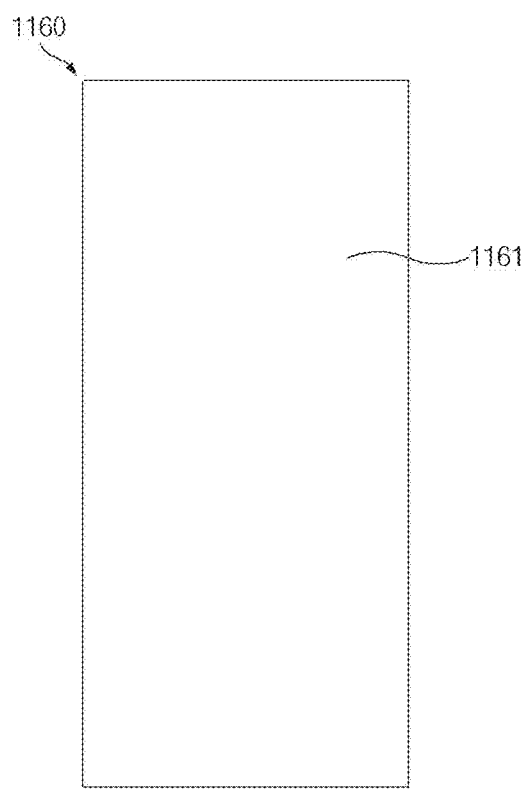

FIG. 17A illustrates the electronic device according to an embodiment of the disclosure.

Figure 17B:
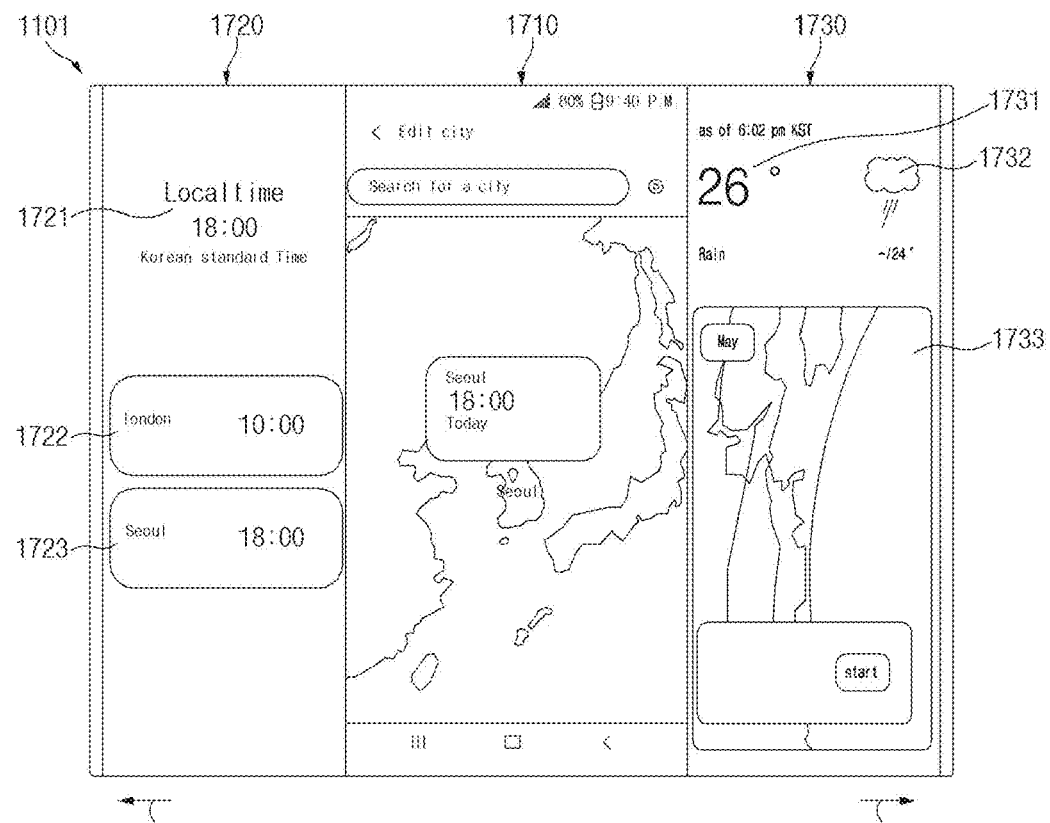
FIG. 17B illustrates an electronic device according to an embodiment of the disclosure.
Figure 17B:
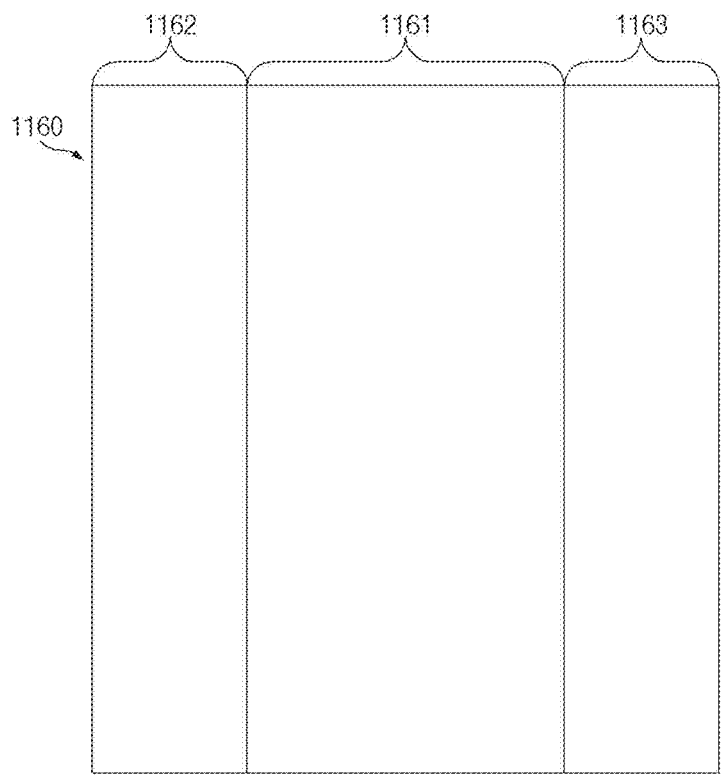

FIG. 17B illustrates the electronic device according to an embodiment of the disclosure.

Referring to FIG. 17A, the electronic device 1101 according to an embodiment may display, on the first region 1161 of the display 1160, a first screen 1710 that is an execution screen of a map application. The electronic device 1101 according to an embodiment may display, on the first region 1161 of the display 1160, a map 1711 and an object 1712 representing the current location of the electronic device 101 on the map 1711.

Referring to FIG. 17B, when the display 1160 is extended in the first direction 1, the electronic device 1101 according to an embodiment may display a first UI 1720 representing first information on the second region 1162. For example, the first information may include time information of several locations. For example, the first UI 1720 may include an object 1721 representing the time at the current location of the electronic device 1101 and objects 1722 and 1723 representing the time at preset locations.

When the display 1160 is extended in the second direction 2, the electronic device 1101 according to an embodiment may display, on the third region 1163, a second UI 1730 representing second information that is related to the current location of the electronic device 101 and that differs from the first information. For example, the second information may include an object 1731 representing the temperature at the current location of the electronic device 1101 and an object 1732 representing a weather condition, and a weather map 1733. However, the disclosure is not limited by the above example. For example, the first information and the second information provided through the first UI 1720 and the second UI 1730 may be previously defined, and the pre-defined first information and the pre-defined second information may differ from the above example.

The description given with reference to FIG. 17A may correspond to operation 3102 of FIG. 31.

The description given with reference to FIG. 17B may correspond to operation 3106 of FIG. 31.

Figure 18A:
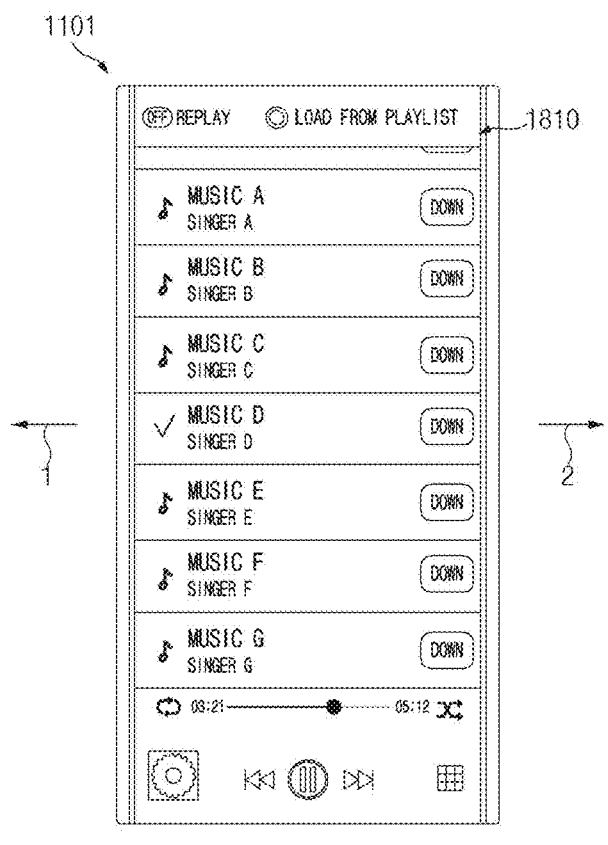
FIG. 18A illustrates an electronic device according to an embodiment of the disclosure.
Figure 18A:
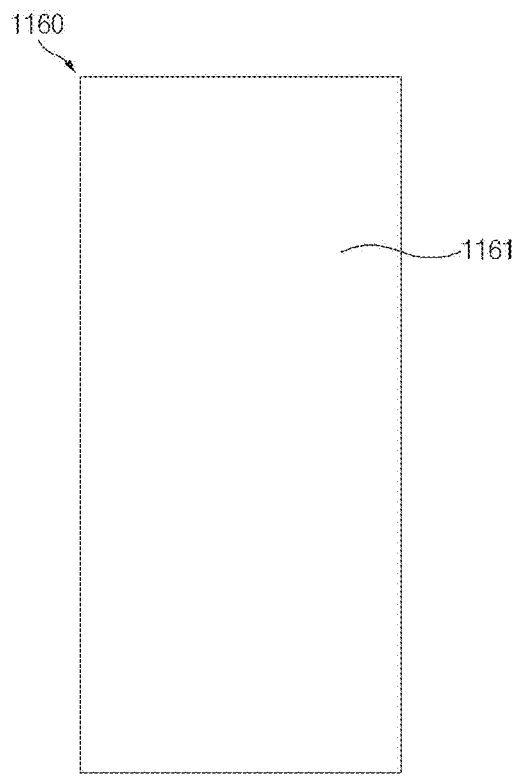

FIG. 18A illustrates the electronic device according to an embodiment of the disclosure.

Figure 18B:
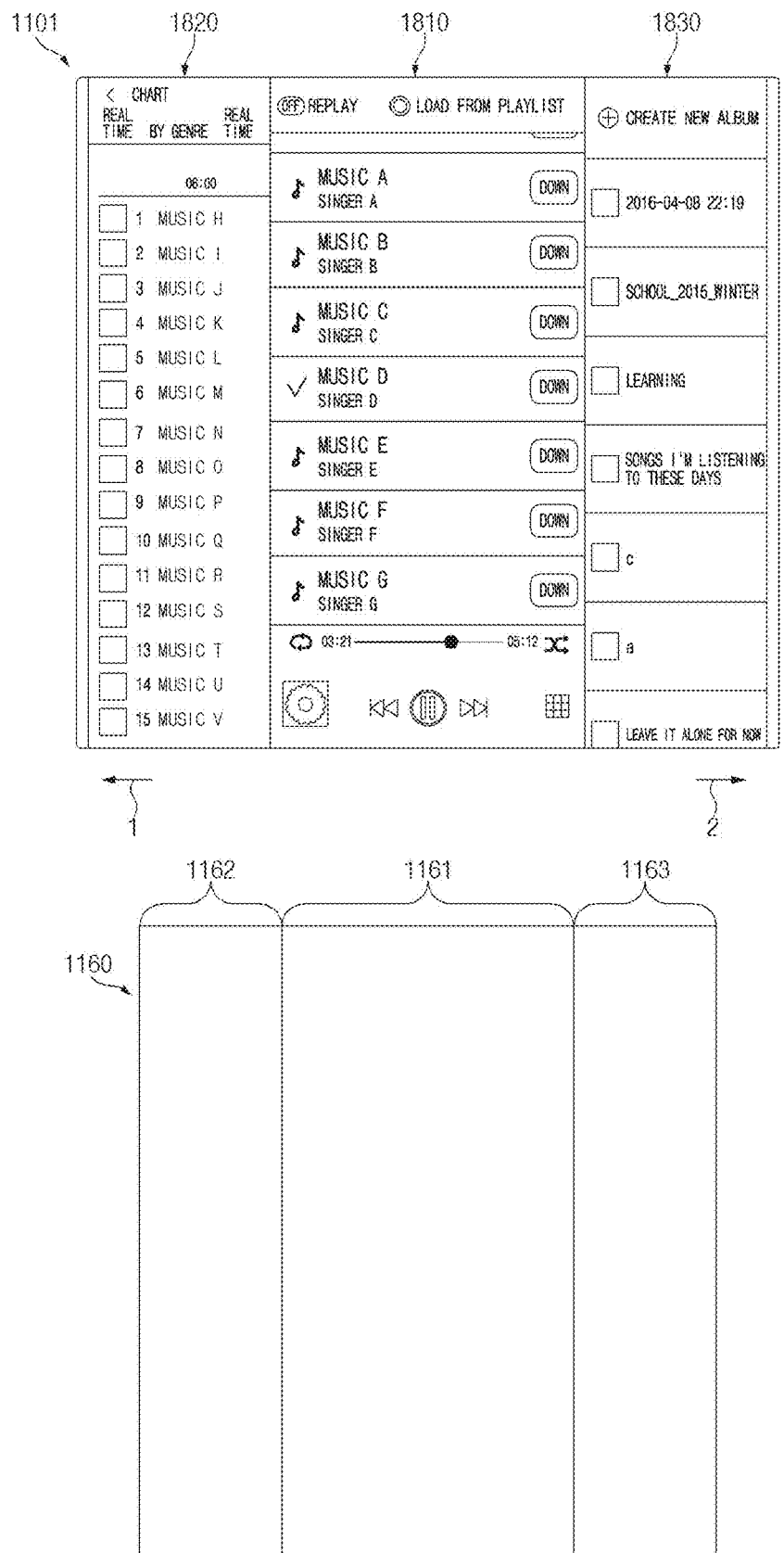
FIG. 18B illustrates an electronic device according to an embodiment of the disclosure.

FIG. 18B illustrates the electronic device according to an embodiment of the disclosure.

Referring to FIG. 18A, the electronic device 1101 according to an embodiment may display, on the first region 1161 of the display 1160, a first screen 1810 that is an execution screen of a music application. In an embodiment of the disclosure, the first screen 1810 may include objects representing a playlist and objects (e.g., a progress bar) for controlling music being currently played.

Referring to FIG. 18B, when the display 1160 is extended in the first direction 1, the electronic device 1101 according to an embodiment may display a first UI 1820 representing first information on the second region 1162. In an embodiment of the disclosure, the first information may include a music chart provided from a server.

When the display 11620 is extended in the second direction 2, the electronic device 1101 according to an embodiment may display, on the third region 1163, a second UI 1830 representing second information different from the first information. For example, the second information may include a music list stored in the electronic device 1101. However, the disclosure is not limited by the above example. For example, the first information and the second information provided through the first UI 1820 and the second UI 1830 may be previously defined, and the pre-defined first information and the pre-defined second information may differ from the above example.

The description given with reference to FIG. 18A may correspond to operation 3102 of FIG. 31.

The description given with reference to FIG. 18B may correspond to operation 3106 of FIG. 31.

Figure 19A:
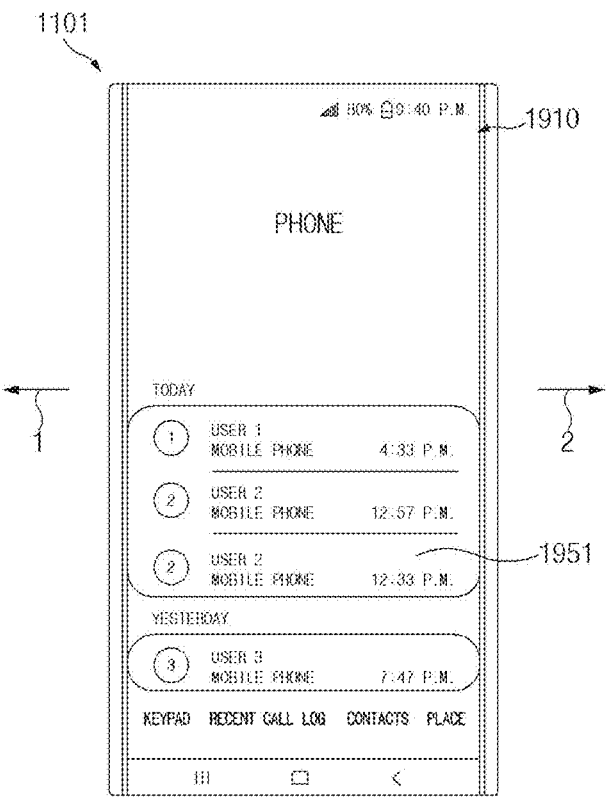
FIG. 19A illustrates an electronic device according to an embodiment of the disclosure.
Figure 19A:
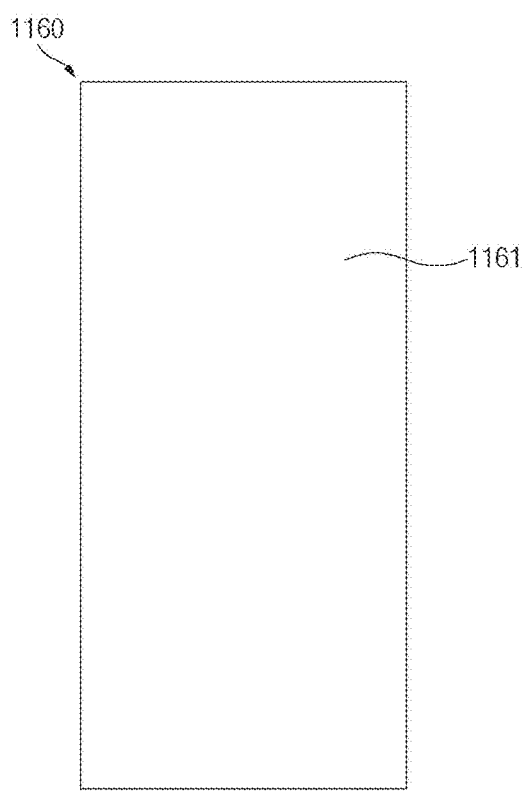

FIG. 19A illustrates the electronic device according to an embodiment of the disclosure.

Figure 19B:
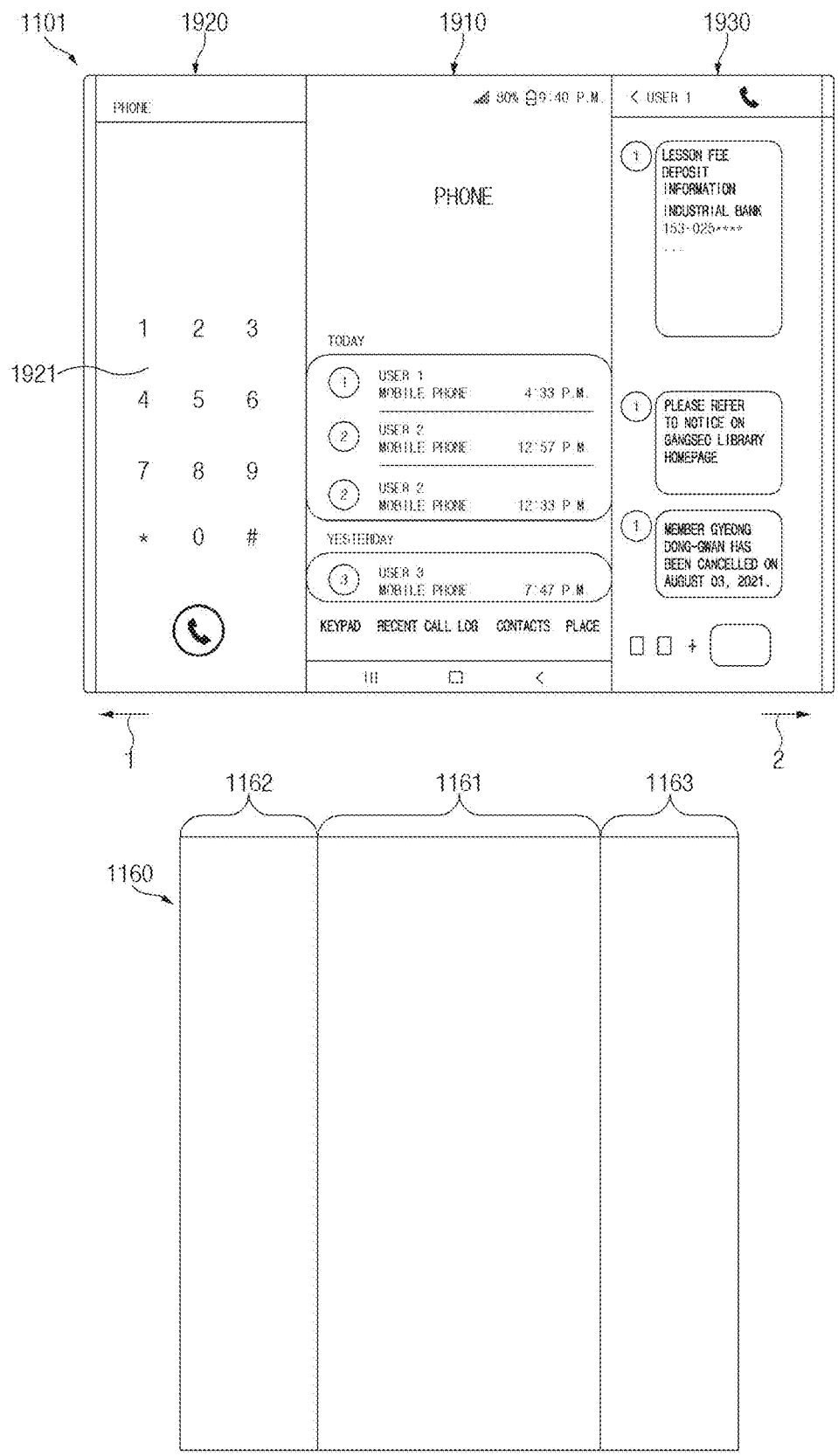
FIG. 19B illustrates an electronic device according to an embodiment of the disclosure.

FIG. 19B illustrates the electronic device according to an embodiment of the disclosure.

Referring to FIG. 19A, the electronic device 1101 according to an embodiment may display, on the first region 1161 of the display 1160, a first screen 1910 that is an execution screen of a phone application. In an embodiment of the disclosure, the first screen 1910 may include a first UI 1951 representing a history of calls with other users.

Referring to FIG. 19B, when the display 1160 is extended in the first direction 1, the electronic device 1101 according to an embodiment may display, on the second region 1162 of the display 1160, a second UI 1920 including a keypad 1921 for entering a phone number.

In an embodiment of the disclosure, when the display 1160 is extended in the second direction 2, the electronic device 1101 may display an execution screen of an SMS application on the third region 1163 of the display 1160. In an embodiment of the disclosure, when the display 1160 is extended in the second direction 2, the electronic device 1101 may display a third UI 1920 representing an SMS history with a specific user (e.g., user 1) on the third region 1163.

The description given with reference to FIG. 19A may correspond to operation 3102 of FIG. 31.

The description given with reference to FIG. 19B may correspond to operation 3106 of FIG. 31.

Figure 20A:
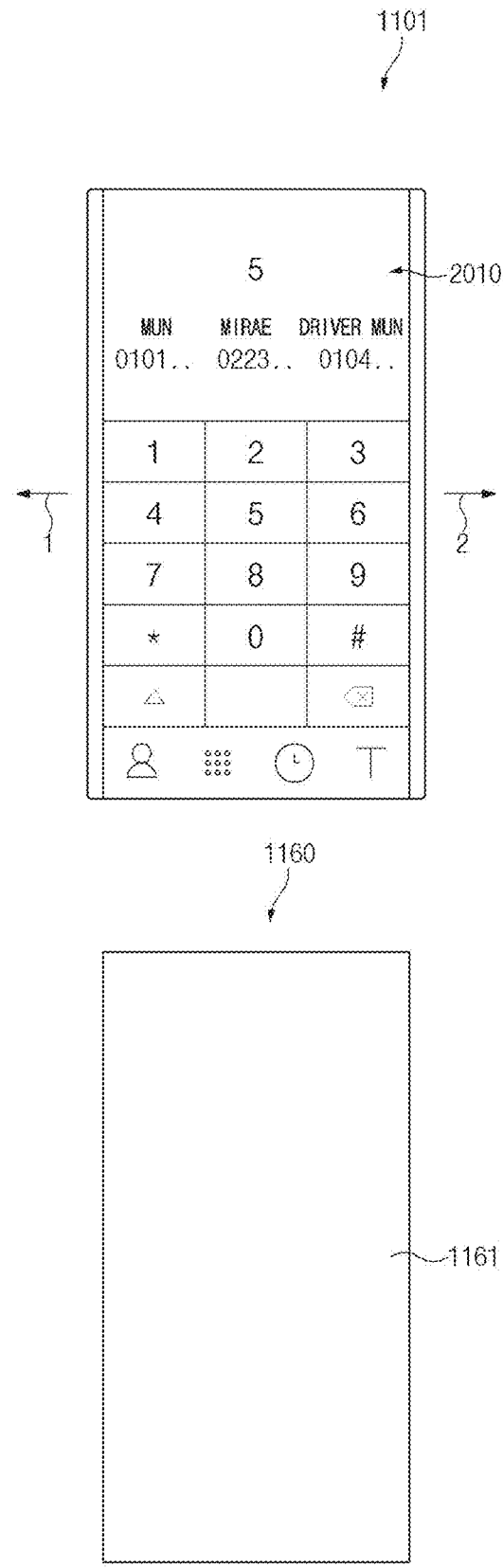
FIG. 20A illustrates an electronic device according to an embodiment of the disclosure.

FIG. 20A illustrates the electronic device according to an embodiment of the disclosure.

Figure 20B:
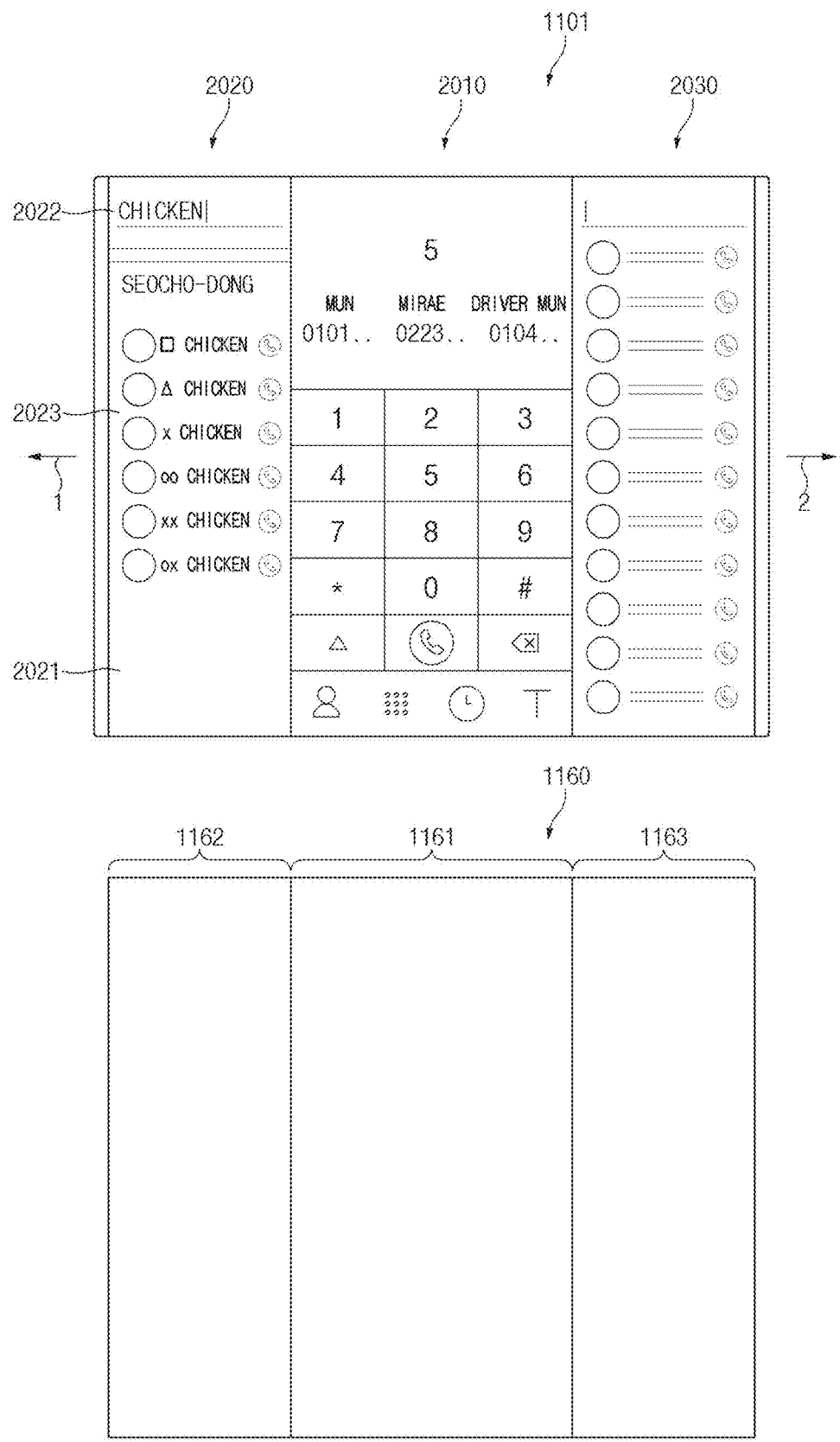
FIG. 20B illustrates an electronic device according to an embodiment of the disclosure.

FIG. 20B illustrates the electronic device according to an embodiment of the disclosure.

Referring to FIG. 20A, the electronic device 1101 according to an embodiment may display, on the first region 1161 of the display 1160, a first screen 2010 that is an execution screen of a phone application. In an embodiment of the disclosure, the first screen 1910 may include a keypad for entering a phone number.

Referring to FIG. 20B, when the display 1160 is extended in the first direction 1, the electronic device 1101 according to an embodiment may display, on the second region 1162 of the display 1160, a first UI 2020 for searching for contacts stored in the electronic device 1101 (or, a server). In an embodiment of the disclosure, the first UI 2020 may include a keyboard 2021 for text input, a region 2022 on which text input through the keyboard 2021 is displayed, and a region 2023 on which found contacts are displayed.

In an embodiment of the disclosure, when the display 1160 is extended in the second direction 2, the electronic device 1101 may display a second UI 2030 representing a history of calls with other users on the third region 1163 of the display 1160.

The description given with reference to FIG. 20A may correspond to operation 3102 of FIG. 31.

The description given with reference to FIG. 20B may correspond to operation 3106 of FIG. 31.

Figure 21A:
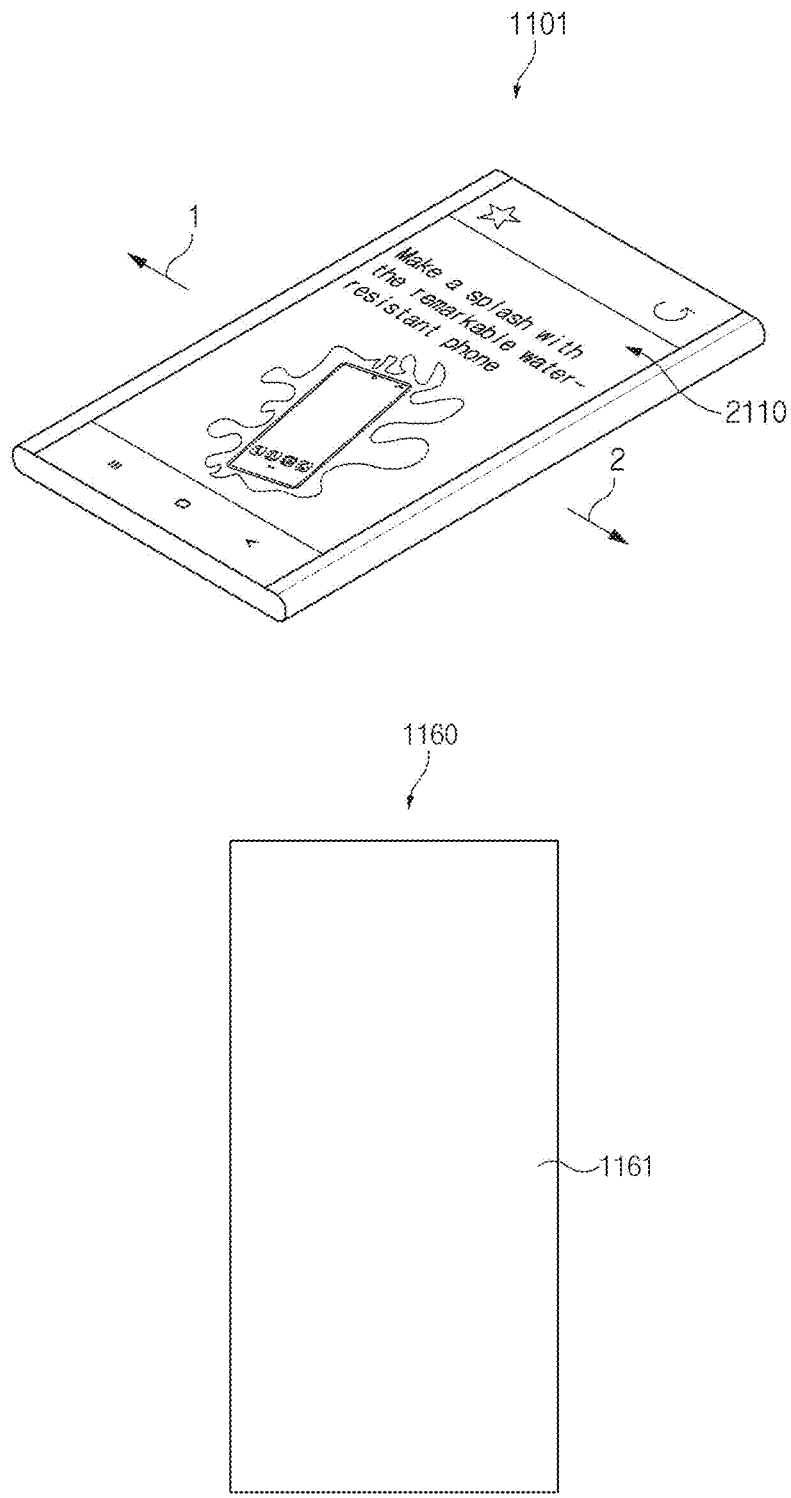
FIG. 21A illustrates an electronic device according to an embodiment of the disclosure.

FIG. 21A illustrates the electronic device according to an embodiment of the disclosure.

Figure 21B:
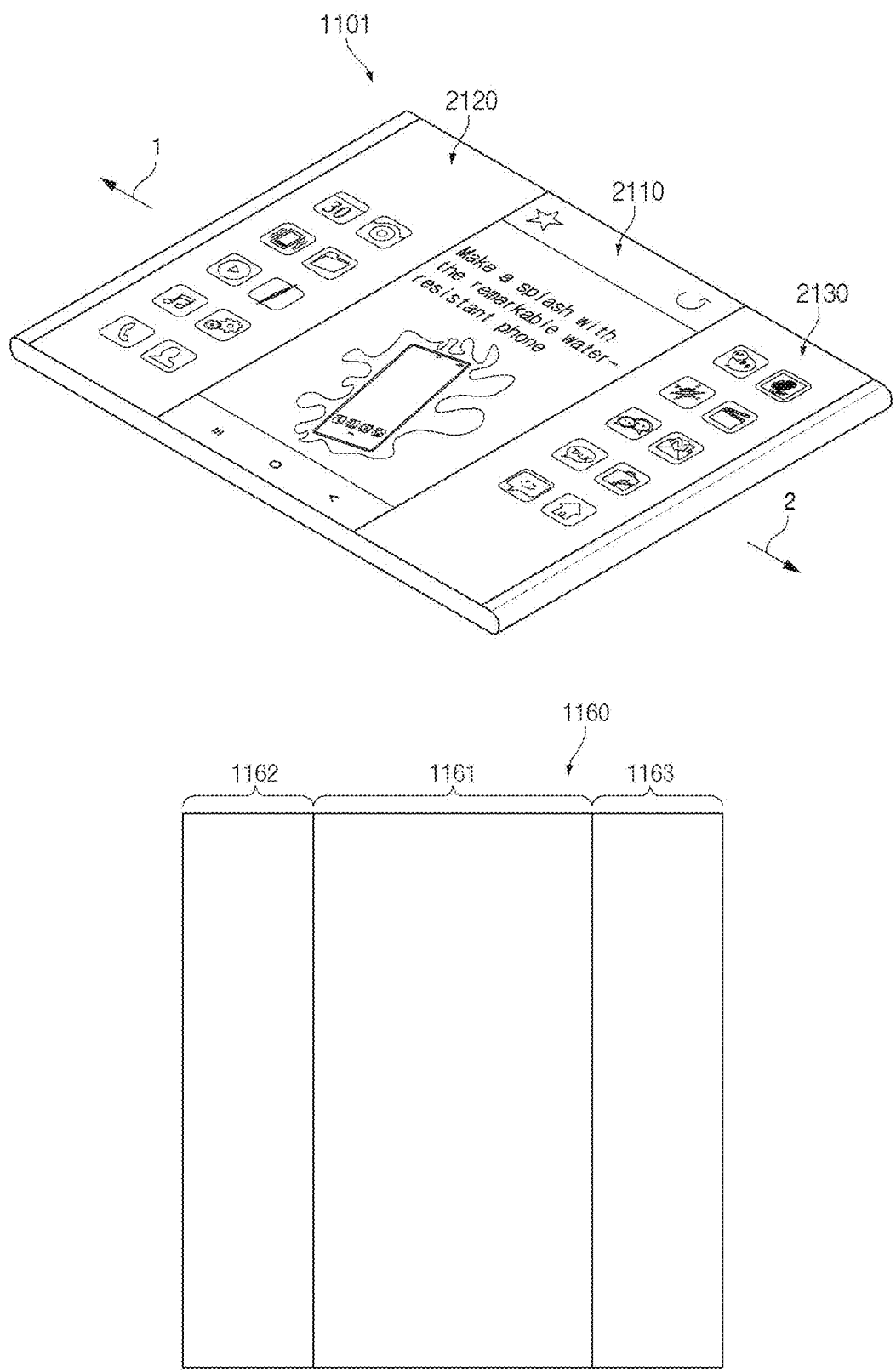
FIG. 21B illustrates an electronic device according to an embodiment of the disclosure.

FIG. 21B illustrates the electronic device according to an embodiment of the disclosure.

Figure 21C:
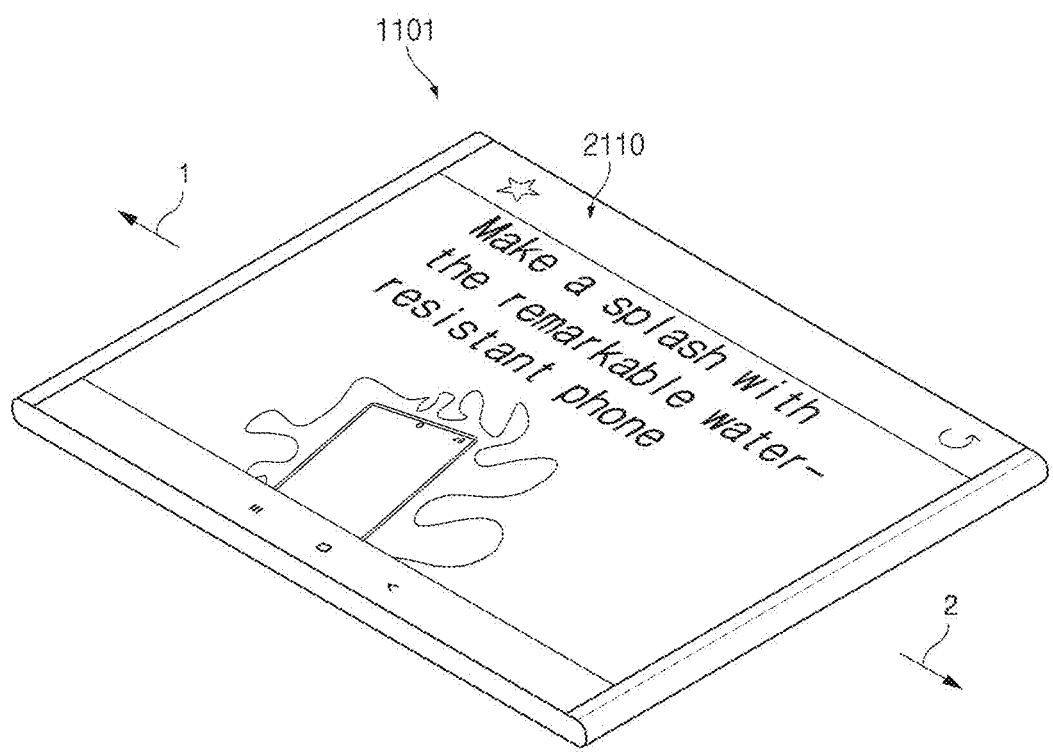
FIG. 21C illustrates an electronic device according to an embodiment of the disclosure.
Figure 21C:
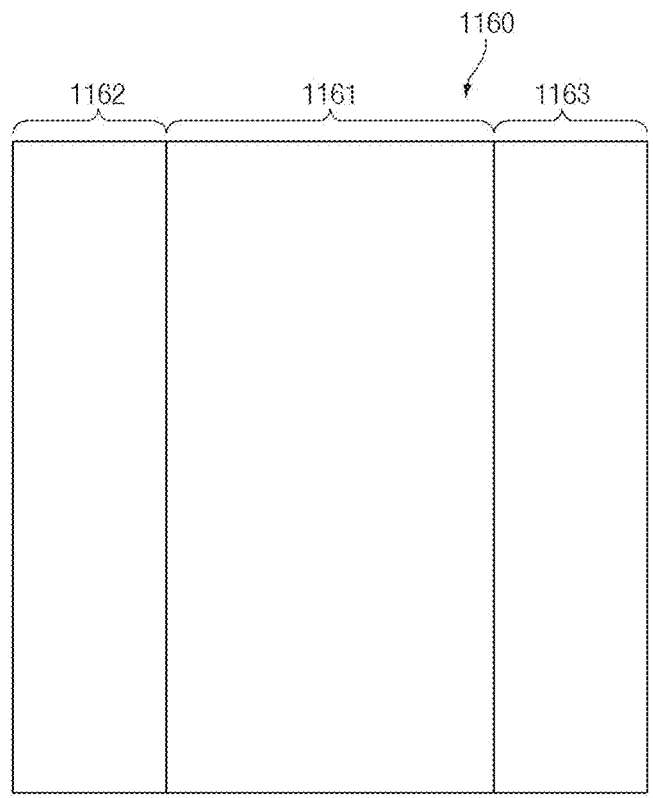

FIG. 21C illustrates the electronic device according to an embodiment of the disclosure.

Referring to FIG. 21A, the electronic device 1101 according to an embodiment may display, on the first region 1161 of the display 1160, a first screen 2110 that is an execution screen of a first application. The first application may include, for example, a web browsing application.

Referring to FIG. 21B, in an embodiment of the disclosure, when the display 1160 is extended in the first direction 1, the electronic device 1101 may maintain the first screen 2110 displayed on the first region 1161 and may display a second screen 2120 different from the first screen 2110 on the second region 1162. In an embodiment of the disclosure, the second screen 2120 may include, for example, a plurality of icons representing applications stored in the electronic device 1101.

In an embodiment of the disclosure, when the display 1160 is extended in the second direction 2 after extended in the first direction 1, the electronic device 1101 may maintain the first screen 2110 displayed on the first region 1161 and the second screen 2120 displayed on the second region 1162 and may display, on the third region 1163, a third screen 2130 different from the first screen 2110 and the second screen 2120. In an embodiment of the disclosure, the third screen 2130 may include a plurality of icons representing specified applications among the applications stored in the electronic device 1101. In an embodiment of the disclosure, a user of the electronic device 1101 may set the specified applications to be displayed on the third screen 2130 among the applications stored in the electronic device 1101.

Referring to FIG. 21C, when the display 1160 is simultaneously extended in the first direction 1 and the second direction 2, the electronic device 1101 according to an embodiment may magnify the first screen 2110 and may display the magnified first screen 2110 on the first region 1161, the second region 1162, and the third region 1163 of the display 1160.

In an embodiment of the disclosure, when the display 1160 is extended in the first direction 1 or the second direction 2 or is sequentially extended in the first direction 1 and the second direction 2, the electronic device 1101 may display the second screen 2120 and/or the third screen 2130 on the second region 1162 and/or the third region 1163 of the display 1160. In an embodiment of the disclosure, when the display 1160 is simultaneously extended in the first direction 1 and the second direction 2, the electronic device 1101 may magnify the first screen 2110 and may display the magnified first screen 2110 on the first region 1161, the second region 1162, and the third region 1163 of the display 1160.

The description given with reference to FIG. 21A may correspond to operation 3102 of FIG. 31.

The descriptions given with reference to FIGS. 21B and 21C may correspond to operation 3106 of FIG. 31.

Figure 22A:
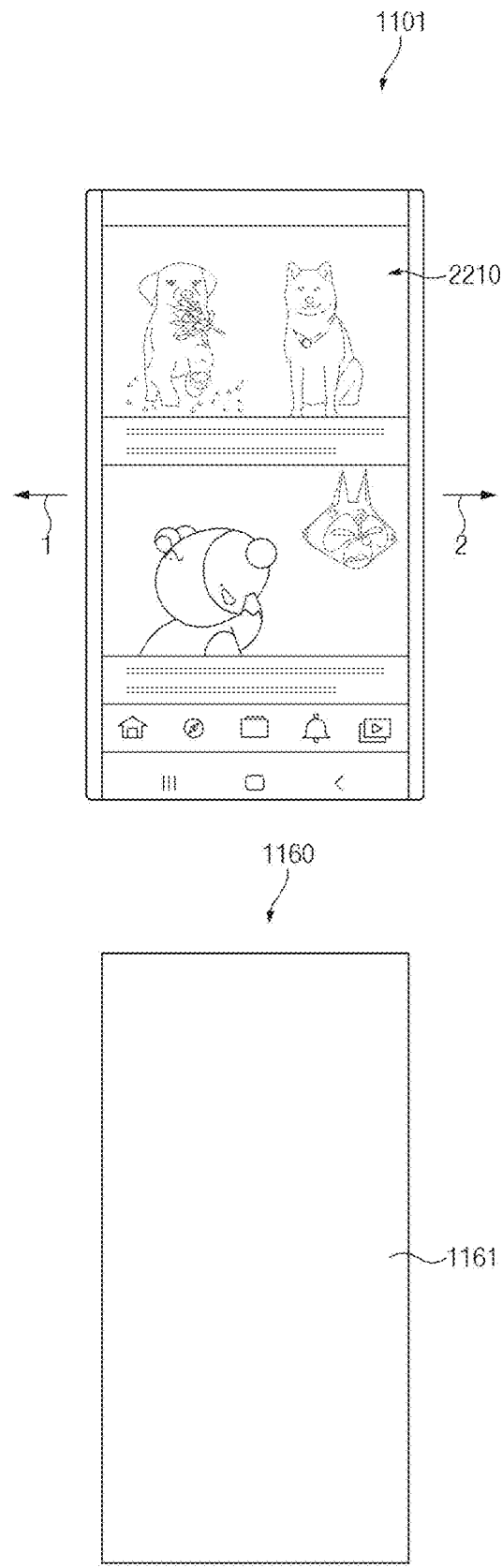
FIG. 22A illustrates an electronic device according to an embodiment of the disclosure.

FIG. 22A illustrates the electronic device according to an embodiment of the disclosure.

Figure 22B:
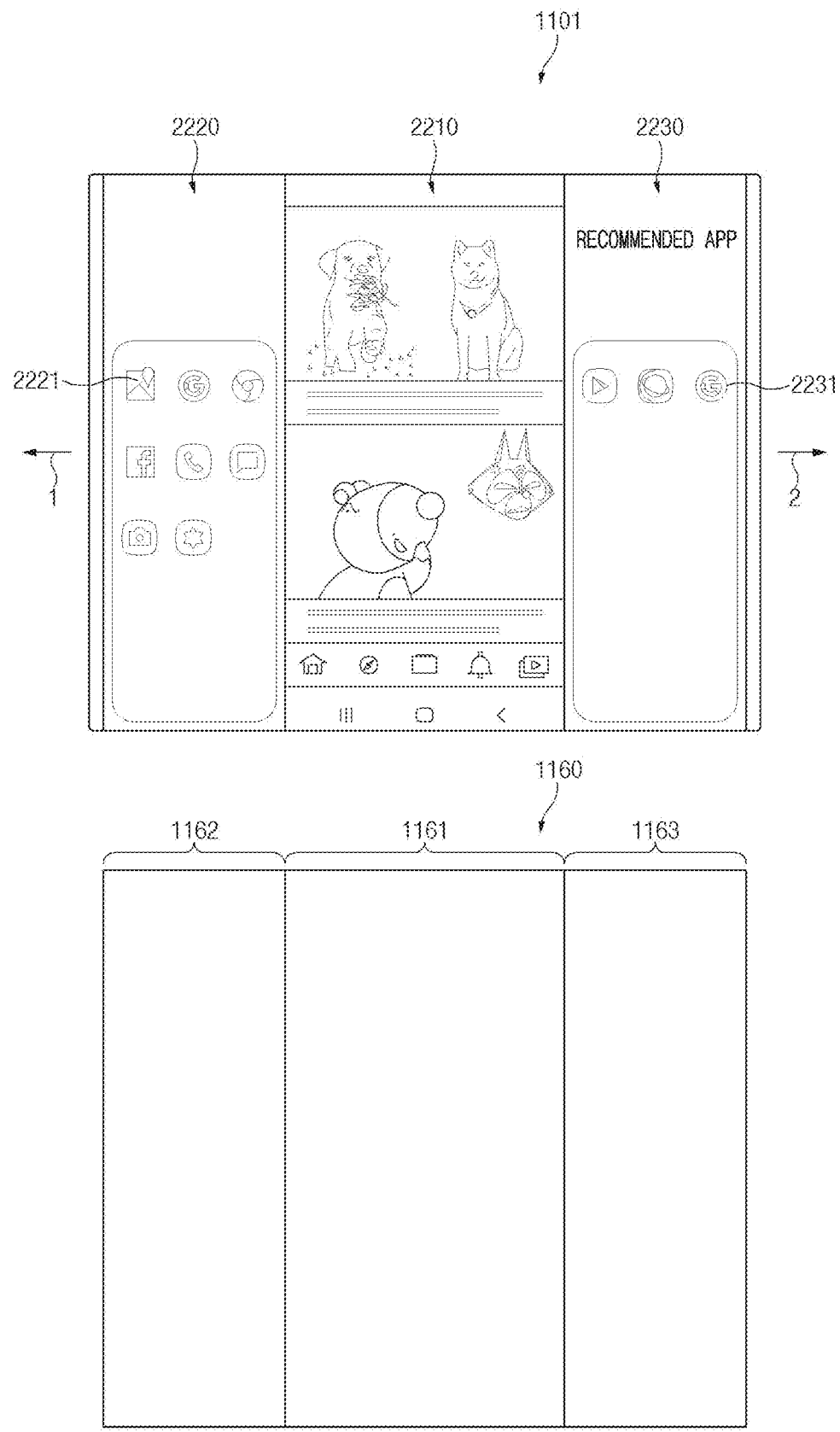
FIG. 22B illustrates an electronic device according to an embodiment of the disclosure.

FIG. 22B illustrates the electronic device according to an embodiment of the disclosure.

Referring to FIG. 22A, the electronic device 1101 according to an embodiment may display, on the first region 1161 of the display 1160, a first screen 2210 that is an execution screen of a first application.

Referring to FIG. 22B, when the display 1160 is extended in the first direction 1, the electronic device 1101 according to an embodiment may display a second screen 2220 different from the first screen 2210 on the second region 1162 of the display 1160. In an embodiment of the disclosure, the second screen 2220 may include at least one first icon 2221 representing at least one first specified application among applications stored in the electronic device 1101. In an embodiment of the disclosure, the at least one first specified application may be an application that corresponds to the same category (e.g., game, video player, or the like) as the first application among the applications stored in the electronic device 1101.

In an embodiment of the disclosure, when the display 1160 is extended in the second direction 2, the electronic device 1101 may display a third screen 2230 different from the first screen 2210 on the third region 1163 of the display 1160. In an embodiment of the disclosure, the third screen 2230 may include at least one second icon 2231 representing at least one second specified application among the applications stored in the electronic device 1101. In an embodiment of the disclosure, the at least one second specified application may be determined depending on the number of times that the applications stored in the electronic device 1101 are executed together with the first application. For example, the at least one second specified application may include an application most frequently executed together with the first application among the applications stored in the electronic device 1101.

The description given with reference to FIG. 22A may correspond to operation 3102 of FIG. 31.

The description given with reference to FIG. 22B may correspond to operation 3106 of FIG. 31.

Figure 23A:
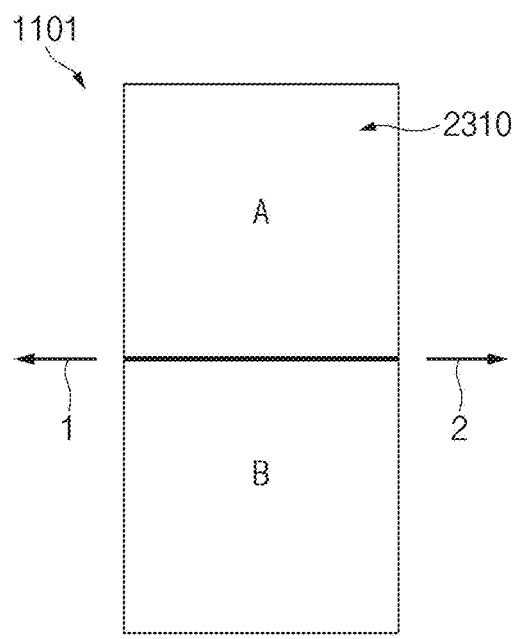
FIG. 23A illustrates an electronic device according to an embodiment of the disclosure.
Figure 23A:
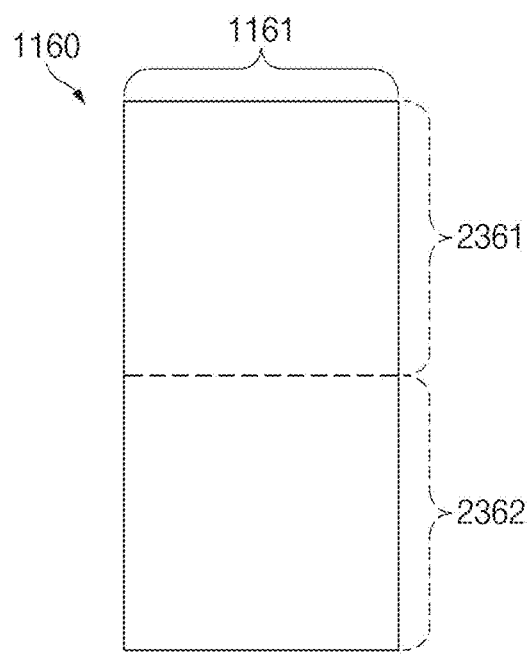

FIG. 23A illustrates the electronic device according to an embodiment of the disclosure.

Figure 23B:
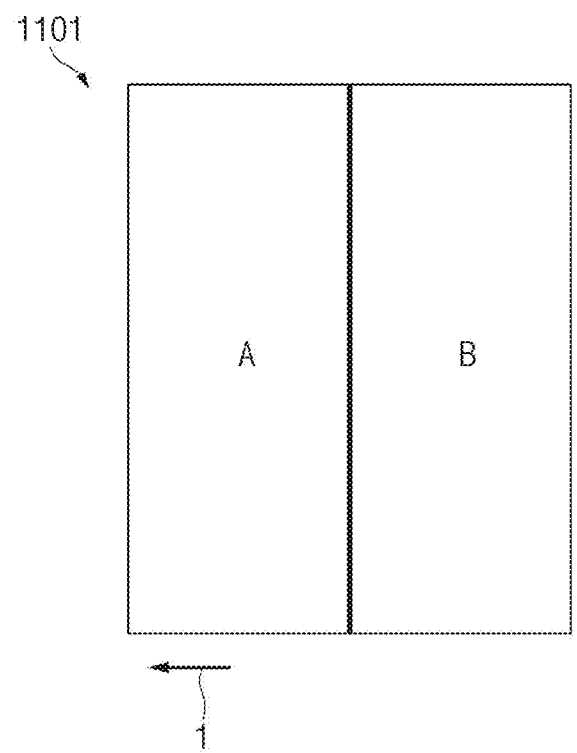
FIG. 23B illustrates an electronic device according to an embodiment of the disclosure.
Figure 23B:
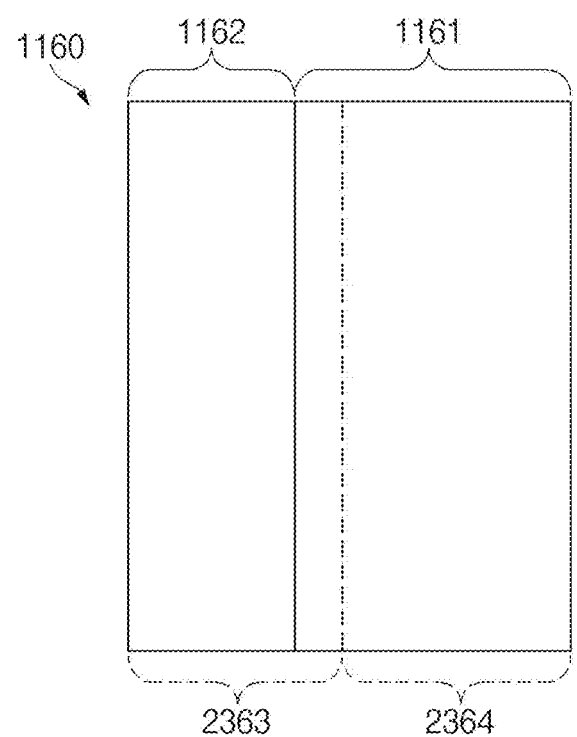

FIG. 23B illustrates the electronic device according to an embodiment of the disclosure.

Figure 23C:
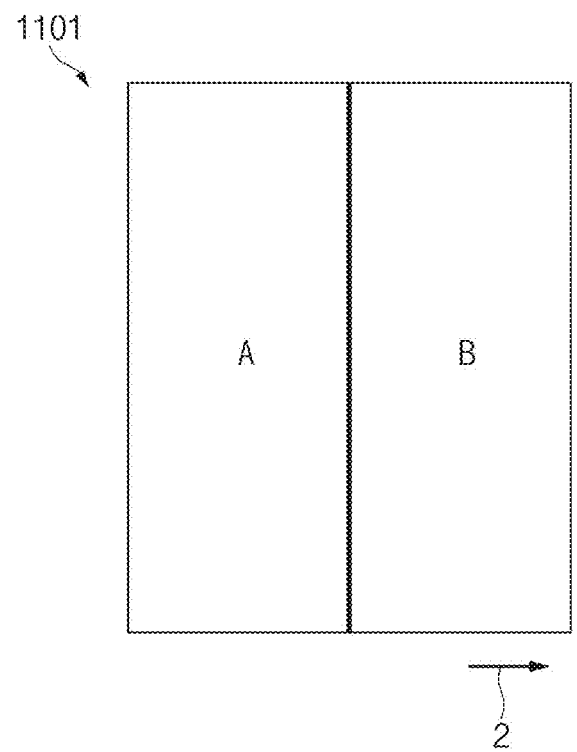
FIG. 23C illustrates an electronic device according to an embodiment of the disclosure.
Figure 23C:
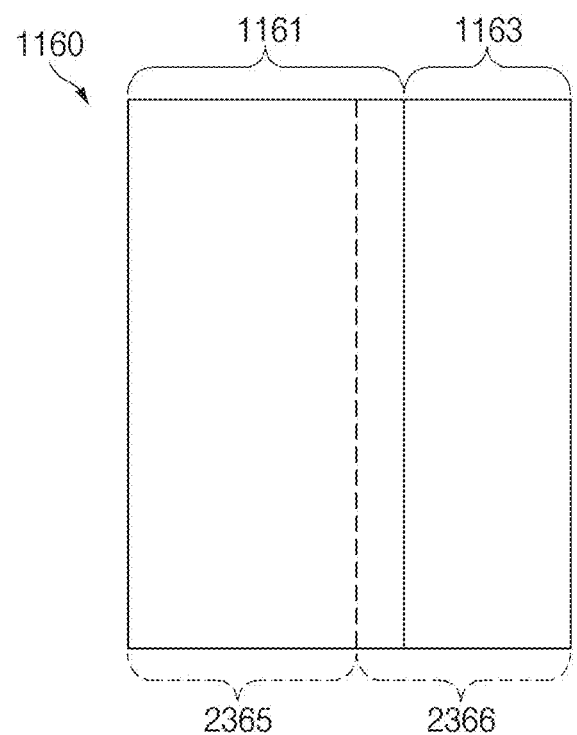

FIG. 23C illustrates the electronic device according to an embodiment of the disclosure.

Figure 23D:
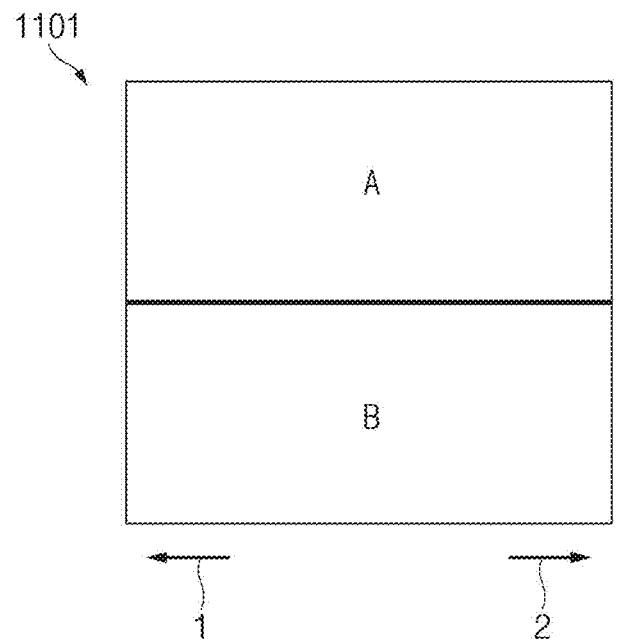
FIG. 23D illustrates an electronic device according to an embodiment of the disclosure.
Figure 23D:
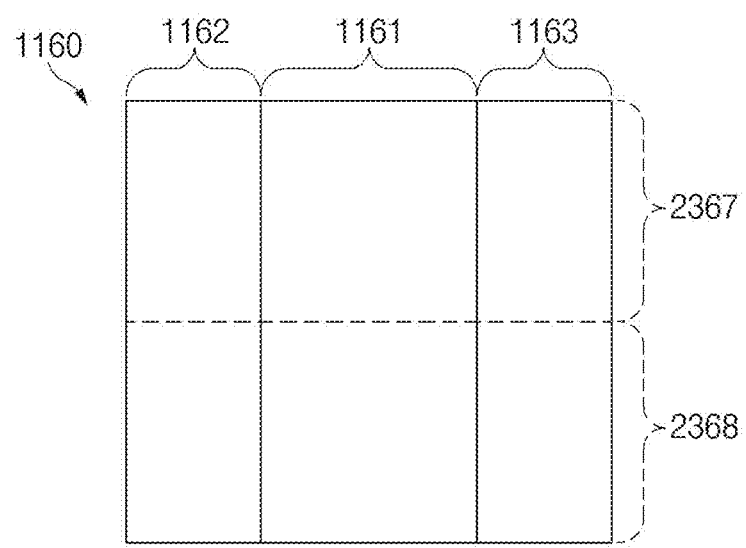

FIG. 23D illustrates the electronic device according to an embodiment of the disclosure.

Referring to FIG. 23A, the electronic device 1101 according to an embodiment may display an execution screen A of a first application and an execution screen B of a second application on a first sub-region 2361 and a second sub-region 2362 of the first region 1161, respectively, as a first screen 2310. In an embodiment of the disclosure, the first sub-region 2361 and the second sub-region 2362 may be regions obtained by dividing the first region 1161 of the display 1160 into upper and lower portions at a first specified ratio. The first specified ratio may be, for example, 1:1, but is not limited thereto. In an embodiment of the disclosure, based on FIG. 23A, the second sub-region 2362 may be located under the first sub-region 2361.

Referring to FIG. 23B, when the display 1160 is extended in the first direction 1, the electronic device 1101 according to an embodiment of the disclosure may display the execution screen A of the first application on a third sub-region 2363 and may display the execution screen B of the second application on a fourth sub-region 2364. In an embodiment of the disclosure, the third sub-region 2363 and the third sub-region 2364 may be regions obtained by dividing the first and second regions 1161 and 1162 into left and right portions at a second specified ratio in the state in which the display 1160 is extended in the first direction 1. The second specified ratio may be, for example, 1:1, but is not limited thereto. In an embodiment of the disclosure, based on FIG. 23B, the fourth sub-region 2364 may be located on the right side of the third sub-region 2363.

Referring to FIG. 23C, when the display 1160 is extended in the second direction 2, the electronic device 1101 according to an embodiment may display the execution screen A of the first application on a fifth sub-region 2365 and may display the execution screen B of the second application on a sixth sub-region 2366. In an embodiment of the disclosure, the fifth sub-region 2365 and the sixth sub-region 2366 may be regions obtained by dividing the first and third regions 1161 and 1163 into left and right portions at a third specified ratio in the state in which the display 1160 is extended in the second direction 2. The third specified ratio may be, for example, 1:1, but is not limited thereto. In an embodiment of the disclosure, based on FIG. 23C, the sixth sub-region 2366 may be located on the right side of the fifth sub-region 2365.

Referring to FIG. 23D, when the display 1160 is extended in the first direction 1 and the second direction 2, the electronic device 1101 according to an embodiment may display the execution screen A of the first application on a seventh sub-region 2367 and may display the execution screen B of the second application on an eighth sub-region 2368. In an embodiment of the disclosure, the seventh sub-region 2367 and the eighth sub-region 2368 may be regions obtained by dividing the first to third regions 1161 to 1163 of the display 1160 into upper and lower portions at the first specified ratio. In an embodiment of the disclosure, based on FIG. 23D, the eighth sub-region 2368 may be located under the seventh sub-region 2367.

The description given with reference to FIG. 23A may correspond to operation 3102 of FIG. 31.

The descriptions given with reference to FIGS. 23B, 23C, and 23D may correspond to operation 3106 of FIG. 31.

Figure 24A:
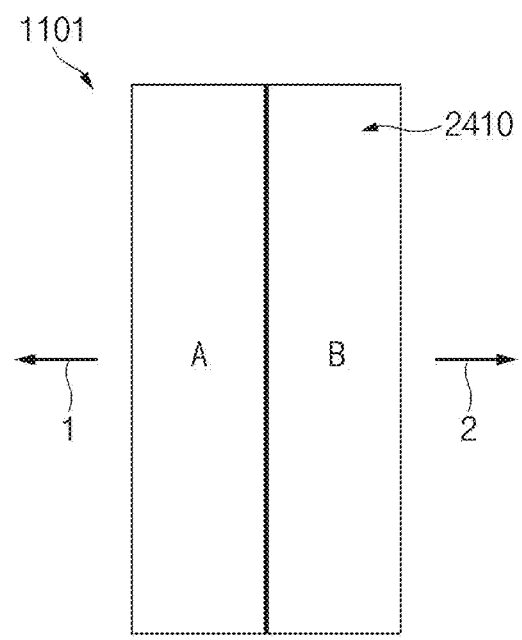
FIG. 24A illustrates an electronic device according to an embodiment of the disclosure.
Figure 24A:
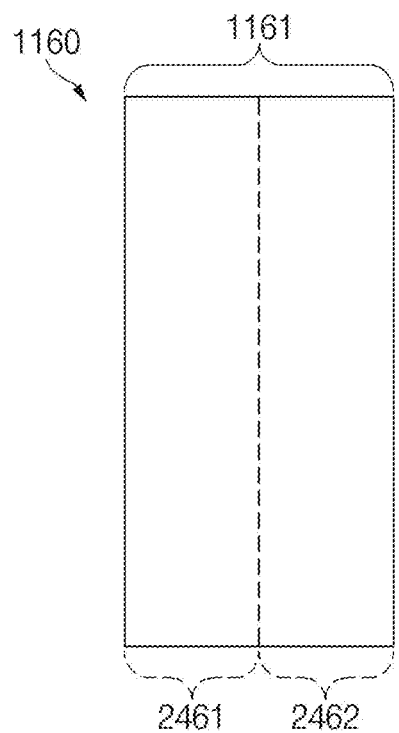

FIG. 24A illustrates the electronic device according to an embodiment of the disclosure.

Figure 24B:
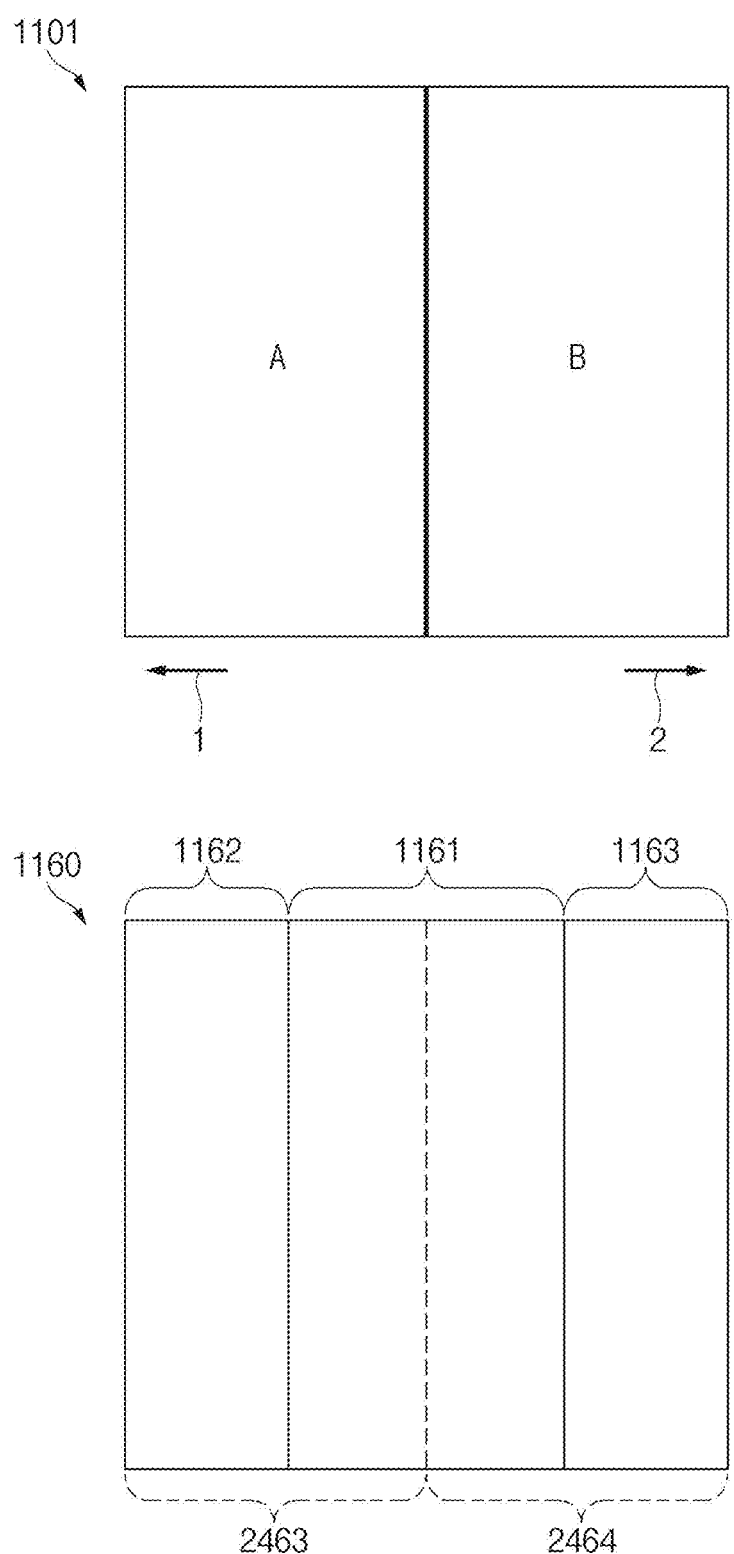
FIG. 24B illustrates an electronic device according to an embodiment of the disclosure.

FIG. 24B illustrates the electronic device according to an embodiment of the disclosure.

Figure 24C:
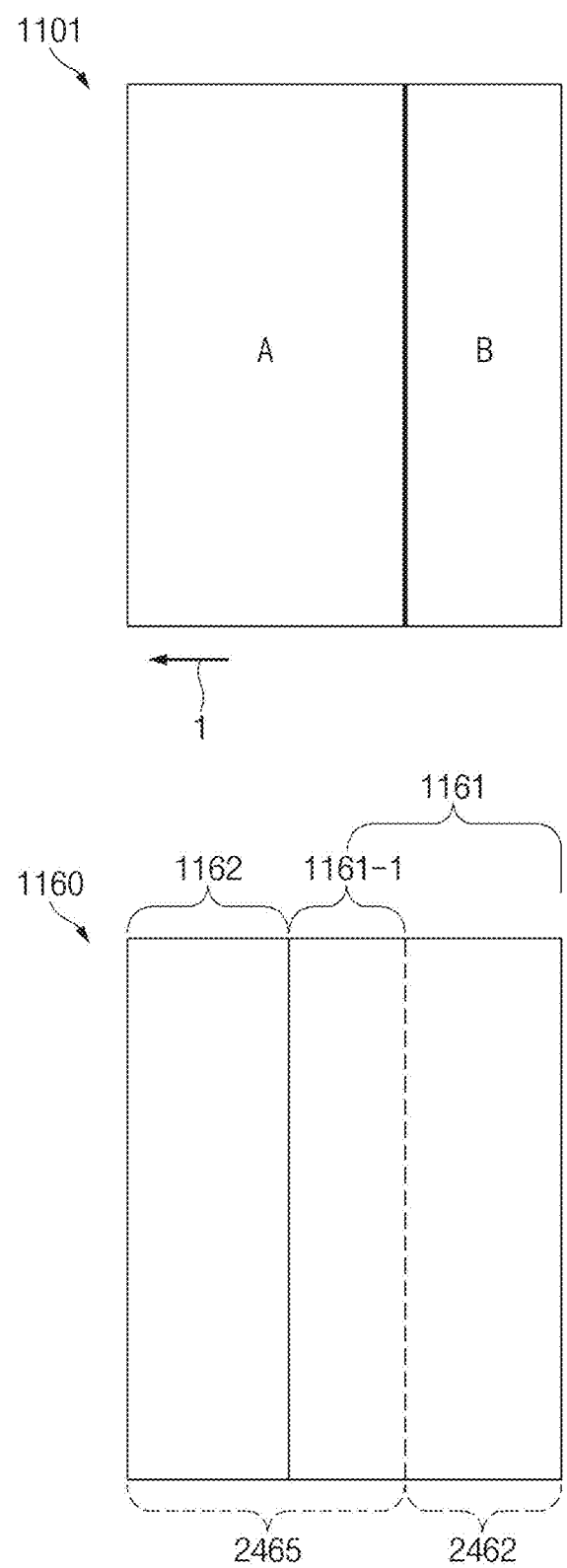
FIG. 24C illustrates an electronic device according to an embodiment of the disclosure.

FIG. 24C illustrates the electronic device according to an embodiment of the disclosure.

Figure 24D:
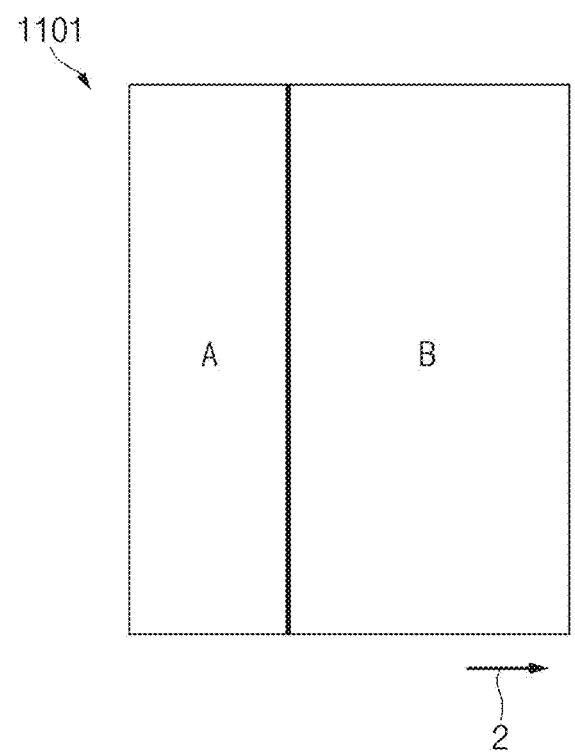
FIG. 24D illustrates an electronic device according to an embodiment of the disclosure.
Figure 24D:
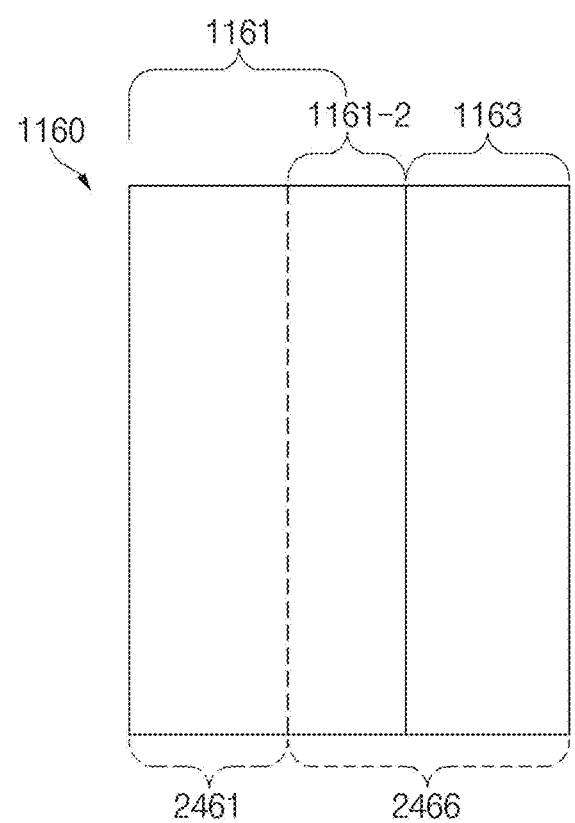

FIG. 24D illustrates the electronic device according to an embodiment of the disclosure.

Referring to FIG. 24A, the electronic device 1101 according to an embodiment may display an execution screen A of a first application and an execution screen B of a second application on a first sub-region 2461 and a second sub-region 2462, respectively, as a first screen 2410. In an embodiment of the disclosure, the first sub-region 2461 and the second sub-region 2462 may be regions obtained by dividing the first region 1161 of the display 1160 into left and right portions at a fourth specified ratio. The fourth specified ratio may be, for example, 1:1, but is not limited thereto. In an embodiment of the disclosure, based on FIG. 24A, the second sub-region 2462 may be located on the right side of the first sub-region 2461.

Referring to FIG. 24B, when the display 1160 is extended in the first direction 1 and the second direction 2, the electronic device 1101 according to an embodiment may magnify the execution screen A of the first application displayed on the first sub-region 2461 and display the magnified execution screen A on a third sub-region 2463 and may magnify the execution screen B of the second application displayed on the second sub-region 2462 and display the magnified execution screen B on a fourth sub-region 2464. In an embodiment of the disclosure, the third sub-region 2463 and the fourth sub-region 2464 may be regions obtained by dividing the first to third regions 161 to 163 of the display 1160 into left and right portions at the fourth specified ratio. In an embodiment of the disclosure, based on FIG. 24B, the fourth sub-region 2464 may be located on the right side of the third sub-region 2363.

Referring to FIG. 24C, in an embodiment of the disclosure, when the display 1160 is extended in the first direction 1, the electronic device 1101 may maintain the execution screen B of the second application displayed on the second sub-region 2462 and may magnify the execution screen A of the first application displayed on the first sub-region 2461 and display the magnified execution screen A on a first remaining region 2465. In an embodiment of the disclosure, the first remaining region 2465 may include the second region 1162 and a partial region 1161-1 other than the second sub-region 2462 in the first region 1161.

Referring to FIG. 24D, in an embodiment of the disclosure, when the display 1160 is extended in the second direction 2, the electronic device 1101 may maintain the execution screen A of the first application displayed on the first sub-region 2461 and may magnify the execution screen A of the first application displayed on the second sub-region 2462 and display the magnified execution screen A on a second remaining region 2466. In an embodiment of the disclosure, the second remaining region 2466 may include the second region 1162 and a partial region 1161-2 other than the first sub-region 2461 in the first region 1161.

The description given with reference to FIG. 24A may correspond to operation 3102 of FIG. 31.

The descriptions given with reference to FIGS. 24B, 24C, and 24D may correspond to operation 3106 of FIG. 31.

Figure 25A:
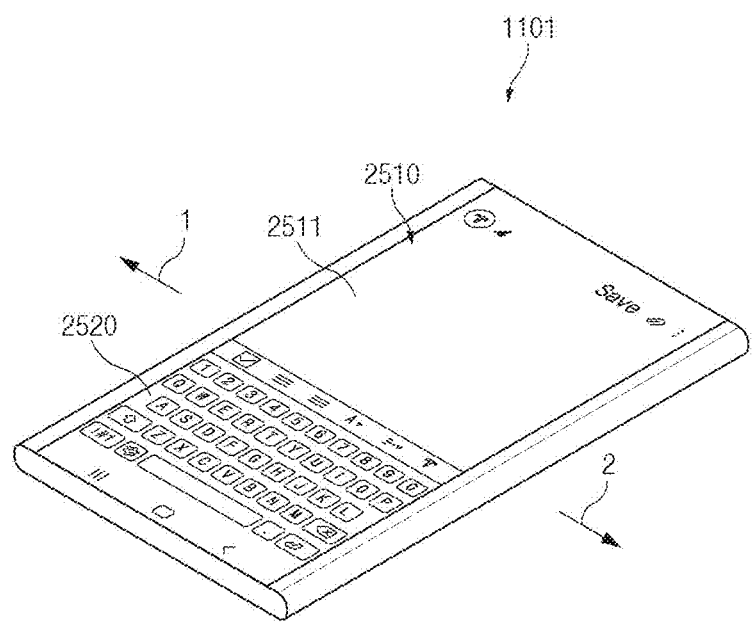
FIG. 25A illustrates an electronic device according to an embodiment of the disclosure.
Figure 25A:
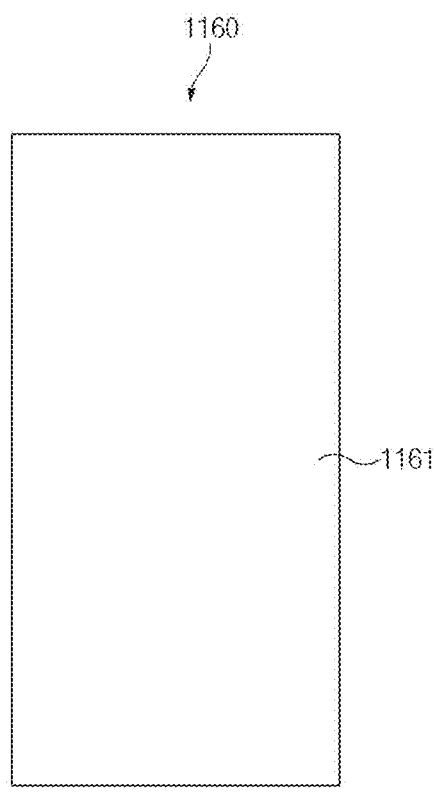

FIG. 25A illustrates the electronic device according to an embodiment of the disclosure.

Figure 25B:
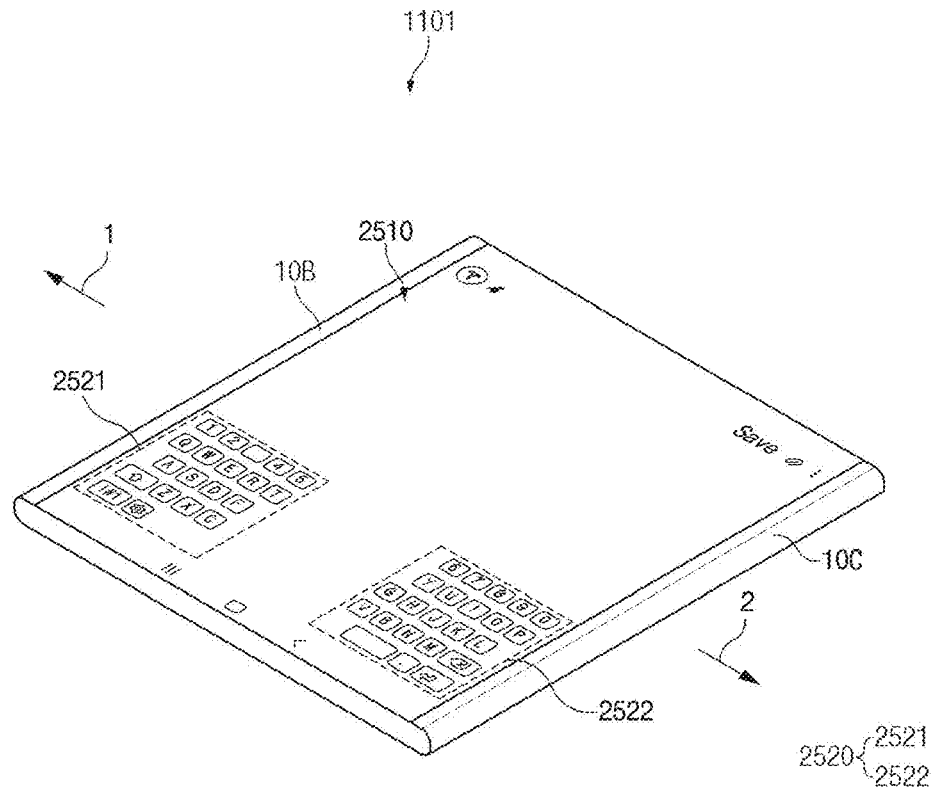
FIG. 25B illustrates an electronic device in which a display is extended by a first distance according to an embodiment of the disclosure.
Figure 25B:
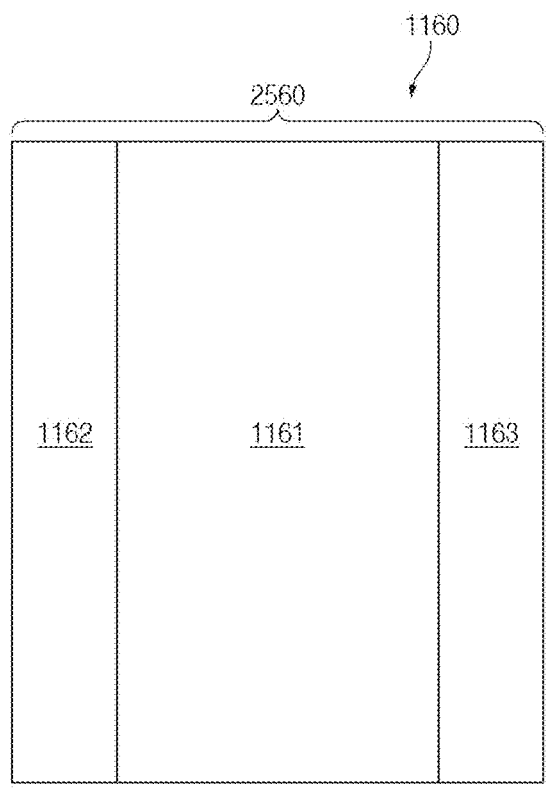

FIG. 25B illustrates the electronic device in which the display is extended by a first distance according to an embodiment of the disclosure.

Figure 25C:
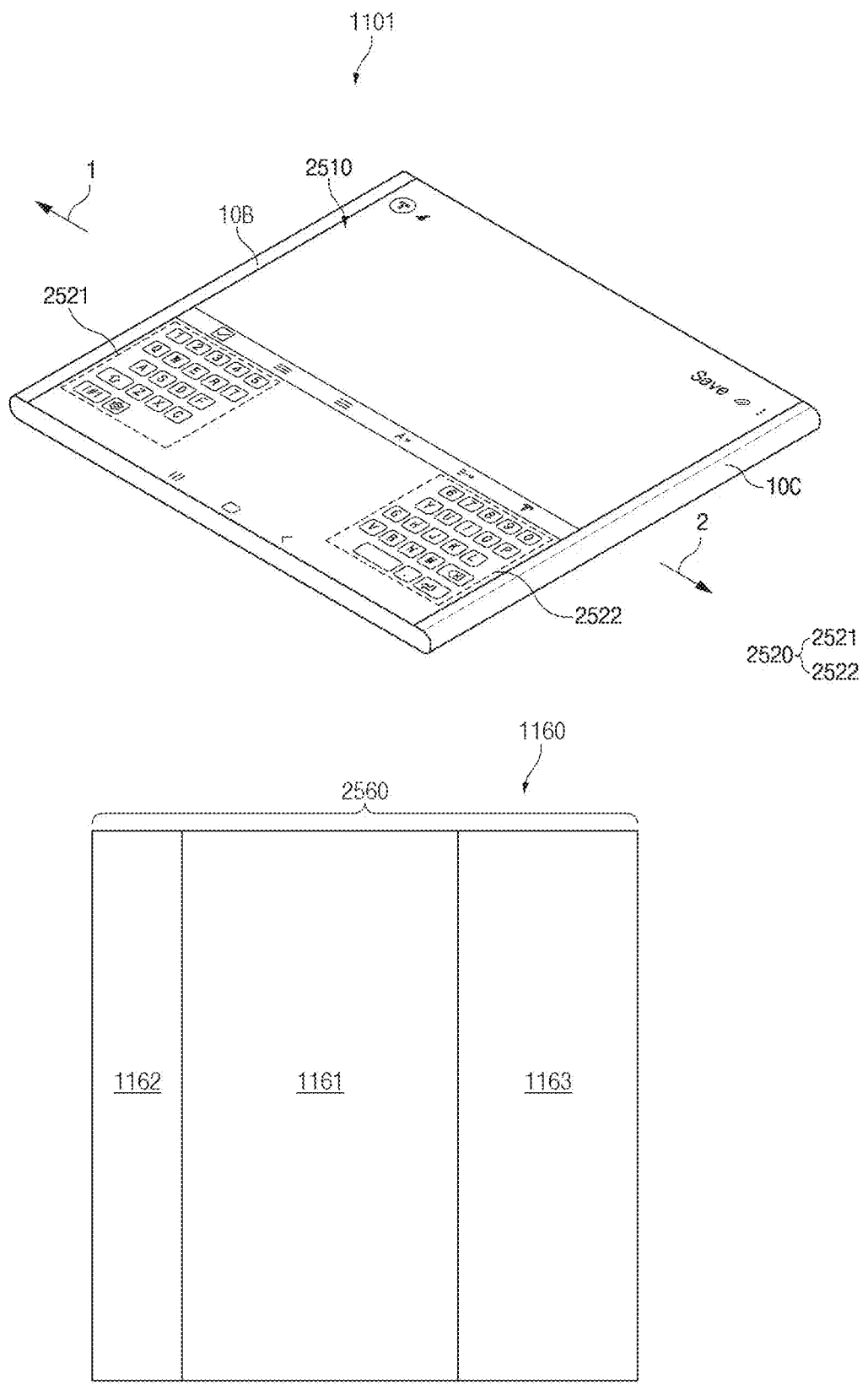
FIG. 25C illustrates an electronic device in which a display is extended by a second distance greater than a first distance according to an embodiment of the disclosure.

FIG. 25C illustrates the electronic device in which the display is extended by a second distance greater than the first distance according to an embodiment of the disclosure.

Referring to FIG. 25A, the electronic device 1101 according to an embodiment may display a first screen 2510 on the first region 1161 of the display 1160 and may display a keyboard 2520 including a plurality of keys such that the keyboard 2520 overlaps the first screen 2510. In an embodiment of the disclosure, the first screen 2510 may include a text entry area 2511, and text input through the keyboard 2520 may be displayed on the text entry area 2511.

Referring to FIGS. 25B and 25C, in an embodiment of the disclosure, when the display 160 is extended in the first direction 1 and/or the second direction 2, the electronic device 1101 may magnify the first screen 2510 and may display the magnified first screen 2510 on an extended display region 2560. In an embodiment of the disclosure, when the distance by which the display 1160 is extended exceeds a threshold value, the electronic device 1101 may display a first portion 2521 of the keyboard 2520 such that the first portion 2521 is aligned in the first direction 1 in the extended display region 1170 of the display 1160 and may display a second portion 2522 of the keyboard 2520 such that the second portion 2522 is aligned in the second direction 2 in the extended display region 1170 of the display 1160. For example, when the distance by which the display 1160 is extended exceeds the threshold value, the electronic device 1101 may display the first portion 2521 of the keyboard 2520 in a position adjacent to a first side surface 10B in the extended display region 2560 of the display 1160 and may display the second portion 2522 of the keyboard 2520 in a position adjacent to a second side surface 10C in the extended display region 2560 of the display 1160. In an embodiment of the disclosure, the first portion 2521 of the keyboard 2520 may include a first group of keys among the plurality of keys, and the second portion 2522 may include a second group of keys among the plurality of keys.

In an embodiment of the disclosure, as the distance by which the display 1160 of the electronic device 1101 is extended increases, the distance between the first portion 2521 aligned in the first direction 1 and the second portion 2522 aligned in the second direction 2 may increase.

The description given with reference to FIG. 25A may correspond to operation 3102 of FIG. 31.

The descriptions given with reference to FIGS. 25B and 25C may correspond to operation 3106 of FIG. 31.

Figure 26A:
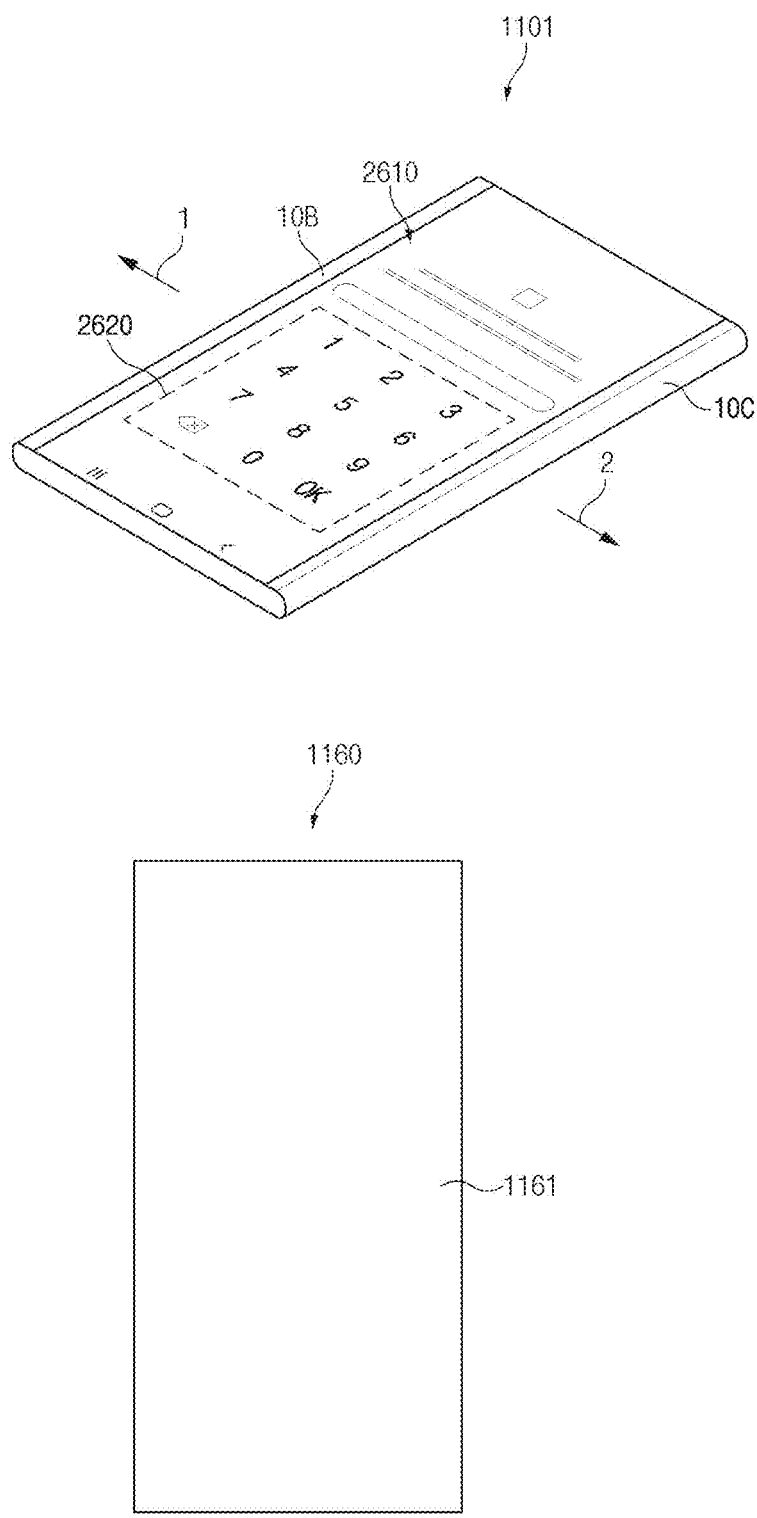
FIG. 26A illustrates an electronic device according to an embodiment of the disclosure.

FIG. 26A illustrates the electronic device according to an embodiment of the disclosure.

Figure 26B:
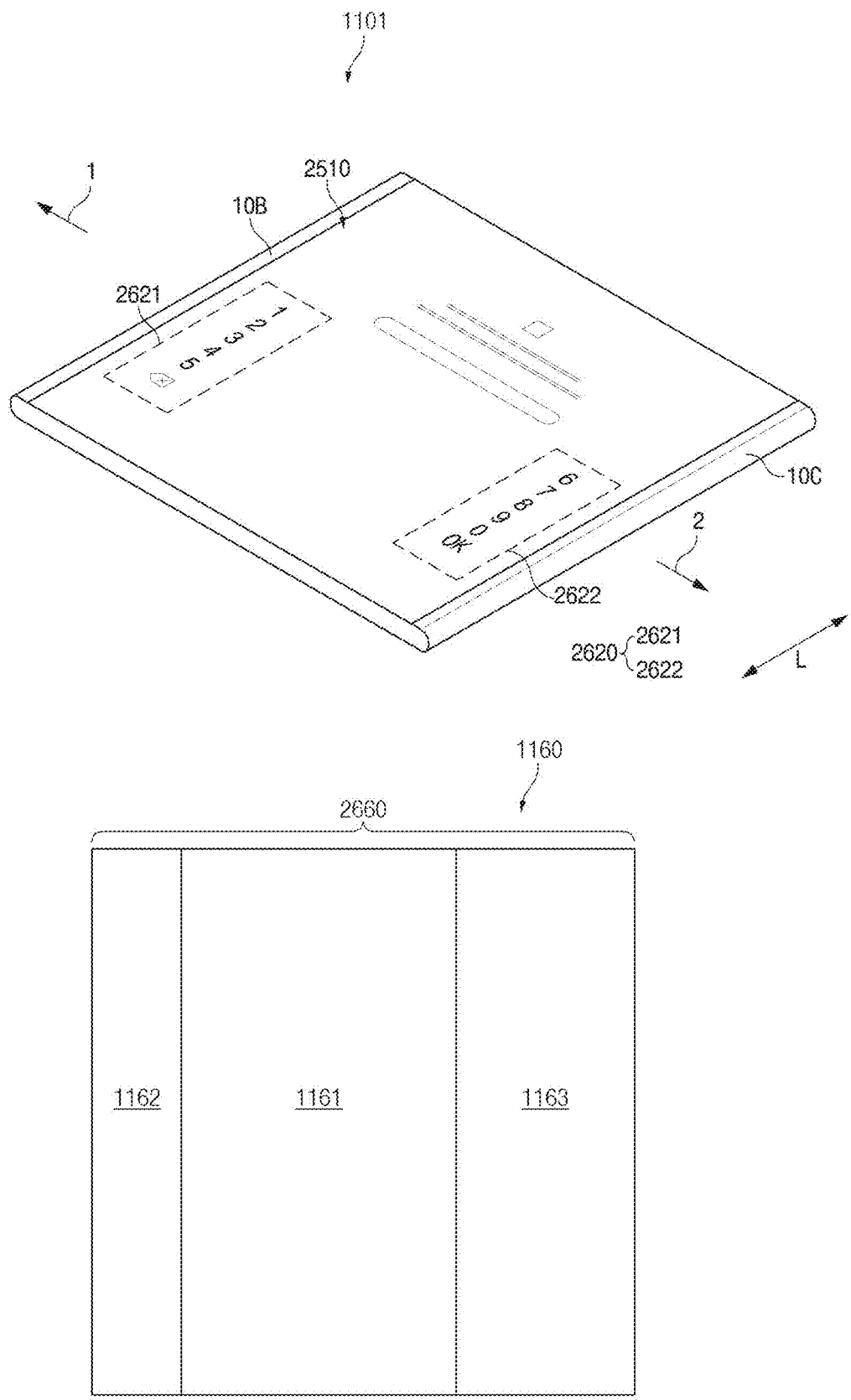
FIG. 26B illustrates an electronic device according to an embodiment of the disclosure.

FIG. 26B illustrates the electronic device according to an embodiment of the disclosure.

Referring to FIG. 26A, the electronic device 1101 according to an embodiment may display a first screen 2610 on the first region 1161 of the display 1160 and may display a keyboard 2620 including a plurality of keys on the first region 1161 such that the keyboard 2620 overlaps the first screen 2610. In an embodiment of the disclosure, the first screen 2610 may be a lock screen of the electronic device 1101.

Referring to FIG. 26B, when the display 1160 is extended in the first direction 1 and/or the second direction 2, the electronic device 1101 according to an embodiment may display the first screen 2610 on an extended display region 2660 of the display 1160. In an embodiment of the disclosure, when the distance by which the display 1160 is extended exceeds a threshold value, the electronic device 1101 may display a first group of keys 2621 among the plurality of keys such that each of the first group of keys 2621 is aligned in the first direction 1 in the extended display region 2660 of the display 160 and may display a second group of keys 2622 among the plurality of keys such that each of the second group of keys 2622 is aligned in the second direction 2 in the extended display region 2660 of the display 160. For example, when the distance by which the display 1160 is extended exceeds the threshold value, the electronic device 110 may arrange the first group of keys 2621 in a lengthwise direction L of the display 1160 and may display the arranged first group of keys 2621 in a position adjacent to the first side surface 10B in the extended display region 2660. For example, when the distance by which the display 1160 is extended exceeds the threshold value, the electronic device 110 may arrange the second group of keys 2622 in the lengthwise direction L of the display 1160 and may display the arranged second group of keys 2622 in a position adjacent to the second side surface 10C in the extended display region 2660.

The description given with reference to FIG. 26A may correspond to operation 3102 of FIG. 31.

The description given with reference to FIG. 26B may correspond to operation 3106 of FIG. 31.

Figure 27A:
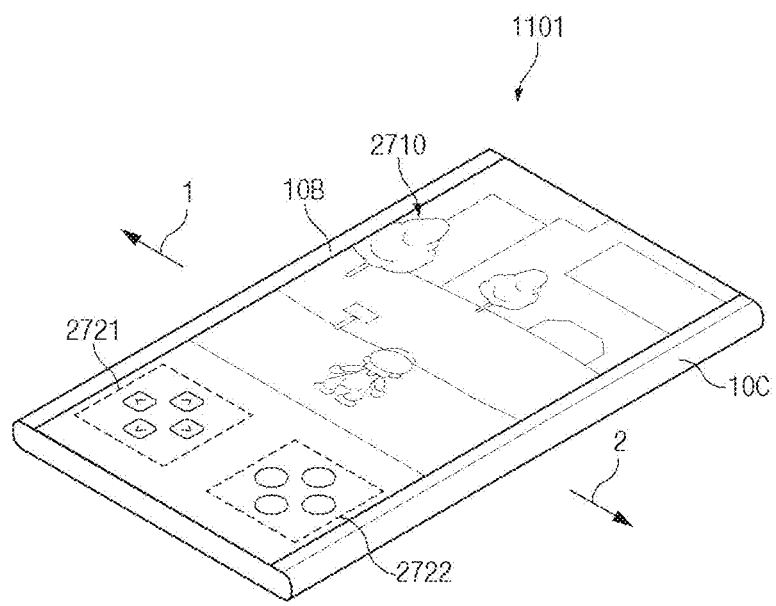
FIG. 27A illustrates an electronic device according to an embodiment of the disclosure.
Figure 27A:
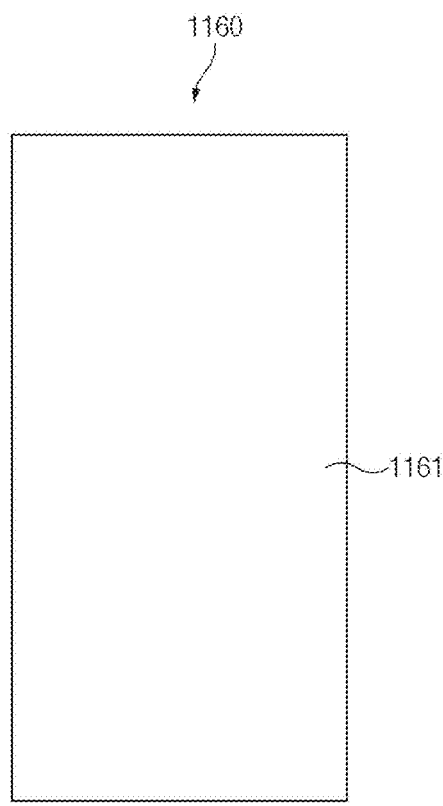

FIG. 27A illustrates the electronic device according to an embodiment of the disclosure.

Figure 27B:
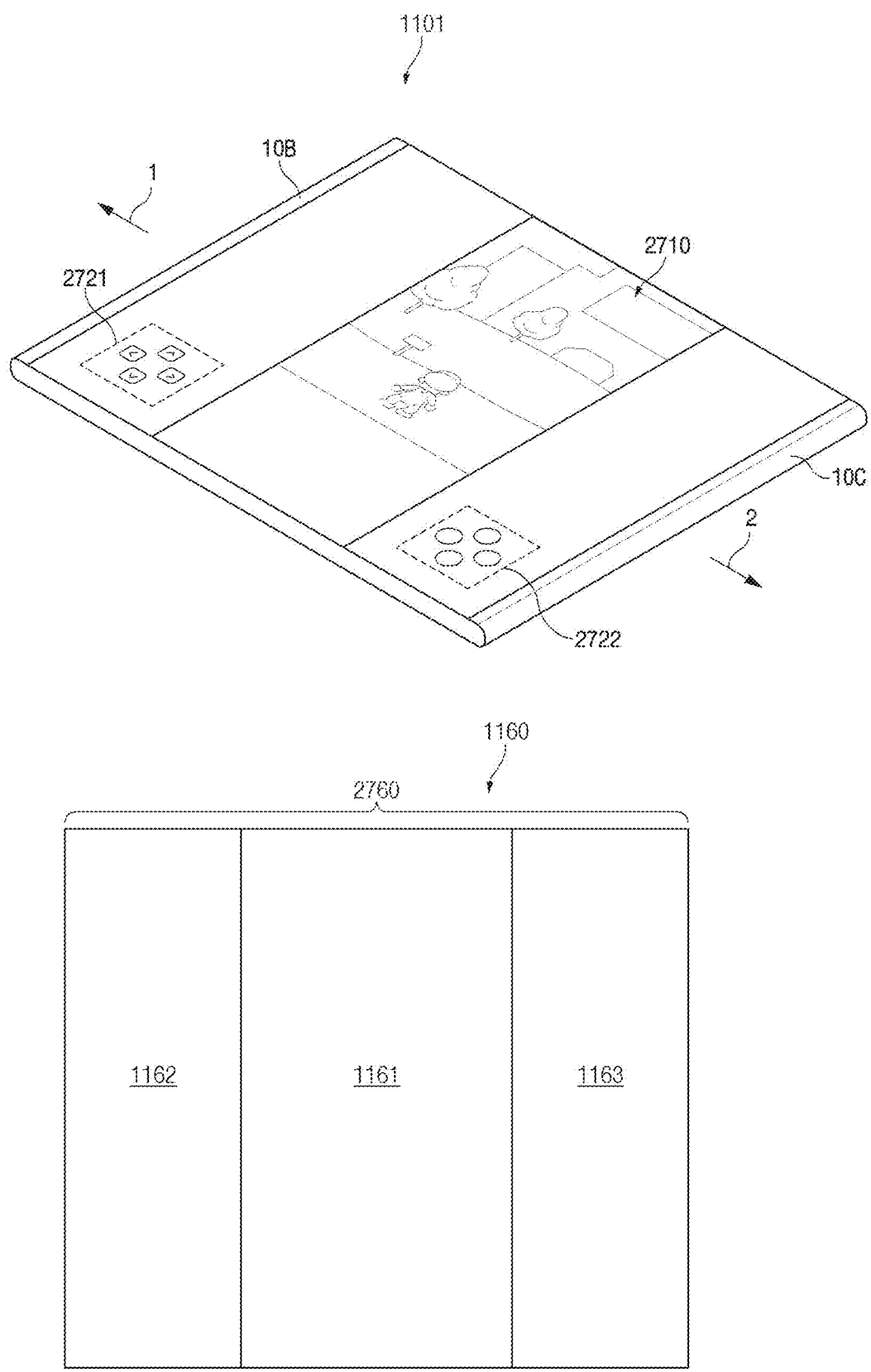
FIG. 27B illustrates an electronic device according to an embodiment of the disclosure.

FIG. 27B illustrates the electronic device according to an embodiment of the disclosure.

Referring to FIG. 27A, the electronic device 1101 according to an embodiment may display a first screen 2710 on the first region 1161 of the display 1160 and may display a first keyboard 2721 and a second keyboard 2722 on the first region 1161 such that the first keyboard 2721 and the second keyboard 2722 overlap the first screen 2710. In an embodiment of the disclosure, the first keyboard 2721 may be displayed in a position adjacent to the first side surface 10B of the electronic device 1101, and the second keyboard 2722 may be displayed in a position adjacent to the second side surface 10C of the electronic device 1101. In an embodiment of the disclosure, the first screen 2710 may be an execution screen of a game application.

Referring to FIG. 27B, when the display 1160 is extended in the first direction 1 and/or the second direction 2, the electronic device 1101 according to an embodiment may display the first screen 2710 on an extended display region 2760 of the display 1160. For example, as illustrated, the electronic device 1101 may display, on the extended display region 2560, the first screen 2710 displayed on the first region 1161 of the display 1160 in a state in which the size and/or resolution is maintained. In another example, unlike that illustrated in the drawings, the electronic device 1101 may magnify the first screen 2710 and may display the magnified first screen 2710 on the extended display region 2760.

In an embodiment of the disclosure, when the distance by which the display 1160 is extended exceeds a threshold value, the electronic device 1101 may display the first keyboard 2721 such that the first keyboard 2721 is aligned in the first direction 1 in the extended display region 2760 of the display 160 and may display the second keyboard 2722 such that the second keyboard 2722 is aligned in the second direction 2 in the extended display region 2760 of the display 160. For example, when the distance by which the display 1160 is extended exceeds the threshold value, the electronic device 1101 may display the first keyboard 2721 in a position adjacent to the first side surface 10B in the extended display region 2760. For example, when the distance by which the display 1160 is extended exceeds the threshold value, the electronic device 1101 may display the second keyboard 2722 in a position adjacent to the second side surface 10C in the extended display region 2760.

The description given with reference to FIG. 27A may correspond to operation 3102 of FIG. 31.

The description given with reference to FIG. 27B may correspond to operation 3106 of FIG. 31.

Figure 28A:
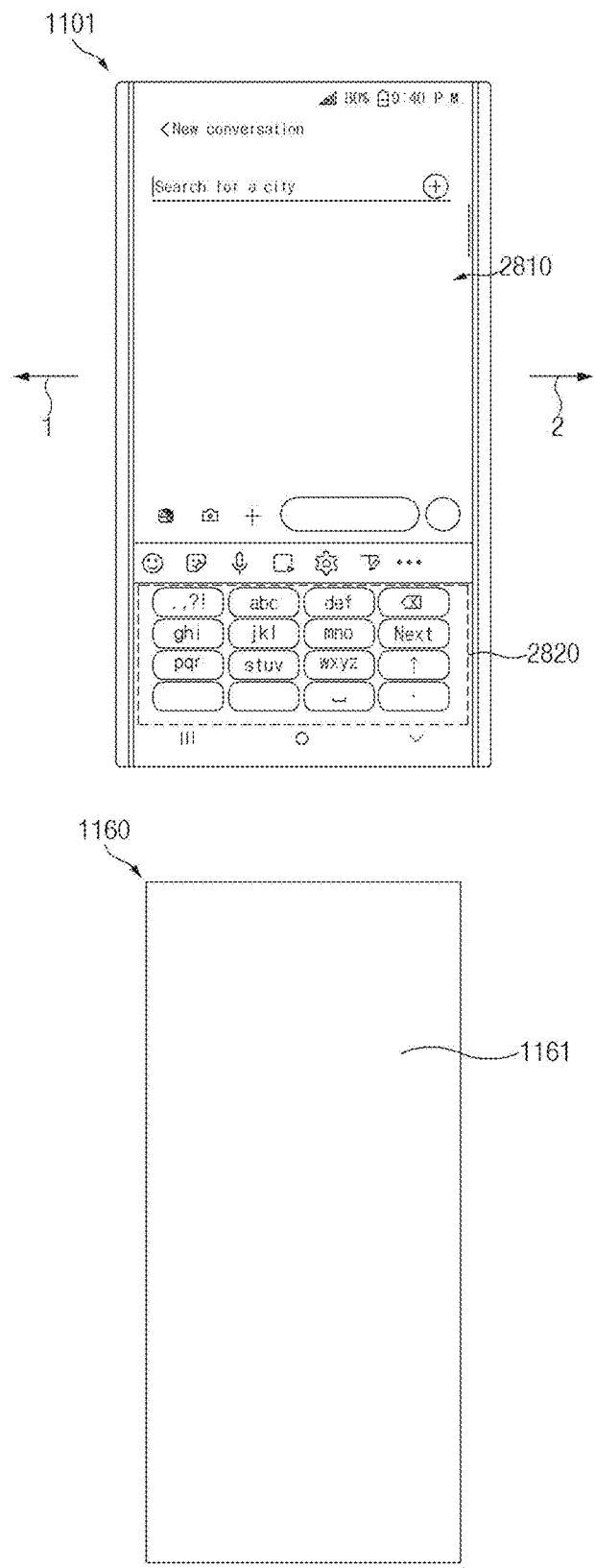
FIG. 28A illustrates an electronic device according to an embodiment of the disclosure.

FIG. 28A illustrates the electronic device according to an embodiment of the disclosure.

Figure 28B:
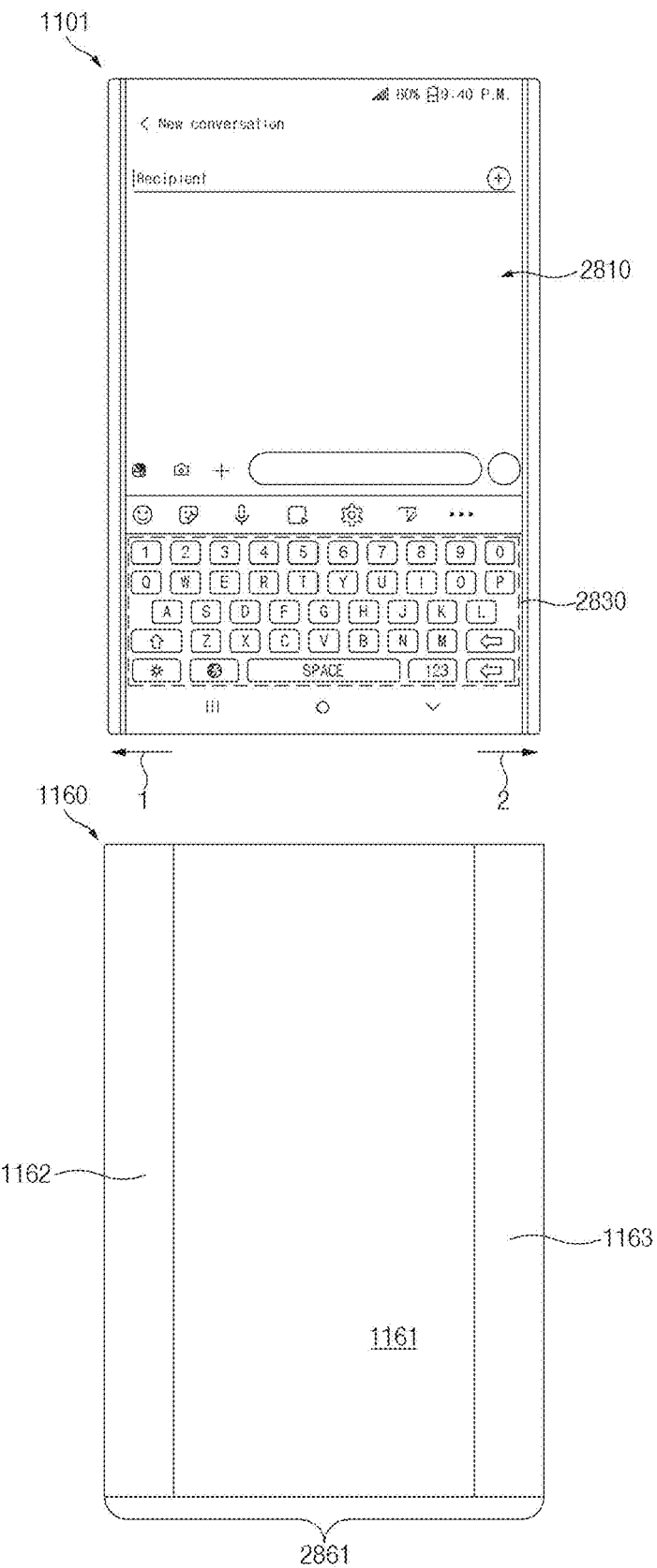
FIG. 28B illustrates an electronic device according to an embodiment of the disclosure.

FIG. 28B illustrates the electronic device according to an embodiment of the disclosure.

Figure 28C:
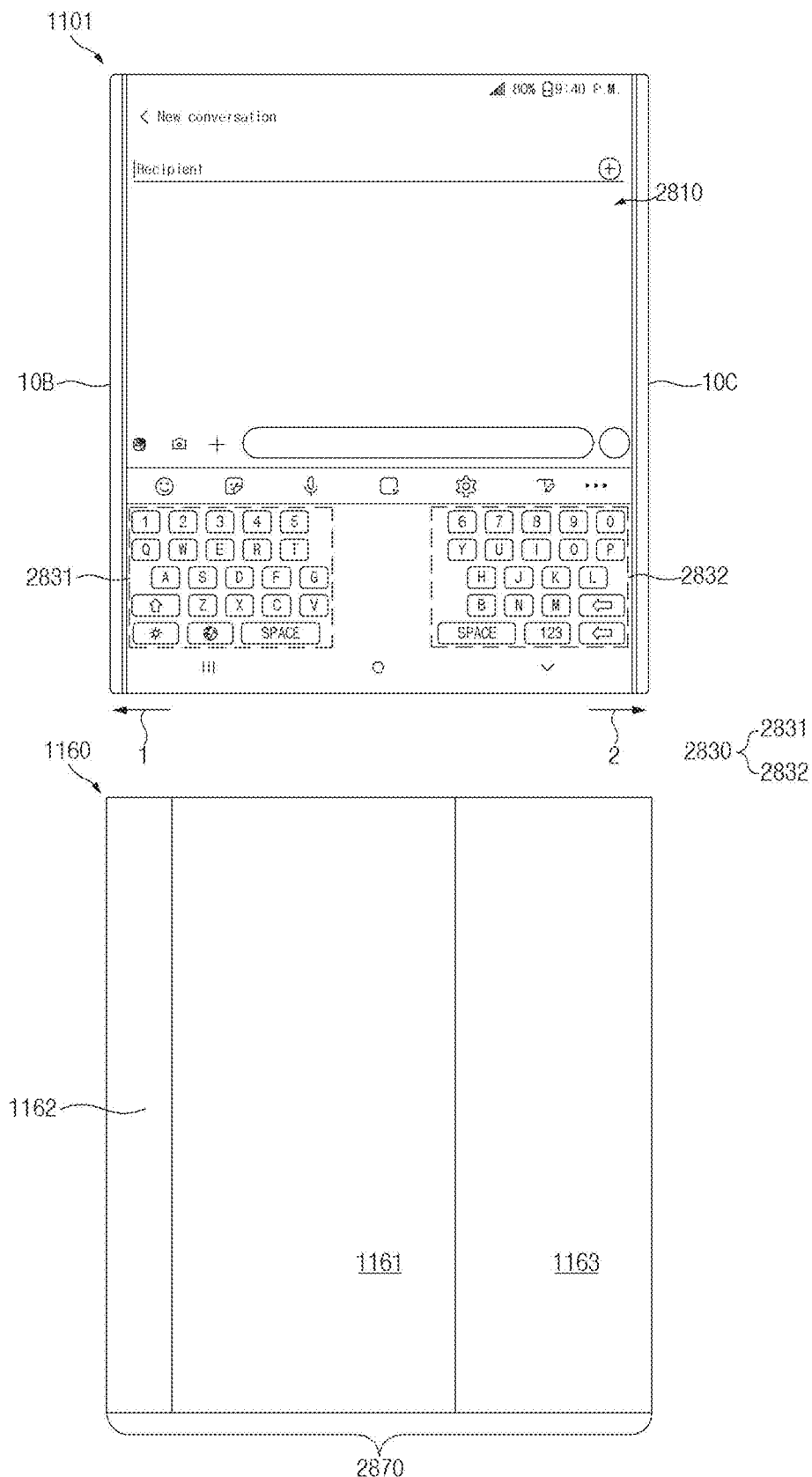
FIG. 28C illustrates an electronic device according to an embodiment of the disclosure.

FIG. 28C illustrates the electronic device according to an embodiment of the disclosure.

Referring to FIG. 28A, the electronic device 1101 according to an embodiment may display a first screen 2810 on the first region 1161 of the display 1160. In an embodiment of the disclosure, the electronic device 1101 may display a first keyboard 2820 including a first number of keys on the first region 1161 of the display 1160 such that the first keyboard 2820 overlaps the first screen 2810. In an embodiment of the disclosure, the first keyboard 2820 may be, for example, a keyboard having a 4×4 array, but is not limited thereto.

Referring to FIG. 28B, when the display 1160 is extended in the first direction 1 and/or the second direction 2, the electronic device 1101 according to an embodiment may magnify the first screen 2810 and may display the magnified first screen 2810 on a first extended display region 2861 of the display 1160. When the distance by which the display 1160 is extended exceeds a first threshold value, the electronic device 1101 according to an embodiment may change the keyboard displayed on the display 1160. For example, when the distance by which the display 1160 is extended exceeds the first threshold value, the electronic device 1101 may replace the first keyboard 2820 with a second keyboard 2830 and may display the second keyboard 2830 on the first extended display region 2861 of the display 1160. In an embodiment of the disclosure, the electronic device 1101 may display the second keyboard 2830 such that the second keyboard 2830 overlaps the first screen 2810. In an embodiment of the disclosure, the second keyboard 2830 may include a second number of keys being more than the first number of keys. For example, the second keyboard 2830 may include a qwerty keyboard including more keys than the first keyboard 2820, but is not limited thereto.

Referring to FIG. 28C, when the distance by which the display 1160 is extended exceeds a second threshold value greater than the first threshold value, the electronic device 1101 according to an embodiment may display a first portion 2831 of the second keyboard 2830 such that the first portion 2831 is aligned in the first direction 1 in a second extended display region 2870 of the display 1160 and may display a second portion 2832 of the second keyboard 2830 such that the second portion 2832 is aligned in the second direction 2 in the second extended display region 2870 of the display 1160. For example, when the distance by which the display 1160 is extended exceeds the second threshold value, the electronic device 1101 may display the first portion 2831 of the keyboard 2830 in a position adjacent to the first side surface 10B in the second extended display region 2870 of the display 1160 and may display the second portion 2832 of the second keyboard 2830 in a position adjacent to the second side surface 10C in the second extended display region 2870 of the display 1160. In an embodiment of the disclosure, the first portion 2831 of the second keyboard 2831 may include a first group of keys among the plurality of keys, and the second portion 2832 may include a second group of keys among the plurality of keys. In an embodiment of the disclosure, as the distance by which the display 1160 of the electronic device 1101 is extended increases, the distance between the first portion 2831 of the second keyboard 2830 aligned in the first direction 1 and the second portion 2832 of the second keyboard 2830 aligned in the second direction 2 may increase.

The description given with reference to FIG. 28A may correspond to operation 3102 of FIG. 31.

The descriptions given with reference to FIGS. 28B and 28C may correspond to operation 3106 of FIG. 31.

Figure 29A:
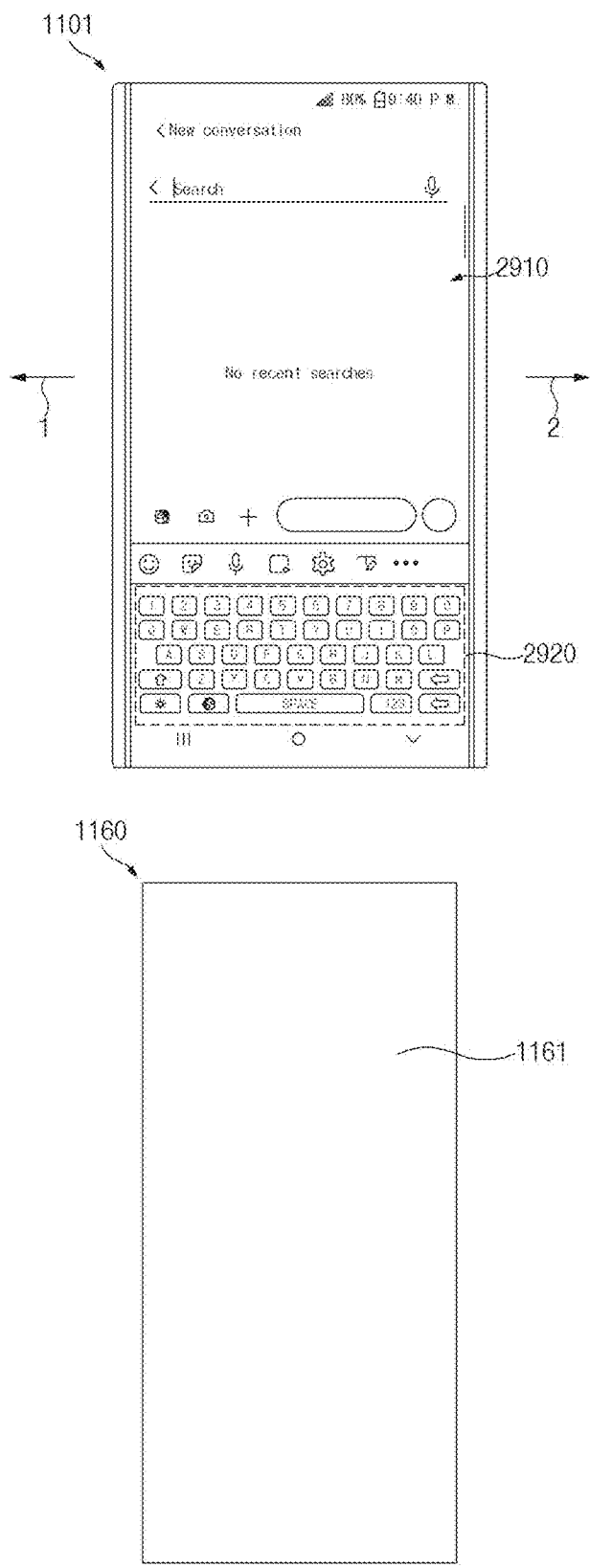
FIG. 29A illustrates an electronic device according to an embodiment of the disclosure.

FIG. 29A illustrates the electronic device according to an embodiment of the disclosure.

Figure 29B:
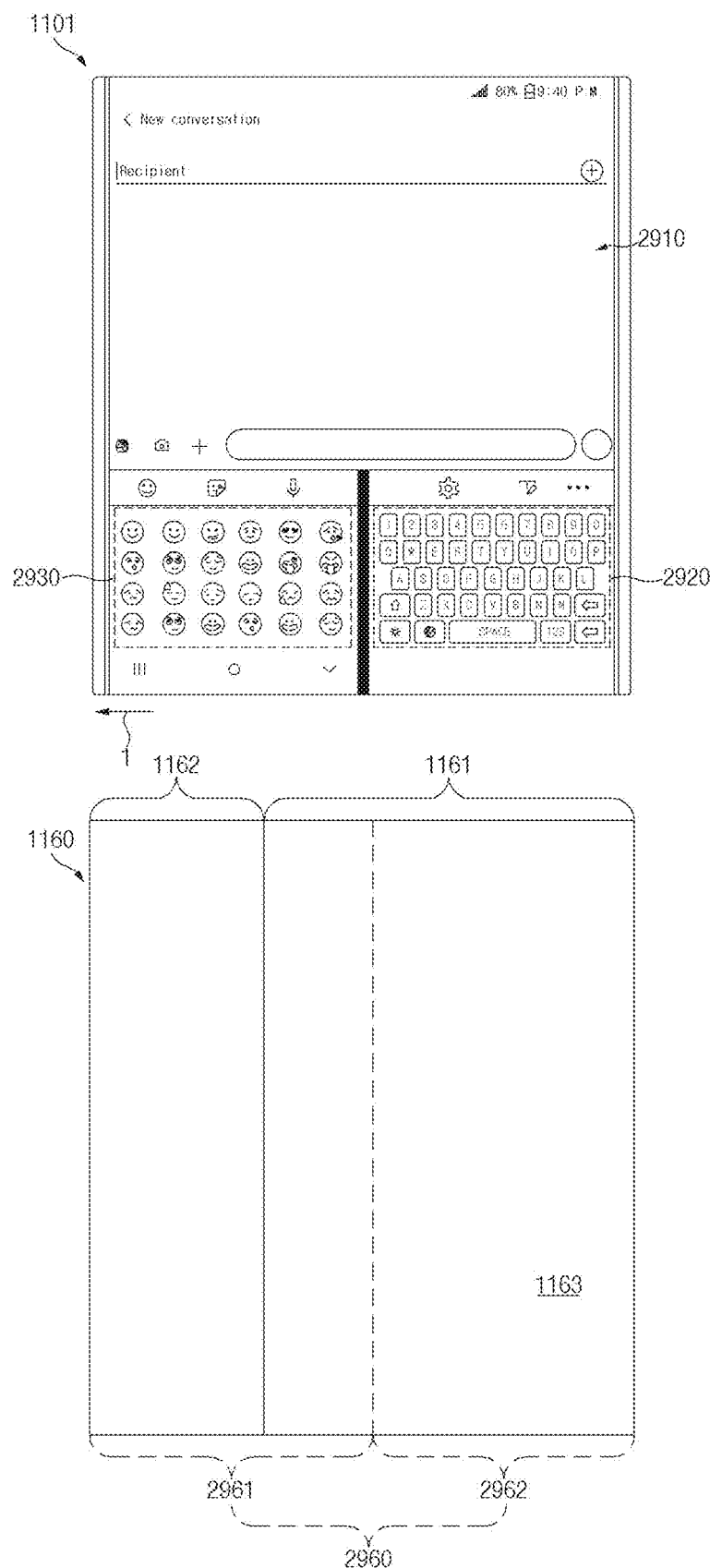
FIG. 29B illustrates an electronic device according to an embodiment of the disclosure.

FIG. 29B illustrates the electronic device according to an embodiment of the disclosure.

Figure 29C:
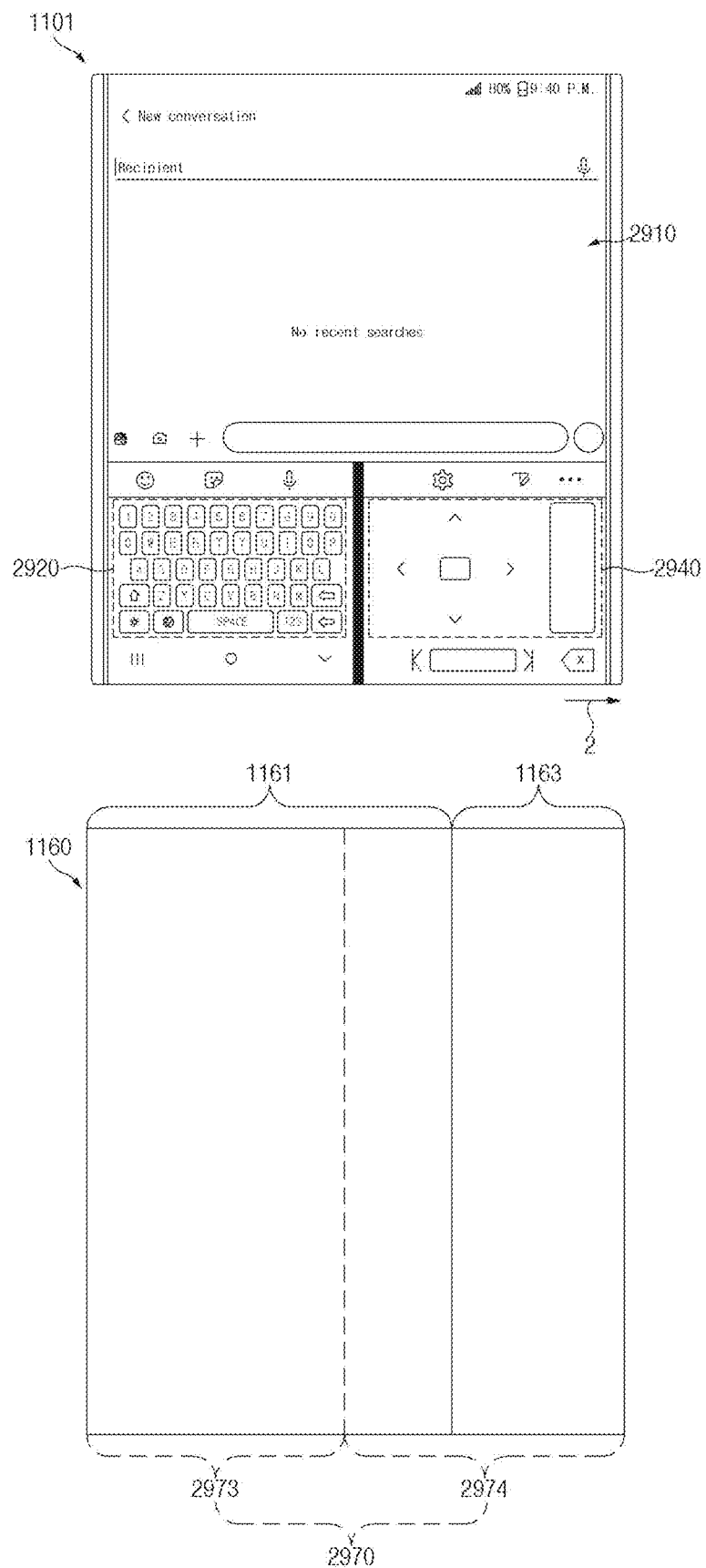
FIG. 29C illustrates an electronic device according to an embodiment of the disclosure.

FIG. 29C illustrates the electronic device according to an embodiment of the disclosure.

Referring to FIG. 29A, the electronic device 1101 according to an embodiment may display a first screen 2910 on the first region 1161 of the display 1160 and may display a first keyboard 2920 such that the first keyboard 2920 overlaps the first screen 2910 In an embodiment of the disclosure, the first keyboard 2920 may include a plurality of keys. For example, the plurality of keys of the first keyboard 2920 may be arranged in a qwerty format, but is not limited thereto.

Referring to FIG. 29B, in an embodiment of the disclosure, when the display 1160 is extended in the first direction 1, the display 1160 may include a first extended region 2960. In an embodiment of the disclosure, the first extended region 2960 may include the first region 1161 and the second region 1162. In an embodiment of the disclosure, the first extended region 2960 may include a first sub-region 2961 located on the left side (e.g., in the first direction 1) with respect to the center of the first extended region 2960 and a second sub-region 2962 located on the right side of the first sub-region 2961.

In an embodiment of the disclosure, when the display 1160 is extended in the first direction 1, the electronic device 1101 may display the first keyboard 2920 on the second sub-region 2962 of the first extended region 2960 and may display a second keyboard 2930 different from the first keyboard 2920 on the first sub-region 2961. The second keyboard 2930 may include, for example, a plurality of keys for inputting emoticons.

Referring to FIG. 29C, in an embodiment of the disclosure, when the display 1160 is extended in the second direction 2, the display 1160 may include a second extended region 2970. In an embodiment of the disclosure, the second extended region 2970 may include the first region 1161 and the third region 1163. In an embodiment of the disclosure, the second extended region 2970 may include a third sub-region 2973 located on the left side with respect to the center of the second extended region 2970 and a fourth sub-region 2974 located on the right side of the third sub-region 2973.

In an embodiment of the disclosure, when the display 1160 is extended in the second direction 2, the electronic device 1101 may display the first keyboard 2920 on the third sub-region 2973 and may display a third keyboard 2940 different from the first keyboard 2920 on the fourth sub-region 2974. The third keyboard 2940 may include, for example, keys for moving a cursor indicating the position of text input through the first keyboard 2940 and keys for performing editing functions (e.g., copy, cut, and paste) of input text.

The description given with reference to FIG. 29A may correspond to operation 3102 of FIG. 31.

The descriptions given with reference to FIGS. 29B and 29C may correspond to operation 3106 of FIG. 31.

Figure 30A:
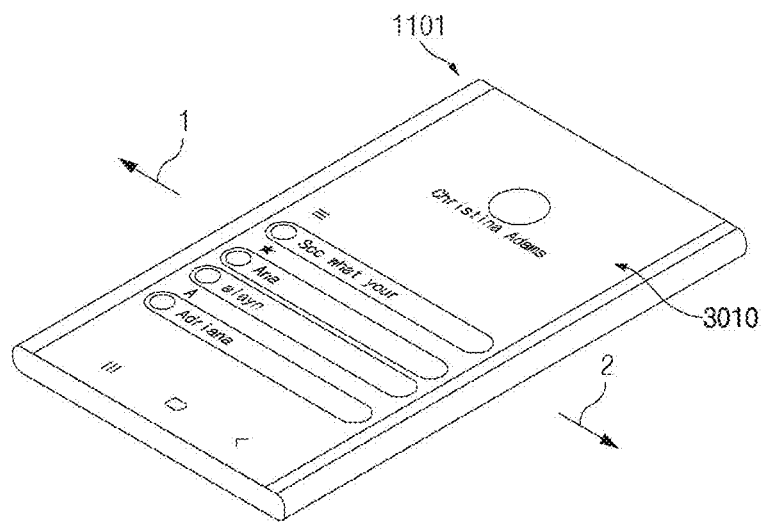
FIG. 30A illustrates an electronic device according to an embodiment of the disclosure.
Figure 30A:
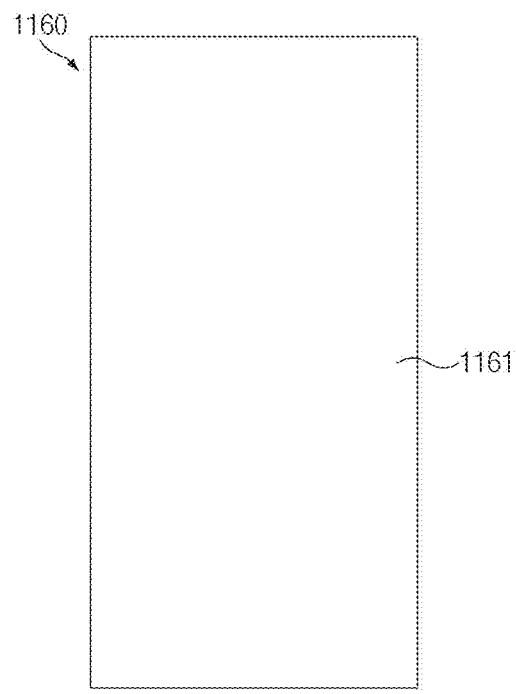

FIG. 30A illustrates the electronic device according to an embodiment of the disclosure.

Figure 30B:
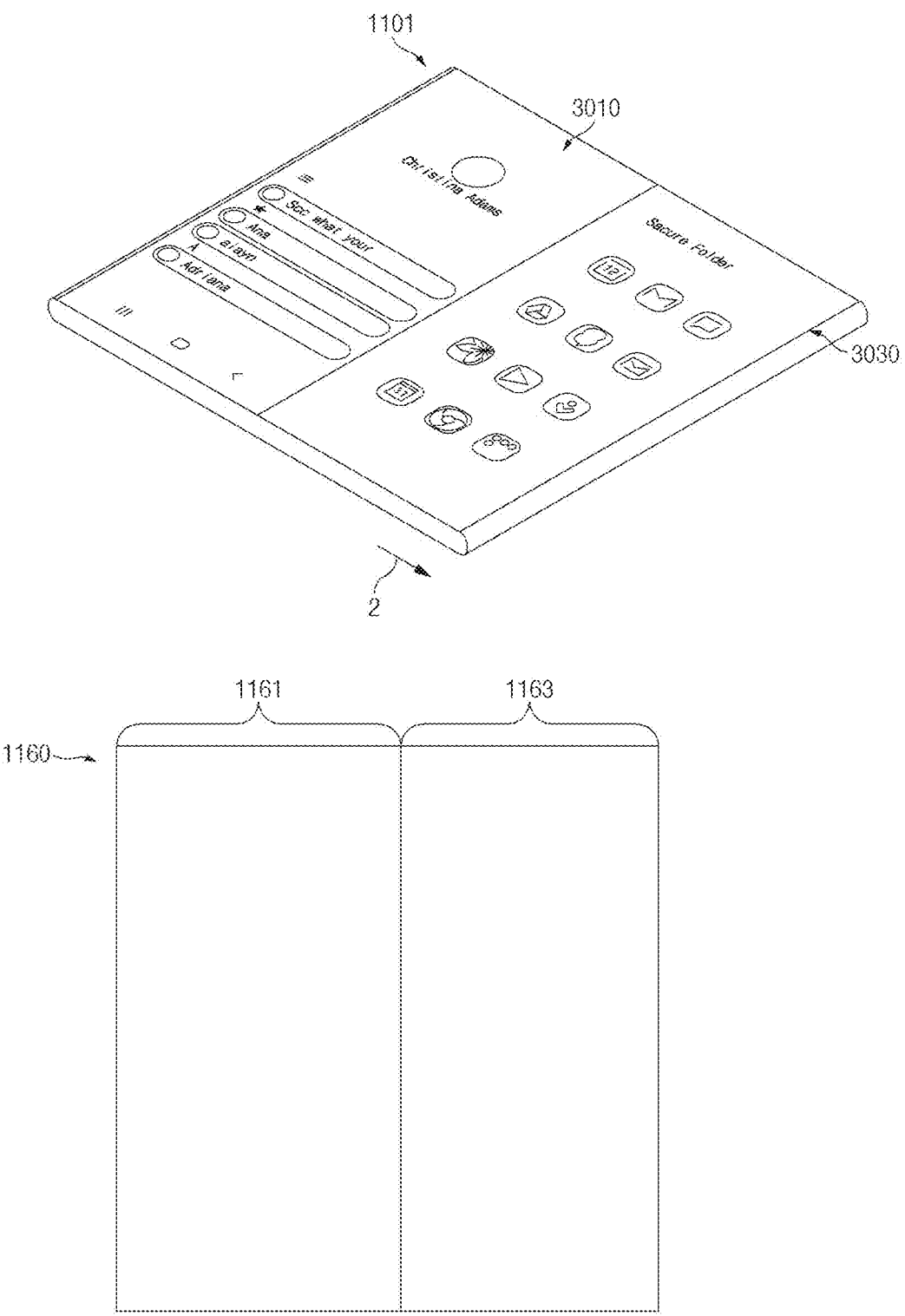
FIG. 30B illustrates an electronic device according to an embodiment of the disclosure.

FIG. 30B illustrates the electronic device according to an embodiment of the disclosure.

Referring to FIG. 30A, the electronic device 1101 according to an embodiment may display a first screen 3010 on the first region 1161 of the display 1160.

Referring to FIG. 30B, the electronic device 1101 according to an embodiment may obtain biometric information (e.g., fingerprint information) of the user 1100 using the sensor module 1176. In an embodiment of the disclosure, the electronic device 1101 may authenticate the user 1100, based on the obtained biometric information. In an embodiment of the disclosure, when the user 1100 is authenticated and the display 1160 is extended in the second direction 2, the electronic device 1101 may display a UI 3030 representing security information on the third region 1163 of the display 1160. For example, the UI 3030 may be an execution screen of a security application that is not accessed without an authentication procedure.

The description given with reference to FIG. 30A may correspond to operation 3102 of FIG. 31.

The description given with reference to FIG. 30B may correspond to operation 3106 of FIG. 31.

FIG. 31 is a flowchart illustrating operations performed by the electronic device according to an embodiment of the disclosure.

Referring to FIG. 31, in operation 3102, the electronic device 1101 according to an embodiment may display a first screen on the first region 1161 of the display 1160.

In operation 3104, the electronic device 1101 according to an embodiment may determine a direction in which the display 1160 is extended and a distance by which the display 1160 is extended, based on a value obtained by the sensor module 1176.

In operation 3106, the electronic device 1101 according to an embodiment may display a screen different from the first screen on the second region 1162 and/or the third region 1163 of the display 1160, based on the determination.

An electronic device according to various embodiments (e.g., the electronic device 101 of FIG. 1) may include a first housing (the first housing 110 of FIG. 1), a second housing (e.g., the second housing 120 of FIG. 1) at least partially disposed in the first housing and coupled to the first housing so as to be movable in a first direction (e.g., the first direction 1 of FIG. 1), a third housing (e.g., the third housing 130 of FIG. 1) at least partially disposed in the first housing and coupled to the first housing so as to be movable in a second direction (e.g., the second direction 2 of FIG. 1), a flexible display (e.g., the display 160 of FIG. 1) that is extendable in the first direction and/or the second direction as the second housing and the third housing move and that includes a first region (e.g., the first region 161 of FIG. 1) that is disposed in the first housing and that forms a first surface (e.g., the front surface 10A of FIG. 1) exposed outside the electronic device, a second region (e.g., the second region 162 of FIG. 1) that extends from the first region and that is at least partially located in the second housing or forms the first surface together with the first region as the second housing moves, and a third region (e.g., the third region 163 of FIG. 1) that extends from the first region and that is at least partially located in the third housing or forms the first surface together with the first region as the third housing moves, at least one sensor (e.g., the sensor module 1176 of FIG. 11), and at least one processor (e.g., the processor 1120 of FIG. 11) operationally connected with the at least one sensor. The at least one processor may display a first screen on the first region (e.g., operation 3102 of FIG. 31), may determine a direction in which the flexible display is extended and a distance by which the flexible display is extended, based on a value obtained by the at least one sensor (e.g., operation 3104 of FIG. 31), and may display a screen different from the first screen on the second region and/or the third region, based on the determination (e.g., operation 3106 of FIG. 31).

In an embodiment of the disclosure, the electronic device may further include at least one camera (e.g., the camera module 3280 of FIG. 32) operationally connected with the at least one processor. The at least one processor may display an execution screen of a camera application (e.g., the first screen 1210 of FIG. 12A) including a plurality of objects (e.g., the plurality of objects 1220 of FIG. 12A) for control of the at least one camera on the first region as the first screen and may identify that the second housing and/or the third housing is gripped by a user, based on a value obtained by the at least one sensor. When the second housing is gripped by the user and the flexible display is extended in the second direction, the at least one processor may display a second screen (e.g., the second screen 1211 of FIG. 12B) including remaining objects (e.g., the objects 1224 and 1225 of FIG. 12B) other than at least some of the plurality of objects on the third region and a partial region (e.g., the partial region 1261 of FIG. 12B) of the first region that extends from the third region and may display the at least some objects (e.g., the objects 1221, 1222, and 1223 of FIG. 12B) among the plurality of objects on a remaining region (e.g., the remaining region 1262 of FIG. 12B) of the first region.

In an embodiment of the disclosure, the plurality of objects included in the first screen may include a first group of objects and a second group of objects. The at least one processor may display the first group of objects on the second region and the second group of objects on the third region, when the second housing and the third housing are gripped by the user and the flexible display is extended in the first direction and the second direction.

In an embodiment of the disclosure, the electronic device may further include a first camera, a second camera, and a third camera operationally connected with the at least one processor. The at least one processor may display, on the first region, the first screen (e.g., the first screen 1310 of FIG. 13A) including a first preview image (e.g., the first preview image 1351 of FIG. 13A) based on an image obtained from the first camera, may display, on the second region, a second preview image (e.g., the second preview image 1352 of FIG. 13B) based on an image obtained from the second camera, when the flexible display is extended in the first direction, and may display, on the third region, a third preview image (e.g., the third preview image 1353 of FIG. 13C) based on an image obtained from the third camera, when the flexible display is extended in the second direction.

In an embodiment of the disclosure, the electronic device may further include at least one camera (e.g., the camera module 3280 of FIG. 32) operationally connected with the at least one processor. The at least one processor may display, on the first region, the first screen (e.g., the first screen 1410 of FIG. 14A) including a first preview image (e.g., the first preview image 1451 of FIG. 14A) based on at least some of images obtained through the at least one camera, may identify at least one subject (e.g., the subjects 1421, 1422, 1423, and 1424 of FIG. 14A) included in the first preview image, may obtain at least one image (e.g., the images 1441, 1442, 1443, and 1444 of FIG. 14B) corresponding to the at least one subject, based on the identification, and may display the at least one image on the second region (e.g., the second region 1162 of FIG. 14B) and/or the third region (e.g., the third region 1163 of FIG. 14B), when the flexible display is not extended.

In an embodiment of the disclosure, the at least one processor may display, on the first region, the first screen representing first content among contents stored in the electronic device, may display, on the second region, a first UI (e.g., the first UI 1520 of FIG. 15B) representing first information related to the content, when the flexible display is extended in the first direction, and may display, on the third region, a second UI (e.g., the second UI 1530 of FIG. 15B) representing second information related to the first content and different from the first information, when the flexible display is extended in the second direction.

In an embodiment of the disclosure, the at least one processor may magnify the first screen displayed on the first region and may display the magnified first screen on the first region, the second region, and the third region, when the flexible display is simultaneously extended in the first direction and the second direction.

In an embodiment of the disclosure, when the flexible display is extended in the first direction, the at least one processor may maintain the first screen displayed on the first region and may display a second screen (e.g., the second screen 2120 of FIG. 21B) different from the first screen on the second region, and when the flexible display is extended in the second direction after extended in the first direction, the at least one processor may maintain the first screen displayed on the first region and the second screen displayed on the second region and may display a third screen (e.g., the third screen 2130 of FIG. 21B) different from the first screen and the second screen on the third region.

In an embodiment of the disclosure, the at least one processor may execute a first application, may display the first screen (e.g., the first screen 2210 of FIG. 22A) on the first region, the first screen being an execution screen of the first application, may display, on the second region, at least one first icon (e.g., the at least one first icon 2221 of FIG. 22B) representing at least one first specified application among applications stored in the electronic device, when the flexible display is extended in the first direction, and may display, on the third region, at least one second icon (e.g., the at least one second icon 2231 of FIG. 22B) representing at least one second specified application among the applications stored in the electronic device, when the flexible display is extended in the second direction.

In an embodiment of the disclosure, the at least one first specified application may have the same category as the first application, and the at least one second specified application may include an application most frequently executed together with the first application among the applications.

In an embodiment of the disclosure, the flexible display may include a first sub-region (e.g., the first sub-region 2361 of FIG. 23A) and a second sub-region (e.g., the second sub-region 2362 of FIG. 23A) obtained by dividing the first region into upper and lower portions at a first specified ratio, and the second sub-region may be located under the first sub-region. The flexible display may include a third sub-region (e.g., the third sub-region 2363 of FIG. 23B) and a fourth sub-region (e.g., the fourth sub-region 2364 of FIG. 23B) obtained by dividing the first and second regions into left and right portions at a second specified ratio, and the fourth sub-region may be located on a right side of the third sub-region. The at least one processor may display an execution screen of a first application (e.g., the execution screen A of the first application of FIG. 23A) and an execution screen of a second application (e.g., the execution screen B of the second application of FIG. 23A) on the first sub-region and the second sub-region, respectively, as the first screen and may display the execution screen of the first application (e.g., the execution screen A of the first application of FIG. 23B) and the execution screen of the second application (e.g., the execution screen B of the second application of FIG. 23B) on the third sub-region and the fourth sub-region, respectively, when the flexible display is extended in the first direction.

In an embodiment of the disclosure, the flexible display may include a fifth sub-region (e.g., the seventh sub-region 2367 of FIG. 23D) and a sixth sub-region (e.g., the eighth sub-region 2368 of FIG. 23D) obtained by dividing the first to third regions into upper and lower portions at the first specified ratio, and the sixth sub-region is located under the fifth sub-region. The at least one processor may display the execution screen of the first application (e.g., the execution screen A of the first application of FIG. 23D) on the fifth sub-region and the execution screen of the second application (e.g., the execution screen B of the second application of FIG. 23D) on the sixth sub-region, when the flexible display is extended in the first direction and the second direction.

In an embodiment of the disclosure, the flexible display may include a first sub-region (e.g., the first sub-region 2461 of FIG. 24A) and a second sub-region (e.g., the second sub-region 2461 of FIG. 24A) obtained by dividing the first region into left and right portions at a first specified ratio, and the second sub-region may be located on a right side of the first sub-region. The at least one processor may display an execution screen of a first application (e.g., the execution screen A of the first application of FIG. 24A) and an execution screen of a second application (e.g., the execution screen B of the second application of FIG. 24A) on the first sub-region and the second sub-region, respectively, as the first screen. When the flexible display is extended in the first direction, the at least one processor may maintain the execution screen of the second application displayed on the second sub-region, may magnify the execution screen of the first application displayed on the first sub-region, and may display the magnified execution screen of the first application on a remaining region of the flexible display (e.g., the first remaining region 2465 of FIG. 24C). The remaining region of the flexible display may include the second region and a partial region (e.g., the partial region 1161-1 of FIG. 24C) other than the second sub-region in the first region.

In an embodiment of the disclosure, the flexible display may include a third sub-region (e.g., the third sub-region 2463 of FIG. 24B) and a fourth sub-region (e.g., the fourth sub-region 2464 of FIG. 24B) obtained by dividing the first to third regions into left and right portions at the first specified ratio, and the fourth sub-region may be located on a right side of the third sub-region. When the flexible display is extended in the first direction and the second direction, the at least one processor may magnify the execution screen of the first application displayed on the first sub-region, may display the magnified execution screen of the first application on the third sub-region, may magnify the execution screen of the second application displayed on the second sub-region, and may display the magnified execution screen of the second application on the fourth sub-region.

In an embodiment of the disclosure, the at least one processor may display a keyboard (e.g., the keyboard 2520 of FIG. 25A) including a plurality of keys on the first region such that the keyboard overlaps the first screen. When the distance by which the flexible display is extended exceeds a threshold distance, the at least one processor may display a first portion of the keyboard (e.g., the first portion 2521 of FIG. 25B) including a first group of keys among the plurality of keys such that the first portion of the keyboard is aligned in the first direction in an extended display region of the flexible display and may display a second portion of the keyboard (e.g., the second portion 2522 of FIG. 25B) including a second group of keys among the plurality of keys such that the second portion of the keyboard is aligned in the second direction in the extended display region.

In an embodiment of the disclosure, the first screen may include an execution screen of a game application or a lock screen of the electronic device.

In an embodiment of the disclosure, the at least one processor may display a first keyboard (e.g., the first keyboard 2820 of FIG. 28A) including a first number of keys on the first region such that the first keyboard overlaps the first screen. When the distance by which the flexible display is extended exceeds a first threshold value, the at least one processor may replace the first keyboard with a second keyboard (e.g., the second keyboard 2830 of FIG. 28B) including a second number of keys being more than the first number of keys and may display the second keyboard on a first extended display region of the flexible display. When the distance by which the flexible display is extended exceeds a second threshold value greater than the first threshold value, the at least one processor may display a first portion of the second keyboard (e.g., the first portion 2831 of FIG. 28C) including a first group of keys among the second number of keys such that the first portion of the second keyboard is aligned in the first direction in a second extended display region and may display a second portion of the second keyboard (e.g., the second portion 2832 of FIG. 28C) including a second group of keys among the second number of keys such that the second portion of the second keyboard is biased in the second direction in the second extended display region.

In an embodiment of the disclosure, the at least one processor may display a first keyboard (e.g., the first keyboard 2920 of FIG. 29A) including a plurality of keys on the first region such that the first keyboard overlaps the first screen. When the flexible display is extended in the first direction, the at least one processor may display a second keyboard (e.g., the second keyboard 2930 of FIG. 29B) different from the first keyboard on a first sub-region (e.g., the first sub-region 2961 of FIG. 29B) located on a left side with respect to the center of a first extended region including the first region and the second region of the flexible display and may display the first keyboard on a second sub-region (e.g., the second sub-region 2962 of FIG. 29B) located on a right side with respect to the center of the first extended region of the flexible display.

In an embodiment of the disclosure, when the flexible display is extended in the second direction, the at least one processor may display the first keyboard on a third sub-region (e.g., the third sub-region 2973 of FIG. 29C) located on a left side with respect to the center of a second extended region including the first region and the second region of the flexible display and may display a third keyboard (e.g., the third keyboard 2940 of FIG. 29C) different from the first keyboard on a fourth sub-region (e.g., the fourth sub-region 2974 of FIG. 29C) located on a right side with respect to the center of the second extended region.

In an embodiment of the disclosure, the at least one processor may obtain biometric information of a user using the at least one sensor, and when the user is authenticated based on the obtained biometric information and the flexible display is extended in the second direction, the at least one processor may display security information (e.g., the UI 3030 of FIG. 30B) on the third region.

FIG. 32 is a block diagram illustrating an electronic device 3201 in a network environment 3200 according to an embodiment of the disclosure.

Referring to FIG. 32, the electronic device 3201 in the network environment 3200 may communicate with an external electronic device 3202 via a first network 3298 (e.g., a short-range wireless communication network), or at least one of an external electronic device 3204 or a server 3208 via a second network 3299 (e.g., a long-range wireless communication network). According to an embodiment of the disclosure, the electronic device 3201 may communicate with the external electronic device 3204 via the server 3208. According to an embodiment of the disclosure, the electronic device 3201 may include a processor 3220, a memory 3230, an input module 3250, a sound output module 3255, a display module 3260, an audio module 3270, a sensor module 3276, an interface 3277, a connecting terminal 3278, a haptic module 3279, a camera module 3280, a power management module 3288, a battery 3289, a communication module 3290, a subscriber identification module (SIM) 3296, or an antenna module 3297. In some embodiments of the disclosure, at least one of the components (e.g., the connecting terminal 3278) may be omitted from the electronic device 3201, or one or more other components may be added in the electronic device 3201. In some embodiments of the disclosure, some of the components (e.g., the sensor module 3276, the camera module 3280, or the antenna module 3297) may be implemented as a single component (e.g., the display module 3260).

The processor 3220 may execute, for example, software (e.g., a program 3240) to control at least one other component (e.g., a hardware or software component) of the electronic device 3201 coupled with the processor 3220, and may perform various data processing or computation. According to one embodiment of the disclosure, as at least part of the data processing or computation, the processor 3220 may store a command or data received from another component (e.g., the sensor module 3276 or the communication module 3290) in volatile memory 3232, process the command or the data stored in the volatile memory 3232, and store resulting data in non-volatile memory 3234. According to an embodiment of the disclosure, the processor 3220 may include a main processor 3221 (e.g., a central processing unit (CPU) or an application processor (AP)), or an auxiliary processor 3223 (e.g., a graphics processing unit (GPU), a neural processing unit (NPU), an image signal processor (ISP), a sensor hub processor, or a communication processor (CP)) that is operable independently from, or in conjunction with, the main processor 3221. For example, when the electronic device 3201 includes the main processor 3221 and the auxiliary processor 3223, the auxiliary processor 3223 may be adapted to consume less power than the main processor 3221, or to be specific to a specified function. The auxiliary processor 3223 may be implemented as separate from, or as part of the main processor 3221.

The auxiliary processor 3223 may control at least some of functions or states related to at least one component (e.g., the display module 3260, the sensor module 3276, or the communication module 3290) among the components of the electronic device 3201, instead of the main processor 3221 while the main processor 3221 is in an inactive (e.g., a sleep) state, or together with the main processor 3221 while the main processor 3221 is in an active state (e.g., executing an application). According to an embodiment of the disclosure, the auxiliary processor 3223 (e.g., an image signal processor or a communication processor) may be implemented as part of another component (e.g., the camera module 3280 or the communication module 3290) functionally related to the auxiliary processor 3223. According to an embodiment of the disclosure, the auxiliary processor 3223 (e.g., the neural processing unit) may include a hardware structure specified for artificial intelligence model processing. An artificial intelligence model may be generated by machine learning. Such learning may be performed, e.g., by the electronic device 3201 where the artificial intelligence is performed or via a separate server (e.g., the server 3208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 3230 may store various data used by at least one component (e.g., the processor 3220 or the sensor module 3276) of the electronic device 3201. The various data may include, for example, software (e.g., the program 3240) and input data or output data for a command related thereto. The memory 3230 may include the volatile memory 3232 or the non-volatile memory 3234.

The program 3240 may be stored in the memory 3230 as software, and may include, for example, an operating system (OS) 3242, middleware 3244, or an application 3246.

The input module 3250 may receive a command or data to be used by another component (e.g., the processor 3220) of the electronic device 3201, from the outside (e.g., a user) of the electronic device 3201. The input module 3250 may include, for example, a microphone, a mouse, a keyboard, a key (e.g., a button), or a digital pen (e.g., a stylus pen).

The sound output module 3255 may output sound signals to the outside of the electronic device 3201. The sound output module 3255 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 3260 may visually provide information to the outside (e.g., a user) of the electronic device 3201. The display module 3260 may include, for example, a display, a hologram device, or a projector and control circuitry to control a corresponding one of the display, hologram device, and projector. According to an embodiment of the disclosure, the display module 3260 may include a touch sensor adapted to detect a touch, or a pressure sensor adapted to measure the intensity of force incurred by the touch.

The audio module 3270 may convert a sound into an electrical signal and vice versa. According to an embodiment of the disclosure, the audio module 3270 may obtain the sound via the input module 3250, or output the sound via the sound output module 3255 or a headphone of an external electronic device (e.g., the external electronic device 3202) directly (e.g., wiredly) or wirelessly coupled with the electronic device 3201.

The sensor module 3276 may detect an operational state (e.g., power or temperature) of the electronic device 3201 or an environmental state (e.g., a state of a user) external to the electronic device 3201, and then generate an electrical signal or data value corresponding to the detected state. According to an embodiment of the disclosure, the sensor module 3276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3277 may support one or more specified protocols to be used for the electronic device 3201 to be coupled with the external electronic device (e.g., the external electronic device 3202) directly (e.g., wiredly) or wirelessly. According to an embodiment of the disclosure, the interface 3277 may include, for example, a high definition multimedia interface (HDMI), a universal serial bus (USB) interface, a secure digital (SD) card interface, or an audio interface.

A connecting terminal 3278 may include a connector via which the electronic device 3201 may be physically connected with the external electronic device (e.g., the external electronic device 3202). According to an embodiment of the disclosure, the connecting terminal 3278 may include, for example, a HDMI connector, a USB connector, an SD card connector, or an audio connector (e.g., a headphone connector).

The haptic module 3279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 3279 may include, for example, a motor, a piezoelectric element, or an electric stimulator.

The camera module 3280 may capture a still image or moving images. According to an embodiment of the disclosure, the camera module 3280 may include one or more lenses, image sensors, image signal processors, or flashes.

The power management module 3288 may manage power supplied to the electronic device 3201. According to one embodiment of the disclosure, the power management module 3288 may be implemented as at least part of, for example, a power management integrated circuit (PMIC).

The battery 3289 may supply power to at least one component of the electronic device 3201. According to an embodiment of the disclosure, the battery 3289 may include, for example, a primary cell which is not rechargeable, a secondary cell which is rechargeable, or a fuel cell.

The communication module 3290 may support establishing a direct (e.g., wired) communication channel or a wireless communication channel between the electronic device 3201 and the external electronic device (e.g., the external electronic device 3202, the external electronic device 3204, or the server 3208) and performing communication via the established communication channel. The communication module 3290 may include one or more communication processors that are operable independently from the processor 3220 (e.g., the application processor (AP)) and supports a direct (e.g., wired) communication or a wireless communication. According to an embodiment of the disclosure, the communication module 3290 may include a wireless communication module 3292 (e.g., a cellular communication module, a short-range wireless communication module, or a global navigation satellite system (GNSS) communication module) or a wired communication module 3294 (e.g., a local area network (LAN) communication module or a power line communication (PLC) module). A corresponding one of these communication modules may communicate with the external electronic device via the first network 3298 (e.g., a short-range communication network, such as Bluetooth™, wireless-fidelity (Wi-Fi) direct, or infrared data association (IrDA)) or the second network 3299 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3292 may identify and authenticate the electronic device 3201 in a communication network, such as the first network 3298 or the second network 3299, using subscriber information (e.g., international mobile subscriber identity (IMSI)) stored in the subscriber identification module 3296.

The wireless communication module 3292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 3292 may support a high-frequency band (e.g., the millimeter wave (mmWave) band) to achieve, e.g., a high data transmission rate. The wireless communication module 3292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 3292 may support various requirements specified in the electronic device 3201, an external electronic device (e.g., the external electronic device 3204), or a network system (e.g., the second network 3299). According to an embodiment of the disclosure, the wireless communication module 3292 may support a peak data rate (e.g., 20 gigabits per second (Gbps) or more) for implementing eMBB, loss coverage (e.g., 3264 dB or less) for implementing mMTC, or U-plane latency (e.g., 0.5 ms or less for each of downlink (DL) and uplink (UL), or a round trip of 32 ms or less) for implementing URLLC.

The antenna module 3297 may transmit or receive a signal or power to or from the outside (e.g., the external electronic device) of the electronic device 3201. According to an embodiment of the disclosure, the antenna module 3297 may include an antenna including a radiating element including a conductive material or a conductive pattern formed in or on a substrate (e.g., a printed circuit board (PCB)). According to an embodiment of the disclosure, the antenna module 3297 may include a plurality of antennas (e.g., array antennas). In such a case, at least one antenna appropriate for a communication scheme used in the communication network, such as the first network 3298 or the second network 3299, may be selected, for example, by the communication module 3290 (e.g., the wireless communication module 3292) from the plurality of antennas. The signal or the power may then be transmitted or received between the communication module 3290 and the external electronic device via the selected at least one antenna. According to an embodiment of the disclosure, another component (e.g., a radio frequency integrated circuit (RFIC)) other than the radiating element may be additionally formed as part of the antenna module 3297.

According to various embodiments of the disclosure, the antenna module 3297 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 3201 and the external electronic device 3204 via the server 3208 coupled with the second network 3299. Each of the external electronic devices 3202 or 3204 may be a device of a same type as, or a different type, from the electronic device 3201. According to an embodiment of the disclosure, all or some of operations to be executed at the electronic device 3201 may be executed at one or more of the external electronic devices 3202, 3204, or 3208. For example, if the electronic device 3201 should perform a function or a service automatically, or in response to a request from a user or another device, the electronic device 3201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3201. The electronic device 3201 may provide the outcome, with or without further processing of the outcome, as at least part of a reply to the request. To that end, a cloud computing, distributed computing, mobile edge computing (MEC), or client-server computing technology may be used, for example. The electronic device 3201 may provide ultra low-latency services using, e.g., distributed computing or mobile edge computing. In another embodiment of the disclosure, the external electronic device 3204 may include an internet-of-things (IoT) device. The server 3208 may be an intelligent server using machine learning and/or a neural network. According to an embodiment of the disclosure, the external electronic device 3204 or the server 3208 may be included in the second network 3299. The electronic device 3201 may be applied to intelligent services (e.g., smart home, smart city, smart car, or healthcare) based on 5G communication technology or IoT-related technology.

Figure 33:
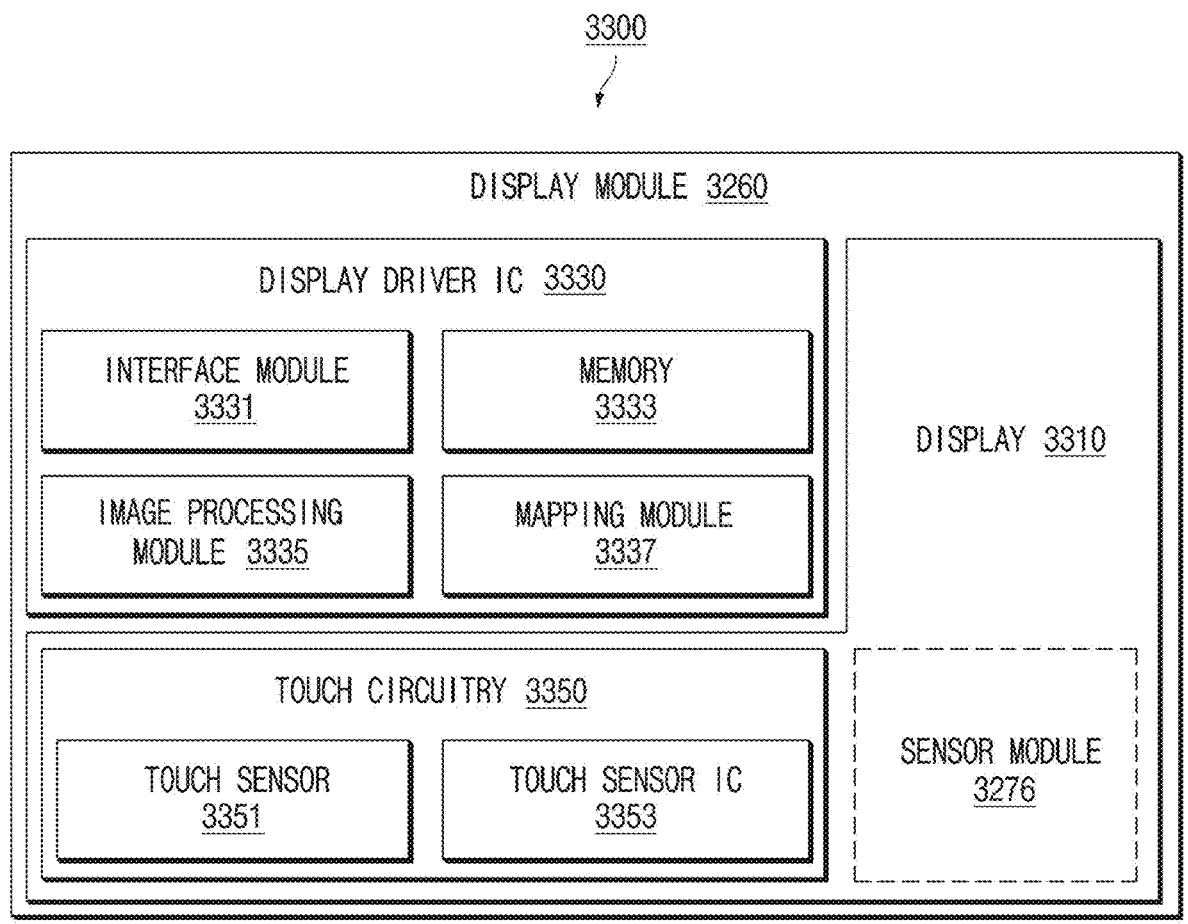
FIG. 33 is a block diagram of a display module according to an embodiment of the disclosure.

FIG. 33 is a block diagram 3300 illustrating the display module 3260 according to various embodiments. Referring to FIG. 33, the display module 3260 may include a display 3310 and a display driver integrated circuit (DDI) 3330 to control the display 3310. The DDI 3330 may include an interface module 3331, a memory 3333 (e.g., buffer memory), an image processing module 3335, or a mapping module 3337. The DDI 3330 may receive image information that contains image data or an image control signal corresponding to a command to control the image data from another component of the electronic device 3201 via the interface module 3331. For example, according to an embodiment of the disclosure, the image information may be received from the processor 3220 (e.g., the main processor 3221 (e.g., an application processor)) or the auxiliary processor 3223 (e.g., a graphics processing unit) operated independently from the function of the main processor 3221. The DDI 3330 may communicate, for example, with touch circuitry 3350 or the sensor module 3276 via the interface module 3331. The DDI 3330 may also store at least part of the received image information in the memory 3333, for example, on a frame by frame basis.

The image processing module 3335 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 3310.

The mapping module 3337 may generate a voltage value or a current value corresponding to the image data pre-processed or post-processed by the image processing module 3335. According to an embodiment of the disclosure, the generating of the voltage value or current value may be performed, for example, based at least in part on one or more attributes of the pixels (e.g., an array, such as an RGB stripe or a pentile structure, of the pixels, or the size of each subpixel). At least some pixels of the display 3310 may be driven, for example, based at least in part on the voltage value or the current value such that visual information (e.g., a text, an image, or an icon) corresponding to the image data may be displayed via the display 3310.

According to an embodiment of the disclosure, the display module 3260 may further include the touch circuitry 3350. The touch circuitry 3350 may include a touch sensor 3351 and a touch sensor IC 3353 to control the touch sensor 3351. The touch sensor IC 3353 may control the touch sensor 3351 to detect a touch input or a hovering input with respect to a certain position on the display 3310. To achieve this, for example, the touch sensor 3351 may detect (e.g., measure) a change in a signal (e.g., a voltage, a quantity of light, a resistance, or a quantity of one or more electric charges) corresponding to the certain position on the display 3310. The touch circuitry 3350 may provide input information (e.g., a position, an area, a pressure, or a time) indicative of the touch input or the hovering input detected via the touch sensor 3351 to the processor 3220. According to an embodiment of the disclosure, at least part (e.g., the touch sensor IC 3353) of the touch circuitry 3350 may be formed as part of the display 3310 or the DDI 3330, or as part of another component (e.g., the auxiliary processor 3223) disposed outside the display module 3260.

According to an embodiment of the disclosure, the display module 3260 may further include at least one sensor (e.g., a fingerprint sensor, an iris sensor, a pressure sensor, or an illuminance sensor) of the sensor module 3276 or a control circuit for the at least one sensor. In such a case, the at least one sensor or the control circuit for the at least one sensor may be embedded in one portion of a component (e.g., the display 3310, the DDI 3330, or the touch circuitry 3350)) of the display module 3260. For example, when the sensor module 3276 embedded in the display module 3260 includes a biometric sensor (e.g., a fingerprint sensor), the biometric sensor may obtain biometric information (e.g., a fingerprint image) corresponding to a touch input received via a portion of the display 3310. As another example, when the sensor module 3276 embedded in the display module 3260 includes a pressure sensor, the pressure sensor may obtain pressure information corresponding to a touch input received via a partial or whole area of the display 3310. According to an embodiment of the disclosure, the touch sensor 3351 or the sensor module 3276 may be disposed between pixels in a pixel layer of the display 3310, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 3240) including one or more instructions that are stored in a storage medium (e.g., an internal memory 3236 or an external memory 3238) that is readable by a machine (e.g., the electronic device 3201). For example, a processor (e.g., the processor 3220) of the machine (e.g., the electronic device 3201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiment of the disclosure s, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing at least partially disposed in the first housing and coupled to the first housing so as to be movable in a first direction;
a third housing at least partially disposed in the first housing and coupled to the first housing so as to be movable in a second direction;
a flexible display extendable in at least one of the first direction or the second direction as the second housing and the third housing move,
wherein the flexible display includes:
    a first region disposed in the first housing and configured to form a first surface exposed outside the electronic device,
    a second region configured to extend from the first region and at least partially located in the second housing or configured to form the first surface together with the first region as the second housing moves, and
    a third region configured to extend from the first region and at least partially located in the third housing or configured to form the first surface together with the first region as the third housing moves,
at least one sensor,
memory storing one or more computer programs; and
one or more processors communicatively coupled to the at least one sensor,
wherein the one or more computer programs include computer-executable instructions that, when executed by the one or more processors individually or collectively, cause the electronic device to:
    display a first screen on the first region,
    determine a direction in which the flexible display is extended and a distance by which the flexible display is extended, based on a value obtained by the at least one sensor measuring movement of the second housing to form the second region and movement of the third housing to form the third region,
    determine reallocation of a portion of a plurality of objects displayed in the first region into available display areas of the second region and the third region based on the value obtained by the at least one sensor,
    redisplay unreallocated objects of the plurality of objects on the first region, and
    display the reallocated objects of the plurality of objects on at least one of the second region or the third region, based on the determination of the reallocation.

2. The electronic device of claim 1, comprising:
at least one camera communicatively coupled with the one or more processors,
wherein the one or more computer programs further include computer-executable instructions that, when executed by the one or more processors individually or collectively, cause the electronic device to:
display an execution screen of a camera application including a plurality of objects for control of the at least one camera on the first region as the first screen, and
identify that at least one of the second housing or the third housing is gripped by a user, based on a value obtained by the at least one sensor, and
wherein when the second housing is gripped by the user and the flexible display is extended in the second direction, the one or more computer programs further include computer-executable instructions that, when executed by the one or more processors individually or collectively, cause the electronic device to:
display a second screen including remaining objects other than at least a portion of the plurality of objects on the third region and a partial region of the first region configured to extend from the third region, and
display the at least the portion of the plurality of objects on a remaining region of the first region.

3. The electronic device of claim 2,
wherein the plurality of objects included in the first screen include a first group of objects and a second group of objects, and
wherein the one or more computer programs further include computer-executable instructions that, when executed by the one or more processors individually or collectively, cause the electronic device to display the first group of objects on the second region and the second group of objects on the third region, when the second housing and the third housing are gripped by the user and the flexible display is extended in the first direction and the second direction.

4. The electronic device of claim 1, comprising:
a first camera, a second camera, and a third camera communicatively coupled with the one or more processors,
wherein the one or more computer programs further include computer-executable instructions that, when executed by the one or more processors individually or collectively, cause the electronic device to:
display, on the first region, the first screen including a first preview image based on an image obtained from the first camera,
display, on the second region, a second preview image based on an image obtained from the second camera, when the flexible display is extended in the first direction, and
display, on the third region, a third preview image based on an image obtained from the third camera, when the flexible display is extended in the second direction.

5. The electronic device of claim 1, comprising:
at least one camera communicatively coupled with the or more processors,
wherein the one or more computer programs further include computer-executable instructions that, when executed by the one or more processors individually or collectively, cause the electronic device to:

display, on the first region, the first screen including a first preview image based on at least a portion of images obtained through the at least one camera, identify at least one subject included in the first preview image, obtain at least one image corresponding to the at least one subject, based on the identification, and display the at least one image on at least one of the second region or the third region, when the flexible display is not extended.

6. The electronic device of claim 1, wherein the one or more computer programs further include computer-executable instructions that, when executed by the one or more processors individually or collectively, cause the electronic device to:

display, on the first region, the first screen representing first content among contents stored in the electronic device, display, on the second region, a first user interface (UI) representing first information related to the content, when the flexible display is extended in the first direction, and display, on the third region, a second UI representing second information related to the first content and different from the first information, when the flexible display is extended in the second direction.

7. The electronic device of claim 1, wherein the one or more computer programs further include computer-executable instructions that, when executed by the one or more processors individually or collectively, cause the electronic device to:

magnify the first screen displayed on the first region and display the magnified first screen on the first region, the second region, and the third region, when the flexible display is simultaneously extended in the first direction and the second direction, maintain the first screen displayed on the first region and display a second screen different from the first screen on the second region, when the flexible display is extended in the first direction, and maintain the first screen displayed on the first region and the second screen displayed on the second region and display a third screen different from the first screen and the second screen on the third region, when the flexible display is extended in the second direction after extended in the first direction.

8. The electronic device of claim 1, wherein the one or more computer programs further include computer-executable instructions that, when executed by the one or more processors individually or collectively, cause the electronic device to:

execute a first application, display the first screen on the first region, the first screen being an execution screen of the first application, display, on the second region, at least one first icon representing at least one first specified application among applications stored in the electronic device, when the flexible display is extended in the first direction, and display, on the third region, at least one second icon representing at least one second specified application among the applications stored in the electronic device, when the flexible display is extended in the second direction, wherein the at least one first specified application has the same category as the first application, and wherein the at least one second specified application includes an application most frequently executed together with the first application among the applications.

9. The electronic device of claim 1, wherein the flexible display includes a first sub-region and a second sub-region obtained by dividing the first region into upper and lower portions at a first specified ratio, and the second sub-region is located under the first sub-region, wherein the flexible display includes a third sub-region and a fourth sub-region obtained by dividing the first and second regions into left and right portions at a second specified ratio, and the fourth sub-region is located on a right side of the third sub-region, and wherein the one or more computer programs further include computer-executable instructions that, when executed by the one or more processors individually or collectively, cause the electronic device to:

display an execution screen of a first application and an execution screen of a second application on the first sub-region and the second sub-region, respectively, as the first screen, and display the execution screen of the first application and the execution screen of the second application on the third sub-region and the fourth sub-region, respectively, when the flexible display is extended in the first direction.

10. The electronic device of claim 9, wherein the flexible display includes a fifth sub-region and a sixth sub-region obtained by dividing the first to third regions into upper and lower portions at the first specified ratio, and the sixth sub-region is located under the fifth sub-region, and wherein the one or more computer programs further include computer-executable instructions that, when executed by the one or more processors individually or collectively, cause the electronic device to display the execution screen of the first application on the fifth sub-region and the execution screen of the second application on the sixth sub-region, when the flexible display is extended in the first direction and the second direction.

11. The electronic device of claim 1, wherein the flexible display includes a first sub-region and a second sub-region obtained by dividing the first region into left and right portions at a first specified ratio, and the second sub-region is located on a right side of the first sub-region, wherein the one or more computer programs further include computer-executable instructions that, when executed by the one or more processors individually or collectively, cause the electronic device to:

display an execution screen of a first application and an execution screen of a second application on the first sub-region and the second sub-region, respectively, as the first screen, and maintain the execution screen of the second application displayed on the second sub-region, magnify the execution screen of the first application displayed on the first sub-region, and display the magnified execution screen of the first application on a remaining region of the flexible display, when the flexible display is extended in the first direction, and wherein the remaining region of the flexible display includes the second region and a partial region other than the second sub-region in the first region.

12. The electronic device of claim 11,
wherein the flexible display includes a third sub-region and a fourth sub-region obtained by dividing the first to third regions into left and right portions at the first specified ratio, and the fourth sub-region is located on a right side of the third sub-region, and
wherein the one or more computer programs further include computer-executable instructions that, when executed by the one or more processors individually or collectively, cause the electronic device to:
magnify the execution screen of the first application displayed on the first sub-region, display the magnified execution screen of the first application on the third sub-region,
magnify the execution screen of the second application displayed on the second sub-region, and
display the magnified execution screen of the second application on the fourth sub-region, when the flexible display is extended in the first direction and the second direction.

13. The electronic device of claim 1,
wherein the one or more computer programs further include computer-executable instructions that, when executed by the one or more processors individually or collectively, cause the electronic device to display a keyboard including a plurality of keys on the first region such that the keyboard overlaps the first screen, and
wherein when the distance by which the flexible display is extended exceeds a threshold distance, the one or more computer programs further include computer-executable instructions that, when executed by the one or more processors individually or collectively, cause the electronic device to:
display a first portion of the keyboard including a first group of keys among the plurality of keys such that the first portion of the keyboard is aligned in the first direction in an extended display region of the flexible display, and
display a second portion of the keyboard including a second group of keys among the plurality of keys such that the second portion of the keyboard is aligned in the second direction in the extended display region.

14. The electronic device of claim 1,
wherein the one or more computer programs further include computer-executable instructions that, when executed by the one or more processors individually or collectively, cause the electronic device to display a first keyboard including a first number of keys on the first region such that the first keyboard overlaps the first screen,
wherein when the distance by which the flexible display is extended exceeds a first threshold value, the one or more computer programs further include computer-executable instructions that, when executed by the one or more processors individually or collectively, cause the electronic device to replace the first keyboard with a second keyboard including a second number of keys being more than the first number of keys and display the second keyboard on a first extended display region of the flexible display, and
wherein when the distance by which the flexible display is extended exceeds a second threshold value greater than the first threshold value, the one or more computer programs further include computer-executable instructions that, when executed by the one or more processors individually or collectively, cause the electronic device to:
display a first portion of the second keyboard including a first group of keys among the second number of keys such that the first portion of the second keyboard is aligned in the first direction in a second extended display region, and
display a second portion of the second keyboard including a second group of keys among the second number of keys such that the second portion of the second keyboard is biased in the second direction in the second extended display region.

15. The electronic device of claim 1,
wherein the one or more computer programs further include computer-executable instructions that, when executed by the one or more processors individually or collectively, cause the electronic device to display a first keyboard including a plurality of keys on the first region such that the first keyboard overlaps the first screen, and
wherein when the flexible display is extended in the first direction, the one or more computer programs further include computer-executable instructions that, when executed by the one or more processors individually or collectively, cause the electronic device to:
display a second keyboard different from the first keyboard on a first sub-region located on a left side with respect to the center of a first extended region including the first region and the second region of the flexible display, and
display the first keyboard on a second sub-region located on a right side with respect to the center of the first extended region of the flexible display.

16. The electronic device of claim 1, wherein the reallocated objects of the plurality of objects are reoriented on a horizontal or vertical axis based on available area of the at least one of the second region or the third region.

* * * * *